United States Patent
Hirose

(10) Patent No.: US 10,773,669 B2
(45) Date of Patent: Sep. 15, 2020

(54) STRUCTURAL MEMBER, VEHICLE-BODY STRUCTURE AND BUMPER REINFORCEMENT

(71) Applicant: Nippon Steel Corporation, Tokyo (JP)

(72) Inventor: Satoshi Hirose, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 16/611,310

(22) PCT Filed: Apr. 27, 2018

(86) PCT No.: PCT/JP2018/017161
§ 371 (c)(1),
(2) Date: Nov. 6, 2019

(87) PCT Pub. No.: WO2018/207668
PCT Pub. Date: Nov. 15, 2018

(65) Prior Publication Data
US 2020/0139911 A1    May 7, 2020

(30) Foreign Application Priority Data

May 10, 2017  (JP) .................................. 2017-093890

(51) Int. Cl.
*B60R 19/02* (2006.01)
*B60R 19/18* (2006.01)
(Continued)

(52) U.S. Cl.
CPC .............. *B60R 19/18* (2013.01); *B60R 19/04* (2013.01); *B62D 25/04* (2013.01); *B62D 25/06* (2013.01); *B60R 2019/1826* (2013.01)

(58) Field of Classification Search
CPC . B60R 19/18; B60R 19/04; B60R 2019/1826; B62D 25/04; B62D 25/06
See application file for complete search history.

(56) References Cited

U.S. PATENT DOCUMENTS

| 7,044,516 B2 | 5/2006 | Kobayashi et al. |
| 2014/0117685 A1* | 5/2014 | Honda ............... B60R 19/34 293/120 |

(Continued)

FOREIGN PATENT DOCUMENTS

| CA | 3001297 A1 * | 4/2017 | ............. B62D 21/15 |
| DE | 202016104012 U1 * | 10/2016 | ........... B60R 19/023 |

(Continued)

OTHER PUBLICATIONS

English Abstract & Family List of JP2010236560A.
(Continued)

*Primary Examiner* — Lori L Lyjak
(74) *Attorney, Agent, or Firm* — Banner & Witcoff, Ltd.

(57) ABSTRACT

A structural member (10) includes a closed-cross-section structure having a hat member (1) and a closing plate (2), and a reinforcing member (supplementary strengthening member ("SSM")) (4). The hat member (1) includes two side wails (11 and 12), each of which includes a high-strength portion (11A, 12A) with a yield strength not lower than 500 MPa and low-strength portions (11B, 12B) with a yield strength of 60 to 85% of the yield strength of the high-strength portion. As determined along the direction of extension of the ridges (123) of the hat member, both ends of the reinforcing member (4) overlap the high-strength portions (11A and 12B) of the side walls (11 and 12). Adjacent to at least one of both ends of the reinforcing member (4), the border between the high-strength portions (11A and 12A) and the low-strength portions (11B and 12B) is positioned in a region starting at a position 1/3, and ending at a position 3/2, of the height (H) of the side wall (11) distant from that end of the reinforcing member (4) as determined along the direction of extension of the ridges (123) away from the reinforcing member (4).

20 Claims, 29 Drawing Sheets

(51) Int. Cl.
  *B60R 19/04* (2006.01)
  *B62D 25/04* (2006.01)
  *B62D 25/06* (2006.01)

(56) References Cited

U.S. PATENT DOCUMENTS

| | | | | |
|---|---|---|---|---|
| 2014/0147693 | A1* | 5/2014 | Yasuyama | B62D 21/157 428/594 |
| 2016/0193644 | A1* | 7/2016 | Nakazawa | B21D 22/20 428/599 |
| 2016/0280282 | A1* | 9/2016 | Nishimura | B62D 29/007 |
| 2017/0096171 | A1* | 4/2017 | Frost | B62D 25/04 |

FOREIGN PATENT DOCUMENTS

| | | | |
|---|---|---|---|
| JP | 2010236560 A | 10/2010 | |
| JP | 2011088484 A | 5/2011 | |
| JP | 5137322 B2 | 2/2013 | |
| JP | 2014024074 A | 2/2014 | |
| JP | 2014087848 A | 5/2014 | |
| JP | 2017071391 A | 4/2017 | |
| WO | 2005058624 A1 | 6/2005 | |
| WO | 2017061631 A1 | 4/2017 | |

OTHER PUBLICATIONS

English Abstract & Family List of JP2014024074A.
English Abstract & Family List of JP5137322B2.
English Abstract & Family List of WO2005058624A1.
English Abstract & Family List of WO2017061631A1.
English Abstract & Family List of JP2017071391A.
English Abstract & Family List of JP2014087848A.
English Abstract & Family List of JP2011088484A.

* cited by examiner

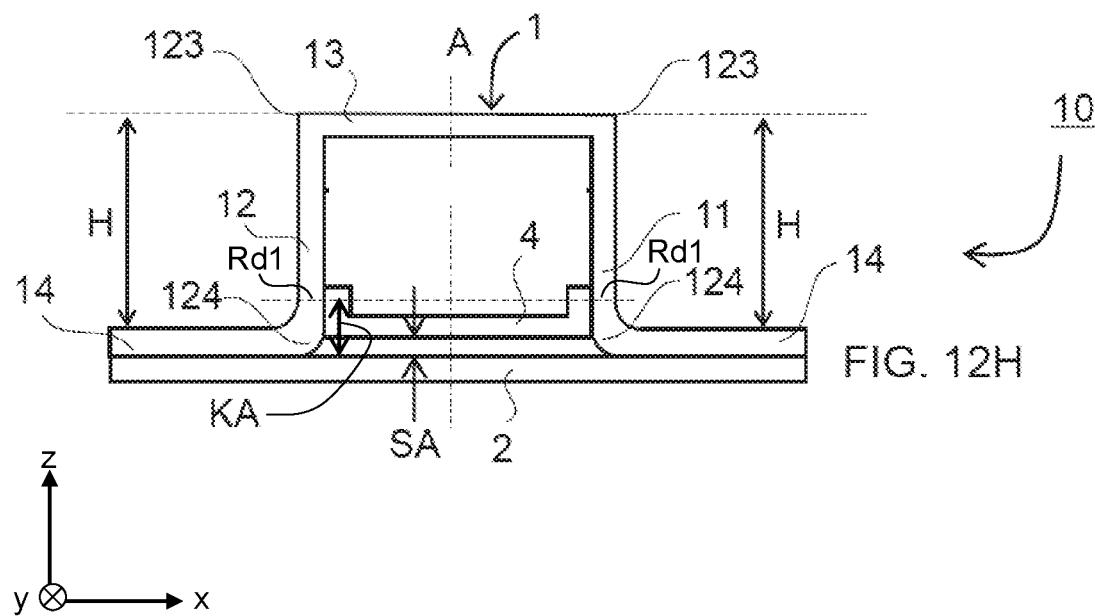
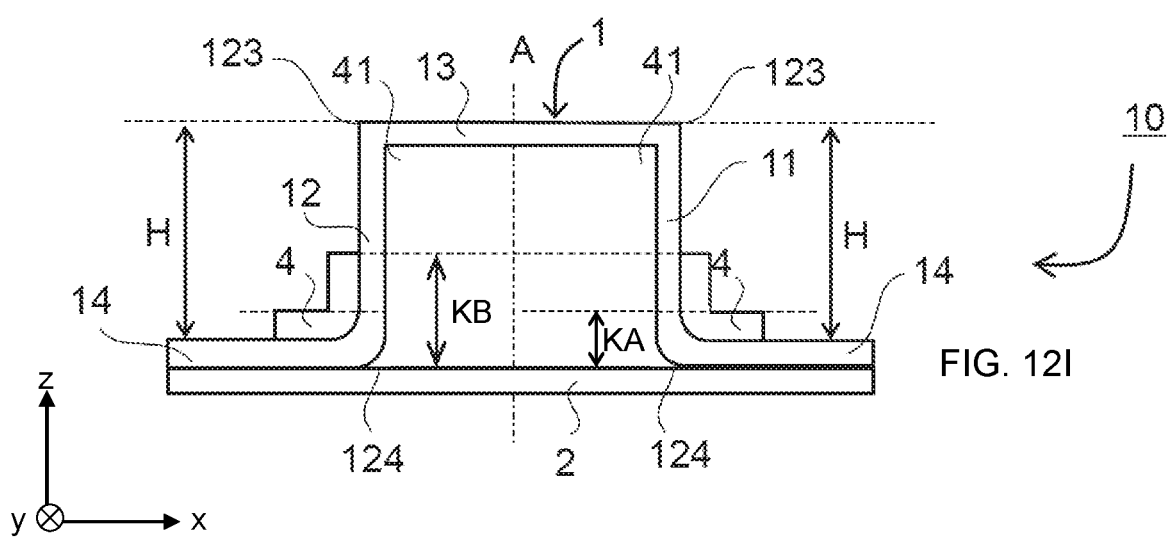

STRUCTURAL MEMBER, VEHICLE-BODY STRUCTURE AND BUMPER REINFORCEMENT

RELATED APPLICATION DATA

This application is a National Stage Application under 35 U.S.C. 371 of co-pending PCT application number PCT/JP2018/017161 designating the United States and filed Apr. 27, 2018; which claims the benefit of JP application number 2017-093890 and filed May 10, 2017 each of which are hereby incorporated by reference in their entireties.

TECHNICAL FIELD

The present disclosure relates to a structural member with impact resistance, and a vehicle-body structure and bumper member using such a structural member.

BACKGROUND ART

A structural member including a tubular portion composed of a hat member with a hat-shaped cross section and a closing plate joined to the hat member is used for various applications. Applications include, for example, the use of a structural member in a vehicle, a building, and a large container. Especially structural members used in automobiles are required to have impact resistance.

For example, WO 2005/058624 (Patent Document 1) discloses a metal pipe mounted on the vehicle body of an automobile with its both ends supported thereon to provide impact resistance. This metal pipe includes a bent portion along its entire length or along a partial length. The pipe is disposed in such a manner that the outer side of the bent portion receives an impact expected to be applied to the vehicle body, where the outer side is generally aligned with the impact. This metal pipe has a better impact resistance than a reinforcing member using a straight pipe to reinforce the vehicle body.

PRIOR ART DOCUMENTS

Patent Documents

Patent Document 1: WO 2005/058624

SUMMARY OF THE INVENTION

Problems to be Solved by the Invention

When a structural member having a tubular portion receives an impact exceeding its yield strength, it bends sharply such that the sharply bent portion protrudes. If one reduces the wall thickness of such a structural member in order to reduce its weight, the extent of protrusion occurring when it sharply bends upon an impact tends to be large. For example, a structural member used in an automobile preferably develops only a small extent of inward protrusion when it receives an impact from outside the vehicle. Thus, in a structural member, it may be preferable that the extent of protrusion of a portion that has deformed due to an impact from a crash be as small as possible.

To ensure strength for a structural member, reinforcing member may be provided on the structural member, covering part thereof. The above-discussed conventional technique does not teach a structural member including an reinforcing member for reducing the extent of protrusion of a portion when it deforms due to an impact.

In view of this, the present application discloses a technique for a structural member including an reinforcing member that can reduce the extent of protrusion upon deformation due to an impact.

Means for Solving the Problems

A structural member according to one aspect of the present disclosure includes a closed-cross-section structure and a reinforcing member attached to the closed-cross-section structure. The closed-cross-section structure includes at least one closing plate and a hat member. The hat member includes: a top-plate portion; two first ridges, each positioned on a respective one of both ends of the top-plate portion; two flanges joined to the closing plate; two second ridges, each positioned on an end of a respective one of the two flanges; and two side walls, each located between a respective one of the first ridges and a respective one of the second ridges. Heights of the two side walls as measured in a direction perpendicular to the top-plate portion are denoted by H1 and H2. Each of the two side walls includes a high-strength portion and a low-strength portion. The high-strength portion has a yield strength not lower than 500 MPa. The low-strength portion is adjacent to the high-strength portion in an extending direction of the first ridge. The low-strength portion has a yield strength of 60 to 85% of the yield strength of the high-strength portion. The reinforcing member is adjacent to at least a part of the top-plate portion of the hat member. Both ends of the reinforcing member as determined along the direction of extension of the first ridges are positioned to overlap the high-strength portions of the side walls. A boundary between the high-strength portion and the low-strength portion is from 1/3 of H1 to 3/2 of H1 and from 1/3 of H2 to 3/2 of H2 away from at least one of both ends of the reinforcing member in the extending direction of the first ridge.

Effects of the Invention

The present disclosure provides a structural member including an reinforcing member where the extent of protrusion upon deformation due to an impact can be reduced.

BRIEF DESCRIPTION OF THE DRAWINGS

FIG. 12H shows a variation of the structural member with a different positioning of the reinforcing member.

FIG. 12I shows a variation of the structural member with a different positioning of the reinforcing member.

EMBODIMENTS FOR CARRYING OUT THE INVENTION

Figure 1A:
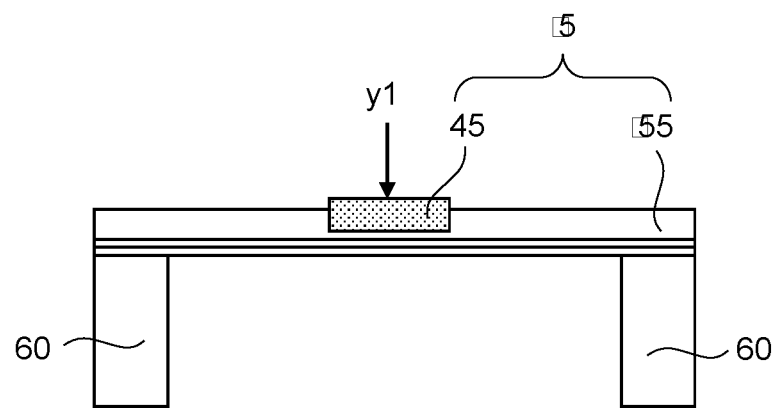
FIG. 1A illustrates an example construction of a structural member supported at both ends.

The inventors investigated the behavior, against an impact, of a structural member with a tubular portion, i.e. closed-cross-section structure (hereinafter sometimes referred to as "CCSS"), composed of a member having a hat-shaped cross section (hereinafter referred to as "hat member") and a closing plate joined to the hat member, the structural member having a reinforcing member (a reinforcing member can be called as a supplementary strengthening member (hereinafter sometimes referred to as "SSM")) provided thereon. FIG. 1A shows an example of a structural member 5 including a CCSS 55 composed of a hat member and a closing plate and an reinforcing member 45. In FIG. 1A, each of the two ends, as determined along the longitudinal direction, of the CCSS 55 are supported by a stand 60. An reinforcing member 45 is positioned on the middle portion, as determined along the longitudinal direction, of the CCSS 55. Thus, the structural member 5 usually constitutes part of a structure (such as a vehicle, building or container) with its both longitudinal ends supported thereon.

Figure 1B:
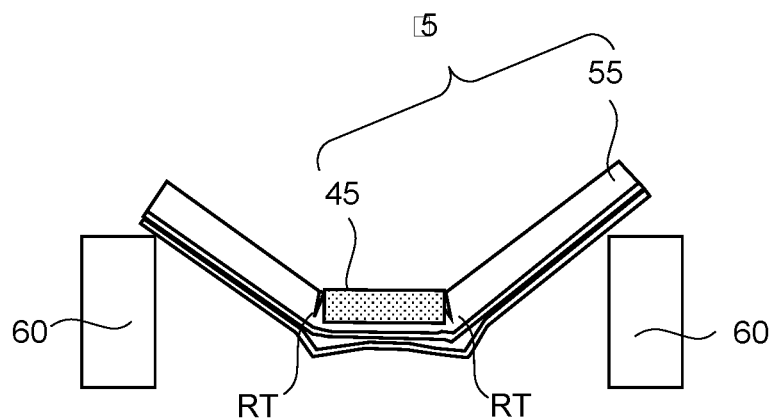
FIG. 1B illustrates an example deformation behavior of the structural member shown in FIG. 1A.

In view of this, the inventors investigated the deformation behavior of the structural member found when an impact in a direction perpendicular to the longitudinal direction (e.g. the direction of the arrow y1 in the example of FIG. 1A) is applied to the longitudinally middle portion of the structural member with its both ends supported. FIG. 1B shows how the structural member 5 of FIG. 1A, upon receiving an impact in the direction of the arrow y1, may deform. In the example shown in FIG. 1B, sharp bending occurs in the CCSS 55 at the positions RT near the two ends of the reinforcing member 45. Thus, in arrangements with an reinforcing member 45 on the CCSS 55, portions near the ends of the reinforcing member 45 tend to be sharply bent. It was found that such sharp bending near the ends of the reinforcing member 45 tends to increase the extent of protrusion in the structural member 5 derived from its deformation in the direction of an impact.

The inventors did research to find a construction that reduces sharp bending of portions near the two ends of the reinforcing member. During this research, they arrived at the idea of changing the strength distribution in the CCSS 55. The inventors examined various strength distributions in the structural member to reduce sharp bending near the reinforcing member.

The inventors did extended research on the material strength of, and the strength distribution in, the structural member and arrived at arrangements where the side walls of the structural member each include a high-strength portion with a yield strength of 500 MPa or higher and a low-strength portion with a strength lower than that of the high-strength portion, the low- and high-strength portions being arranged in the longitudinal direction. They found that, in such arrangements, positioning the reinforcing member at a position on a side wall associated with the high-strength portion and optimizing the distance between the reinforcing member and low-strength portion would reduce sharp bending near the ends of the reinforcing member. Based on this finding, they arrived at the structural members of the embodiments described below.

(Arrangement 1)

A structural member of Arrangement 1, according to some embodiments of the present invention, includes a closed-cross-section structure and a reinforcing member attached to the closed-cross-section structure. The closed-cross-section structure includes at least one closing plate and a hat member. The hat member includes: a top-plate portion; two first ridges, each positioned on a respective one of both ends of the top-plate portion; two flanges joined to the closing plate; two second ridges, each positioned on an end of a respective one of the two flanges; and two side walls, each located between a respective one of the first ridges and a respective one of the second ridges. Heights of the two side walls as measured in a direction perpendicular to the top-plate portion are denoted by H1 and H2. Each of the two side walls includes a high-strength portion and a low-strength portion. The high-strength portion has a yield strength not lower than 500 MPa. The low-strength portion is adjacent to the high-strength portion in an extending direction of the first ridge. The low-strength portion has a yield strength of 60 to 85% of the yield strength of the high-strength portion. The reinforcing member is adjacent to at least a part of the top-plate portion of the hat member. Both ends of the reinforcing member as determined along the direction of extension of the first ridges are positioned to overlap the high-strength portions of the side walls. A boundary between the high-strength portion and the low-strength portion is from 1/3 of H1 to 3/2 of H1 and from 1/3 of H2 to 3/2 of H2 away from at least one of both ends of the reinforcing member in the extending direction of the first ridge.

In Arrangement 1, the dimensions of the side walls as measured in the direction perpendicular to the top-plate portion, H1 and H2, are each defined as the distance between the first and second ridges of the associated side wall as measured in the direction perpendicular to the top-plate portion. The two flanges extend away from each other from the respective two ridges as seen in a cross section perpendicular to the second ridges. The direction perpendicular to the top-plate portion is represented by the direction perpendicular to the surface of the top-plate portion, i.e. the direction perpendicular to the top surface. In arrangement 1, the height direction of the side walls is defined as the direction perpendicular to the top-plate portion.

In Arrangement 1, each of the two side walls of the hat member includes a high-strength portion and a low-strength portion arranged in the direction of extension of the first ridges. Further, both ends of the reinforcing member overlap the high-strength portion of each side wall as determined along the direction of extension of the first ridges. This arrangement assumes that each of the high-strength portions of the two side walls overlaps both ends of the reinforcing member. Thus, the reinforcing member covers positions on the side walls associated with the high-strength portions. Further, for at least one of both ends of the reinforcing member, the boundary between high- and low-strength portions is positioned in a region starting at a position (H1)/3 and ending at a position 3(H1)/2 but at the same time in a region starting at a position (H2)/3 and ending at a position 3(H2)/2 away from that reinforcing member end in the extending direction of the first ridge. Thus, when an impact in the direction perpendicular to the top-plate portion from away from the top-plate portion is applied to a structural-member portion provided with the reinforcing member, deformation of portions of the side walls near at least one of the ends of the reinforcing member can be dispersed to the associated low-strength portion at an early stage. This will reduce the extent of sharp bending, as measured in the direction of the impact, of structural-member portions near the reinforcing member. That is, the structural member of Arrangement 1 exhibits reduced extent of deformation upon an impact from away from the top-plate portion of the hat member.

(Arrangement 2)

A structural member of Arrangement 2, according to some embodiments of the present invention, includes a closed-cross-section structure and a reinforcing member attached to the closed-cross-section structure. The closed-cross-section structure includes at least one closing plate and a hat member. The hat member includes: a top-plate portion; two first ridges, each positioned on a respective one of both ends of the top-plate portion; two flanges joined to the closing plate; two second ridges, each positioned on an end of a respective one of the two flanges; and two side walls, each located between a respective one of the first ridges and a respective one of the second ridges. Heights of the two side walls as measured in a direction perpendicular to the closing plate are denoted by H1 and H2. Each of the two side walls includes a high-strength portion and a low-strength portion. The high-strength portion has a yield strength not lower than 500 MPa. The low-strength portion is adjacent to the high-strength portion in an extending direction of the first ridge. The low-strength portion has a yield strength of 60 to 85% of the yield strength of the high-strength portion. The reinforcing member is adjacent to at least a part of the closing plate or at least a part of the two side walls of the hat member. Both ends of the reinforcing member as determined along the direction of extension of the first ridges are positioned to overlap the high-strength portions of the side walls. a boundary between the high-strength portion and the low-strength portion is from 1/3 of H1 to 3/2 of H1 and from 1/3 of H2 to 3/2 of H2 away from at least one of both ends of the reinforcing member in the extending direction of the first ridge.

In Arrangement 2, the dimensions of the side walls as measured in the direction perpendicular to the closing plate, H1 and H2, are each defined as the distance between the first and second ridges of the associated side wall as measured in the direction perpendicular to the closing plate. The two flanges extend away from each other from the respective second ridges as seen in a cross section perpendicular to the second ridges. The direction perpendicular to the closing plate is represented by the direction perpendicular to the surface of the closing plate. In Arrangement 2, the height direction of the side walls is defined as the direction perpendicular to the closing plate.

In Arrangement 2, each of the two side walls of the hat member includes a high-strength portion and a low-strength portion arranged in the direction of extension of the first ridges. Further, both ends of the reinforcing member overlap the high-strength portion of each side wall as determined along the direction of extension of the first ridges. Further, for at least one of both ends of the reinforcing member, the boundary between the high- and low-strength portions is positioned in a region starting at a position (H1)/3 and ending at a position 3(H1)/2 but at the same time in a region starting at a position (H2)/3 and ending at a position 3(H2)/2 away from the reinforcing member end in the extending direction of the first ridge. Thus, when an impact in the direction perpendicular to the closing plate from away from the closing plate is applied to a structural-member portion provided with the reinforcing member, deformation of portions of the side walls near at least one of the ends of the reinforcing member can be dispersed to the associated low-strength portions at an early stage. This will reduce the extent of sharp bending, as measured in the direction of the impact, of structural-member portions near the reinforcing member. That is, the structural member of Arrangement 2 exhibits reduced extent of deformation upon an impact from away from the closing plate.

In Arrangement 2, implementations where the reinforcing member is adjacent to at least a part of the closing plate include implementations where the reinforcing member is in contact with at least a part of the closing plate as well as implementations where the distance between the reinforcing member and at least a part of the closing plate is not larger than the height of the curved portion located between a flange and the associated side wall. Implementations where the reinforcing member is adjacent to at least a part of the two side walls include implementations where the reinforcing member is in contact with at least a part of the two side walls as well as implementations where the distance between the reinforcing member and at least a part of the two side walls is not larger than the height of the curved portion located between a flange and the associated side wall. Structural-member portions provided with the reinforcing member exhibit a smaller extent of deformation upon an impact from away from the closing plate. In Arrangement 2, the height of the curved portion is measured in the direction perpendicular to the closing plate.

The reinforcing member of Arrangement 2 may be, for example, adjacent to regions each extending from at least a part of the associated one of the two side walls and via the associated second ridge to the associated flange. Alternatively, the reinforcing member may be adjacent to regions of the two side walls each extending from the associated second ridge by a first distance. The first distance is represented by the radius of curvature of the curved portion between a flange and a side wall.

The reinforcing member of Arrangement 2 may be adjacent to both the closing plate and side walls. As an example, the closing plate may have a recessed portion recessed inwardly with respect to the CCSS. In such implementations, the reinforcing member may be located inside the CCSS to be adjacent to both the recessed portion of the closing plate and the two side walls. In such arrangements, the depth of the recessed portion as measured in the direction perpendicular to the closing plate is not larger than $2/5$, i.e. 40%, of the smaller one of the distances between the first ridges, on one hand, and the second ridges, on the other hand, of the two side walls.

(Arrangement 3)

A structural member of Arrangement 3, according to some embodiments of the present invention, includes a closed-cross-section structure and a reinforcing member attached to the closed-cross-section structure. The closed-cross-section structure includes at least one closing plate and a grooved member. The grooved member includes: a top-plate portion; two first ridges, each positioned on a respective one of both ends of the top-plate portion; two joints joined to the closing plate; and two side walls, each located between a respective one of the first ridges and a respective one of the joints. Heights of the two side walls as measured in a direction perpendicular to the top-plate portion are denoted by H1 and H2. Each of the two side walls includes a high-strength portion and a low-strength portion. The high-strength portion has a yield strength not lower than 500 MPa. The low-strength portion is adjacent to the high-strength portion in an extending direction of the first ridge. The low-strength portion has a yield strength of 60 to 85% of the yield strength of the high-strength portion. The reinforcing member is adjacent to at least a part of the top-plate portion of the hat member. Both ends of the reinforcing member as determined along the direction of extension of the first ridges are positioned to overlap the high-strength portions of the side walls. A boundary between the high-strength portion and the low-strength portion is from 1/3 of H1 to 3/2 of H1 and from 1/3 of H2 to 3/2 of H2 away from at least one of both ends of the reinforcing member in the extending direction of the first ridge.

In Arrangement 3, the dimensions of the side walls as measured in the direction perpendicular to the top-plate portion, H1 and H2, are each defined as the distance between the first ridge of the associated side wall as measured in the direction perpendicular to the top-plate portion and a joint line (or imaginary line) connecting portions of the joint and extending in the direction of extension of the first ridges. In Arrangement 3, the height direction of the side walls is defined as the direction perpendicular to the top-plate portion.

The structural member of Arrangement 3 is different from that of Arrangement 1 in that no flanges are provided. That is, the hat member of Arrangement 1 corresponds to the grooved member of Arrangement 3. Similar to the structural member of Arrangement 1, the structural member of Arrangement 3 exhibits reduced extent of deformation upon an impact from away from the top-plate portion of the grooved member.

(Arrangement 4)

A structural member of Arrangement 4, according to some embodiments of the present invention, includes a closed-cross-section structure and a reinforcing member attached to the closed-cross-section structure. The closed-cross-section structure includes at least one closing plate and a grooved member. The grooved member includes: a single top-plate portion; two first ridges, each positioned on a respective one of both ends of the top-plate portion; a flange joined to the closing plate; a single second ridge on an end of the flange; a first side wall located between one of the first ridges and the second ridge; a joint joined to the closing plate; and a second side wall located between the other first ridge and the joint. A height of the first side wall as measured in a direction perpendicular to the top-plate portion is denoted by H1. A height of the second side wall as measured in the direction perpendicular to the top-plate portion is denoted by H2. Each of the first side wall and the second side wall includes a high-strength portion and a low-strength portion. The high-strength portion has a yield strength not lower than 500 MPa. The low-strength portion is adjacent to the high-strength portion in an extending direction of the first ridge. The low-strength portion has a yield strength of 60 to 85% of the yield strength of the high-strength portion. The reinforcing member is adjacent to at least a part of the top-plate portion of the hat member. Both ends of the reinforcing member as determined along the direction of extension of the first ridges are positioned to overlap the high-strength portions of the first side wall and the second side wall. A boundary between the high-strength portion and the low-strength portion is from 1/3 of H1 to 3/2 of H1 and from 1/3 of H2 to 3/2 of H2 away from at least one of both ends of the reinforcing member in the extending direction of the first ridge.

In Arrangement 4, the side-wall dimension H1 is defined as the distance between the first ridge and the second ridge of the first side wall as measured in the direction perpendicular to the top-plate portion. The side-wall dimension H2 is defined as the distance between a joint line (or imaginary line) connecting portions of the joint of the second side wall and extending in the direction of extension of the first ridge and the first ridge as measured in the direction perpendicular to the top-plate portion. In Arrangement 4, the height direction of the side walls is defined as the direction perpendicular to the top-plate portion.

The structural member of Arrangement 4 is a variation of Arrangement 3. While Arrangement 3 provides no flanges on the ends of the grooved member, Arrangement 4 provides a flange on one of the two ends of the grooved member and no flange on the other end. Similar to the structural members of Arrangements 1 and 3, the structural member of Arrangement 4 exhibits reduced extent of deformation upon an impact from away from the top-plate portion of the grooved member.

In Arrangements 1, 3 and 4, implementations where the reinforcing member is adjacent to at least a part of the top-plate portion include implementations where the reinforcing member is in contact with at least a part of the top-plate portion as well as implementations where the distance between the reinforcing member and at least a part of the top-plate portion is not larger than the height of the curved portion located between the top-plate portion and a side wall. Structural-member portions provided with the reinforcing member exhibit a smaller extent of deformation upon an impact from away from the top-plate portion. In Arrangements 1, 3 and 4, the height of the curved portion is measured in the direction perpendicular to the top-plate portion.

Further, in Arrangements 1, 3 and 4, the reinforcing member may be adjacent to both the top-plate portion and the side walls. As an example, the top-plate portion may have a recessed portion recessed inwardly with respect to the CCSS. In such implementations, the reinforcing member may be located inside the CCSS to be adjacent to the recessed portion of the top-plate portion and to the two side walls. In such arrangements, the depth of the recessed portion of the top-plate portion as measured in the direction perpendicular to the top-plate portion is not larger than $2/5$, i.e. 40%, of the smaller one of the distances between the first ridges, on one hand, and the second ridge(s), on the other hand, of the two side walls.

(Arrangement 5)

Arrangement 5 will be described. Starting from one of Arrangements 1 to 4, it is preferable that a dimension of each of the low-strength portions as measured in the direction of extension of the first ridges be not smaller than 3/5 of H1 and not smaller than 3/5 of H2. This will further reduce the extent of deformation of the structural member upon an impact on the high-strength portions.

(Arrangement 6)

Arrangement 6 will be described. Starting from one of Arrangements 1 to 5, it is preferable that low-strength portions be located next to both ends of each of the high-strength portions in an extending direction of the first ridge. Upon an impact on the structural member, deformation of portions of the side walls located on either end of the reinforcing member may be dispersed to the associated low-strength portions at an early stage.

In Arrangement 6, the reinforcing member may be located to overlap, as determined along the direction of extension of the first ridges, the middle of the low-strength portions on both ends of the high-strength portion of each of the two side walls.

(Arrangement 7)

Arrangement 7 will be described. Starting from one of Arrangements 1 to 6, it is preferable that the supplementary strengthening member be located in a middle, as determined along the direction of extension of the first ridges, of the closed-cross-section structure. Moments caused by an impact tend to be large in the middle, as determined along the direction of extension of the first ridges, of the closed-cross-section structure. If high-strength portions are positioned in the middle of the structural member as determined along the direction of extension of the first ridges and low-strength portions are provided on both sides thereof, as in Arrangement 7, this will efficiently reduce deformation of the structural member upon an impact.

(Arrangement 8)

Arrangement 8 will be described. Starting from one of Arrangements 1, 3 and 4, The side wall may include a first side-wall end and a second side-wall end. The first side-wall end may be adjacent to the first ridge. The second side-wall end may be opposite to the first ridge. A distance between an end of the low-strength portion on the first ridge side and the first ridge in a direction from the first side-wall end to the second side-wall end is smaller than $1/4$ of a distance between the first side-wall end and the second side-wall end. It is preferred that A dimension of the low-strength portion in the direction from the first side-wall end to the second side-wall end is not smaller than $1/5$ of the distance between the first side-wall end and the second side-wall end. A portion of the side wall between the end of the low-strength portion on the first ridge side and the first ridge may have a yield strength not lower than 500 MPa and higher than a yield strength of the low-strength portion.

Arrangement 8 will efficiently reduce deformation of the structural member upon an impact on the top-plate portion.

In Arrangement 8, if a side wall is located between a first ridge and a second ridge, the first ridge constitutes the first side-wall end and the second ridge constitutes the second side-wall end. Thus, the distance between the first side-wall end and the second side-wall end coincides with the distance between the first and second ridges. If a side wall is located between a first ridge and a joint, the first ridge constitutes the first side-wall end and a joint line connecting portions of the joint and extending in the direction of extension of the first ridge constitutes the second side-wall end. Thus, the distance between the first side-wall end and the second side-wall end is defined as the distance between the first ridge and the joint line.

(Arrangement 9)

Arrangement 9 will be described. Starting from Arrangement 2, the side wall may include a first side-wall end and a second side-wall end. The first side-wall end is opposite to the first ridge. The second side-wall end is adjacent to the first ridge. It is preferred that a distance between an end of the low-strength portion on the first ridge side and the first ridge in a direction from the first side-wall end to the second side-wall end is smaller than $1/4$ of a distance between the first side-wall end and the second side-wall end. It is preferred that a dimension of the low-strength portion in the direction from the first side-wall end to the second side-wall end is not smaller than ⅕ of the distance between the first side-wall end and the second side-wall end A portion of the side wall between the end of the low-strength portion on the first ridge side and the first ridge may have a yield strength not lower than 500 MPa and higher than a yield strength of the low-strength portion.

Arrangement 9 will efficiently reduce deformation of the structural member upon an impact on the closing plate.

In Arrangement 9, if a side wall is located between a first ridge and a second ridge, the second ridge constitutes the first side-wall end and the first ridge constitutes the second side-wall end. Thus, the distance between the first side-wall end and the second side-wall end coincides with the distance between the first and second ridges. If a side wall is located between a first ridge and a joint, a joint line connecting portions of the joint and extending in the direction of extension of the first ridge constitutes the first side-wall end and the first ridge constitutes the second side-wall end. Thus, the distance between the first side-wall end and the second side-wall end is defined as the distance between the first ridge and the joint line.

(Arrangement 10)

Arrangement 10 will be described. Starting from one of Arrangements 1, 3, 4 and 8, it is preferable that the structural member be curved to protrude from the top-plate portion. This will prevent the structural member from deforming upon an impact on the top-plate portion.

(Arrangement 11)

Arrangement 11 will be described. Starting from Arrangement 2 or 10, it is preferable that the structural member be curved to protrude from the closing plate. This will prevent the structural member from deforming upon an impact on the closing plate.

(Arrangement 12)

Arrangement 12 will be described. Starting from one of Arrangements 1 to 11, as seen in a cross section perpendicular to the direction of extension of the first ridges, at least a part of an imaginary line segment connecting joint portions between the closing plate and the hat member or the grooved member may be located between the top-plate portion and the closing plate. In Arrangement 12, the closing plate includes a pair of overlapping portions overlapping the hat member or the grooved member and an intermediate portion located between the pair of overlapping portions. The intermediate portion protrudes from the overlapping portions in a direction away from the hat member or grooved member.

(Arrangement 13)

Arrangement 13 will be described. Arrangement 13 is a vehicle-body structure including the structural member of any one of Arrangements 1 to 12. In Arrangement 13, the reinforcing member is a center pillar and the CCSS is a locker or a roof rail. The vehicle-body structure of Arrangement 13 is an example embodiment of the present invention.

(Arrangement 14)

Arrangement 14 will be described. Arrangement 14 is a bumper reinforcement including the structural member of any one of Arrangements 1 to 12. The bumper reinforcement of Arrangement 14 is also an example embodiment of the present invention.

Any one of the structural members of Arrangements 1 to 12 may be, for example, attached to another member (such as a member forming part of the vehicle body). In such implementations, the top-plate portion or closing plate may include two connections provided at two locations separated in the direction of extension of the first ridges, the two connections being to be connected to the other member. In such implementations, the distance between the two connections as measured in the direction of extension of the first ridges may be not smaller than 6 times H1 and 6 times H2. In such implementations, the high-strength portion is preferably positioned in the middle between the two connections. In such implementations, the reinforcing member is also positioned in the middle between the two connections. This will efficiently reduce deformation of the structural member upon an impact. Specifically, the inventors found that, if the distance between the two connections is not smaller than 6 times the side-wall height H1 and not smaller than 6 times H2, the load of moments is largest when an impact has been applied to the structural-member portion in the middle between the connection members. In such constructions, the portion with large moment load may be reinforced by the high-strength portion and reinforcing member and the extent of deformation upon an impact near the reinforcing member may be reduced.

Structural members are often used with both ends of its CCSS being supported on another member. As such, it is preferable that the dimension of the CCSS as measured in the direction of extension of the first ridges be not smaller than 6 times the side-wall height H1 and not smaller than 6 times H2 and a high-strength portion and reinforcing member be positioned in the middle of the CCSS as determined along the direction of extension of the first ridges. Thus, the portion with large moment load may be reinforced by the high-strength portion and reinforcing member and the extent of deformation upon an impact near the reinforcing member may be reduced.

In one of the structural members of Arrangements 1 to 12, for at least one of both ends of the reinforcing member, the boundary between the high- and low-strength portions is preferably positioned in an overlap between a region starting at a position 1/3 of H1, and ending at a position H1, distant from the reinforcing member, on one hand, and a region starting at a position 1/3 of H2, and ending at a position H2, distant from the reinforcing member, on the other, as determined along the direction of extension of the first ridges. This will further reduce the extent of sharp bending in the direction of an impact as measured in and near the reinforcing member.

In Arrangements 1 to 12, an reinforcing member may be provided on the outside or inside of the CCSS, or each of the outside and inside. Further, at least the end portions of the reinforcing member are required to overlap the high-strength portion as determined along the direction of extension of the first ridges. For example, a side-wall portion with a lower yield strength than the high-strength portion may be present at a position that overlaps an reinforcing member portion other than the end portions as determined along the direction of extension of the first ridges. The reinforcing member is fixed to the CCSS. For example, the reinforcing member is fixed to the CCSS by welding (including spot welding, laser welding and other welding techniques), by means of adhesives, or by brazing.

The structural members of Arrangements 1, 3 and 4 exhibit small extents of deformation upon an impact applied to the top-plate portion of the hat member. Thus, they may be suitably used as structural members with their top-plate portion serving as the impact-receiving surface (hereinafter referred to as "regular-hat member"). The structural member of Arrangement 2 exhibits a small extent of deformation upon an impact applied to the closing plate. Thus, it may be suitably used as a structural member with its closing plate serving as the impact-receiving surface (hereinafter referred to as "inverted-hat member").

EMBODIMENTS

Figure 2A:
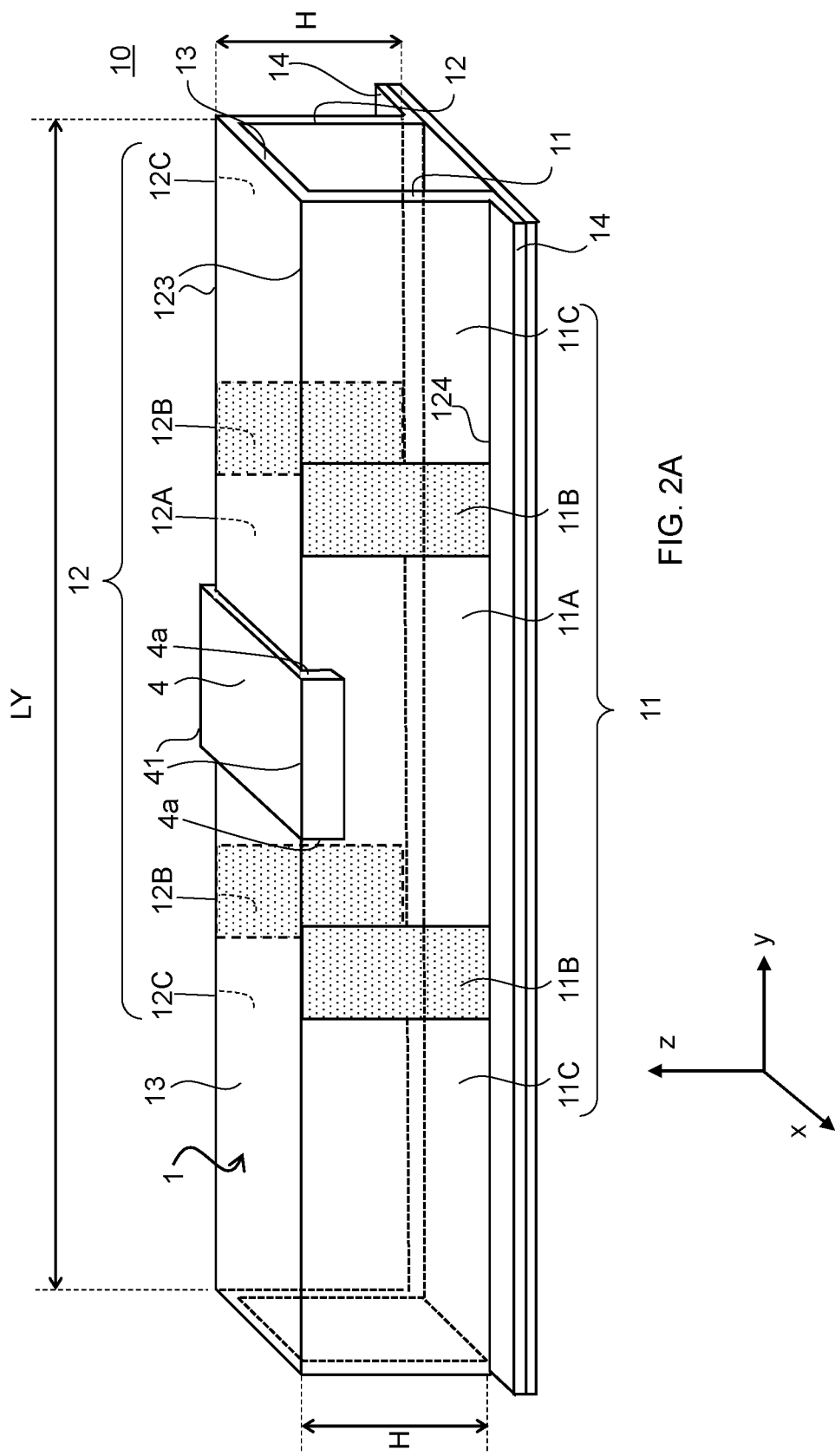
FIG. 2A is a perspective view of a structural member according to some embodiments.
Figure 2B:
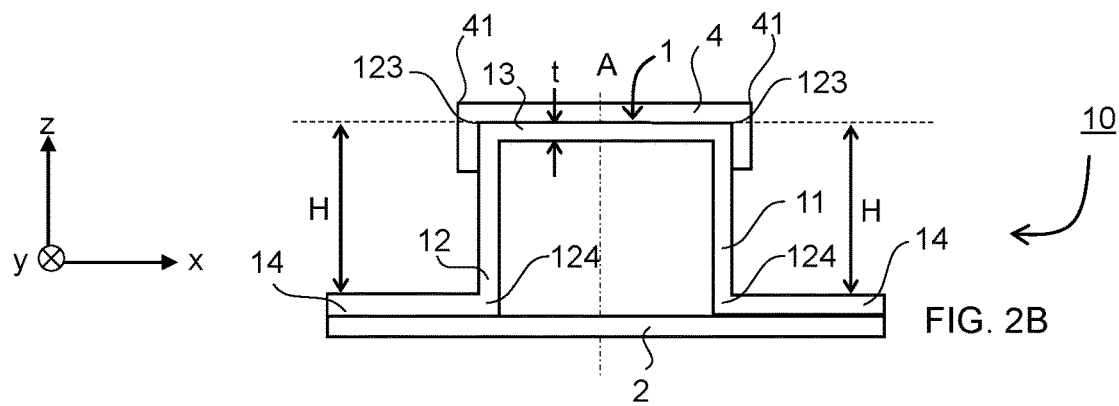
FIG. 2B is a front view of the structural member of FIG. 2A as viewed in the y-direction.
Figure 2C:
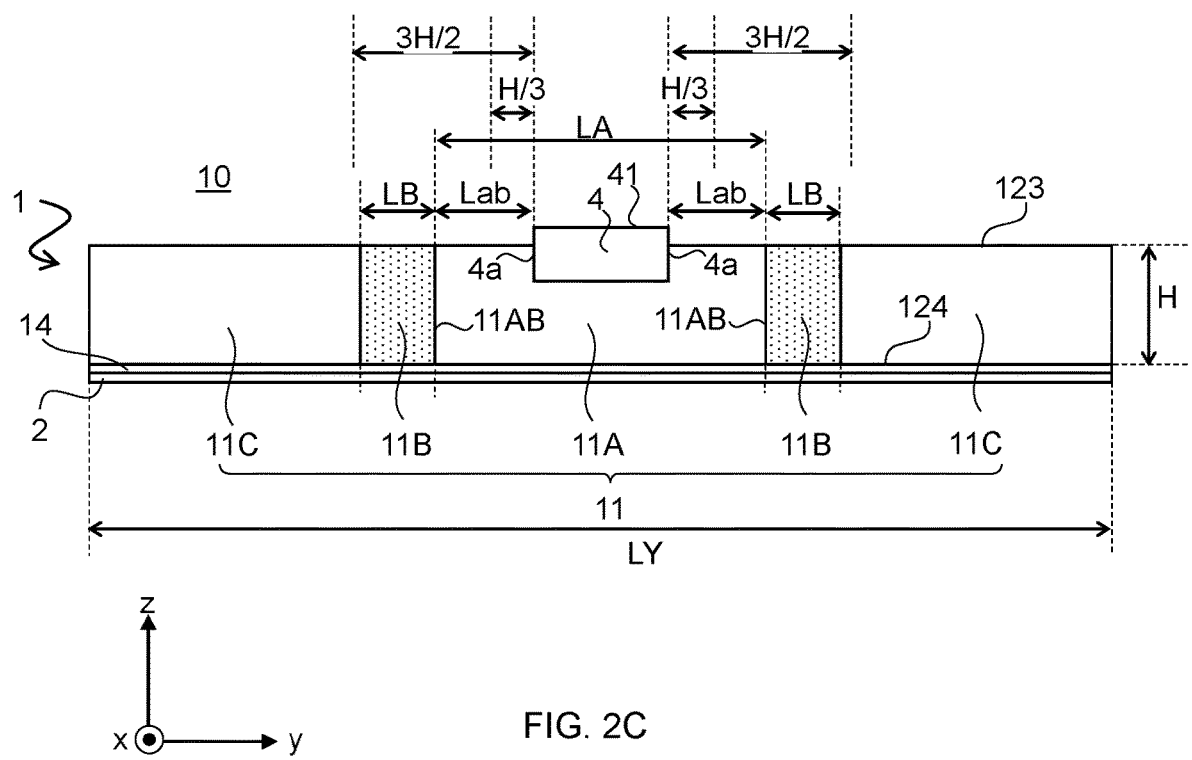
FIG. 2C is a side view of the structural member of FIG. 2A as viewed in the x-direction.

FIG. 2A is a perspective view of a structural member 10 according to some embodiments. FIG. 2B is a side view of the structural member 10 of FIG. 2A as viewed in the longitudinal direction (i.e., in the y-direction). FIG. 2C is a side view of the structural member 10 of FIG. 2A as viewed in the direction perpendicular to the longitudinal direction (i.e., in the x-direction).

The structural member 10 shown in FIGS. 2A to 2C includes a hat member 1 with a hat-shaped cross section and a closing plate 2 joined to the hat member 1. The hat member 1 and closing plate 2 form a tubular closed-cross-section structure, or CCSS. A reinforcing member, or reinforcing member, 4 is provided on the CCSS. In the implementation shown in FIGS. 2A to 2C, the reinforcing member 4 is attached to the hat member 1. That is, the structural member 10 includes a CCSS formed by the hat member 1 and closing plate 2 and an reinforcing member 4.

As shown in FIG. 2A, the hat member 1 includes a top-plate portion 13, a pair of side walls 11 and 12, and a pair of flanges 14. The pair of side walls 11 and 12 extend from the two ends of the top-plate portion 13 and face each other. Each of the side walls 11 and 12 has the first end adjacent to the top-plate portion 13 and the second end opposite to the first end, and each of the pair of flanges 14 of the side walls 11 and 12 extends from the second end of the associated one of the side walls 11 and 12 outwardly as determined along the direction in which the side walls 11 and 12, facing each other, are arranged. The closing plate 2 is joined to the pair of flanges 14.

The border (or shoulder) 123 between the top-plate portion 13 and each of the side walls 11 and 12 forms a first ridge 123 extending in the longitudinal direction of the CCSS. The longitudinal direction of the CCSS coincides with the direction of extension of the first ridges 123. The border (or shoulder) 124 between a flange 14 and the associated one of the side walls 11 and 12 forms a second ridge 124 extending in the longitudinal direction of the CCSS. In the present implementation, the longitudinal direction of the CCSS coincides with the direction of extension of the second ridges 124. The longitudinal direction of the CCSS need not coincide with the direction of extension of the second ridges 124.

Both the height of the one side wall 11 and the height of the other side wall 12 are H. The height of the side walls 11 and 12 is defined as the distance between the first and second ridges 123 and 124 as measured in the direction perpendicular to the top-plate portion 13 (i.e. in the z-direction).

The longitudinal direction of the CCSS (i.e. tubular portion) may also be referred to as axial direction of the tubular portion or longitudinal direction of the tubular portion. In the implementation shown in FIG. 2A, the longitudinal direction of the CCSS is represented by the y-direction, and is the same as the longitudinal direction of the structural member 10. Further, the longitudinal direction of the CCSS is the same as the direction of the central axis of the tubular portion (i.e. axis).

The dimension of the structural member 10 as measured in the direction of extension of the first and second ridges 123 and 124 (i.e. in the y-direction) is larger than the dimension of the structural member 10 as measured in the direction in which the side walls 11 and 12, facing each other, are arranged (i.e. in the x-direction). Further, the length of the CCSS formed by the hat member 1 and closing plate 2 (i.e. entire dimension in the longitudinal direction), LY, is not smaller than 6 times the height of the side walls 11 and 12, H, i.e. not smaller than 6H (LY≥6H).

Each of the side walls 11 and 12 includes a high-strength portion 11A or 12A and low-strength portions 11B or 12B. For each of the side walls 11 and 12, the high-strength portion 11A or 12A and low-strength portions 11B and 12B are arranged in the direction of extension of the first ridges 123 (i.e. in the y-direction). In the present implementation, for each of the side walls 11 and 12, a high-strength portion 11A or 12A is positioned between two low-strength portions 11B arranged in the direction of extension of the first ridges 123 (i.e. in the y-direction).

The high-strength portions 11A and 12A are formed from portions of the pair of side walls 11 and 12 that face each other. That is, the high-strength portion 11A of the one side wall 11 and the high-strength portion 12A of the other side wall 12 are positioned to face each other. The pairs of low-strength portions 11B and 12B are also formed from portions of the pair of side walls 11 and 12 that face each other. That is, the pair of low-strength portions 11B of the one side wall 11 and the pair of low-strength portions 12B of the other side wall 12 are positioned to face each other.

The reinforcing member 4 is positioned to overlap the high-strength portions 11A and 12A of the pair of side walls 11 and 12 in an extending direction of the first ridge 123 (in the y-direction). The reinforcing member 4 is in contact with the top-plate portion 13 and the pair of side walls 11 and 12. The reinforcing member 4 may be in contact with the first ridges 123 on the two ends of the top-plate portion 13, or may not be in contact therewith. The reinforcing member 4 is formed from a plate that is bent along two lines in the same direction as the first ridges 123. The bent portions of the reinforcing member 4 represent ridges 41. That is, the reinforcing member 4 has two ridges 41. The two ridges on the reinforcing member 4 may be in contact with the two first ridges 123 of the hat member 1, or may not be in contact therewith.

In an extending direction of the first ridges 123 (i.e. y-direction), both ends 4a of the reinforcing member 4 overlap the high-strength portions 11A and 12A of the side walls 11 and 12. That is, the reinforcing member 4 is positioned in a region that overlaps the high-strength portions 11A and 12A as determined along the direction of extension of the first ridges 123. In the implementation shown in FIGS. 2A to 2C, both ends 4a of the reinforcing member 4 overlap the high-strength portions 11A and 12A of the side walls 11 and 12 as viewed in the direction perpendicular to the surfaces of the side walls 11 and 12 (i.e. in the x-direction). Further, part of the reinforcing member 4 is in contact with part of each of the high-strength portions 11A and 12A of the side walls 11 and 12. The reinforcing member 4 is not in contact with the low-strength portions 11B or 12B. The reinforcing member 4 is fixed to the CCSS by, for example, spot welding.

As shown in FIG. 2C, the boundary between the high-strength portion 11A and a low-strength portion 11B, 11AB, is positioned between a position 1/3 of H distant from the associated one of the ends 4a of the reinforcing member 4 and a position 3/2 of H distant from the same end as determined along the direction of extension of the first ridges 123 away from the reinforcing member 4 in the direction of extension of the first ridges 123 (i.e. in the y-direction). That is, the distance between each of the ends of the reinforcing member 4 and the associated boundary 11AB, LaB, away from the reinforcing member 4 in the direction of extension of the first ridges 123 satisfies (1/3)H≤LaB≤(3/2)H. In other words, the boundary 11AB between the high-strength portion 11A and a low-strength portion 11B is positioned between positions (1/3)H to (3/2)H distant from the associated end of the reinforcing member 4 toward the outside the reinforcing member 4 in the longitudinal direction of the CCSS.

Similar to the boundaries in the side wall 11, the boundary between the high-strength portion 12A and a low-strength portion 12B of the other side wall 12, not shown in FIG. 2C, is positioned between positions (1/3)H to (3/2)H distant from the reinforcing member 4 in the direction of the first ridges 123 away from the associated one of the ends 4a to the reinforcing member 4.

As the reinforcing member 4 and the high-strength portions 11A and 12A and low-strength portions 11B and 12B of the side walls 11 and 12 are positioned as discussed above, deformation caused by an impact load can be dispersed to the low-strength portions 11B and 12B to prevent such deformation from being concentrated near the ends 4a of the reinforcing member 4. Then, if the high-strength portions 11A and 12A have a yield strength not lower than 500 MPa (or a yield strength not lower than 980 MPa) and the ratio of the strength of the low-strength portions 11B to the strength of the high-strength portions 11A and 12A is 60 to 85%, deformation caused by an impact on the high-strength portions 11A and 12A can be dispersed to the low-strength portions 11B and 12B at an early stage. This will reduce sharp-bending deformation of the structural member 10 due to an impact.

Starting from the implementation shown in FIG. 2C, if the distance LaB satisfies (1/3)H≤LaB≤H, this will further reduce sharp-bending deformation of the structural member due to an impact.

In FIGS. 2A to 2C, the strength of, and the strength distribution in, the flanges 14 are not limited to particular ones, because the strength of the flanges 14 does not significantly affect the performance of the structural member 10.

In the implementation shown in FIGS. 2A to 2C, the low-strength portions 11B and 12B are provided outward of the two ends 4a of the reinforcing member 4 as determined along the direction of extension of the first ridges 123. That is, two pairs of low-strength portions 11B and 12B are provided in the respective side walls 11 and 12. That is, for the one side wall 11, a pair of low-strength portions 11B are provided on both sides of the high-strength portion 11A. For the other side wall 12, a pair of low-strength portions 12B are provided on both sides of the high-strength portion 12A.

Figure 2D:
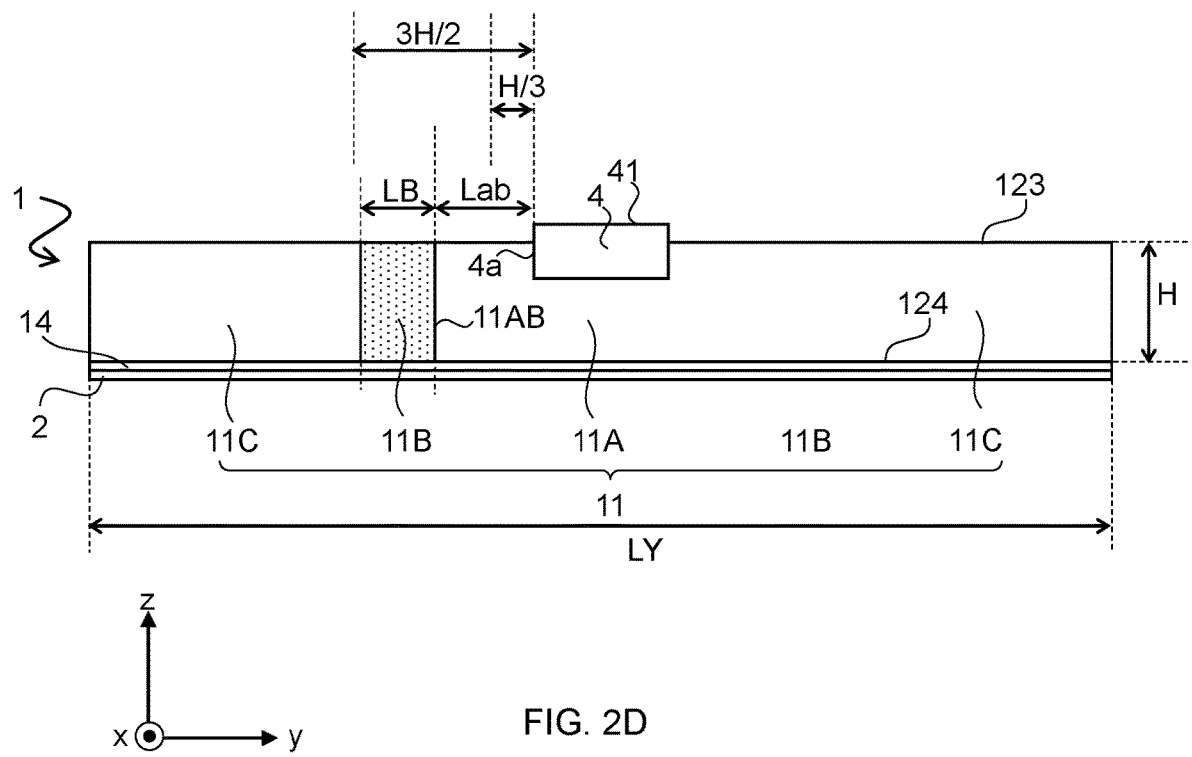
FIG. 2D is a side view of a variation of the structural member with a different positioning of the high- and low-strength portions.

The positioning of the low-strength portions is not limited to the above-discussed implementation shown in FIGS. 2A to 2C. For example, for at least one of the two side walls 11 and 12, a low-strength portion may be positioned only on one side of the high-strength portion 11A or 12A. FIG. 2D is a side view of an implementation where a low-strength portion 11B is provided only on one side of the high-strength portion 11A. As shown in FIG. 2D, the low-strength portion may only be provided in a region between positions (1/3)H to (3/2)H away from one of the two ends 4a of the reinforcing member 4. This will also reduce the extent of deformation of a member portion near one of the ends of the reinforcing member 4.

The yield strength of the low-strength portions 11B and 12B is 60 to 85% (not lower than 60% and not higher than 85%) of the yield strength of the high-strength portions 11A and 12A. Similarly, the tensile strength of the low-strength portions 11B and 12B is preferably 60 to 85% of the tensile strength of the high-strength portions 11A and 12A. This will further reduce the extent of deformation caused by an impact even when the increase in strength due to deformation (work hardening) is taken into consideration.

The portions of the side walls 11 and 12 other than the high-strength portions 11A and 12A and low-strength portions 11B and 12B, 11C and 12C, in other words, the portions 11C and 12C located outward of the low-strength portions 11B and 12B as determined along the direction of extension of the first ridges 123 (i.e. along the y-direction), have a yield strength not lower than that of the low-strength portions 11B and 12B. For example, the yield strength of these portions 11C and 12C may be equal to the yield strength of the low-strength portions 11B and 12B. Alternatively, the yield strength of the portions 11C and 12C may be equal of the yield strength of the high-strength portions 11A and 12A. In the present implementation, the low-strength portions 11B and 12B are portions with a lower yield strength than the surrounding portions.

Further, as determined along the direction of extension of the first ridges 123 (i.e. along the y-direction), some of those portions of the side walls 11 and 12 which overlap the reinforcing member 4, located between the two ends 4a of the reinforcing member 4, may not be part of the high-strength portions. That is, as determined along the longitudinal direction of the CCSS (i.e. along the y-direction), the portions of the side walls 11 and 12 that overlap the central portions, located inward of the two ends 4a of the reinforcing member 4, may have a yield strength not higher than the yield strength of the high-strength portions or a yield strength not higher than the yield strength of the low-strength portions.

In the structural member 10 discussed above, the hat member 1 and closing plate 2 have the same dimension as measured in the longitudinal direction (i.e. in the y-direction), that is, as measured in the direction of extension of the first ridges 123. Further, the ends of the hat member 1 and closing plate 2 are aligned in position as determined along the longitudinal direction. In such implementations, the dimension of the CCSS as measured in the longitudinal direction (i.e. in the y-direction) is equal to the dimension of the structural member 10 as measured in the longitudinal direction (i.e. in the y-direction). Alternatively, as measured in the longitudinal direction of the CCSS, the dimension of the hat member 1 and the dimension of the closing plate 2 may be different from each other. Further, the ends of the hat member 1 and closing plate 2 may not be aligned in position as determined along the longitudinal direction. That is, as measured in the longitudinal direction of the CCSS, the dimension of the structural member 10 and the dimension of the CCSS may be different from each other.

Figure 3:
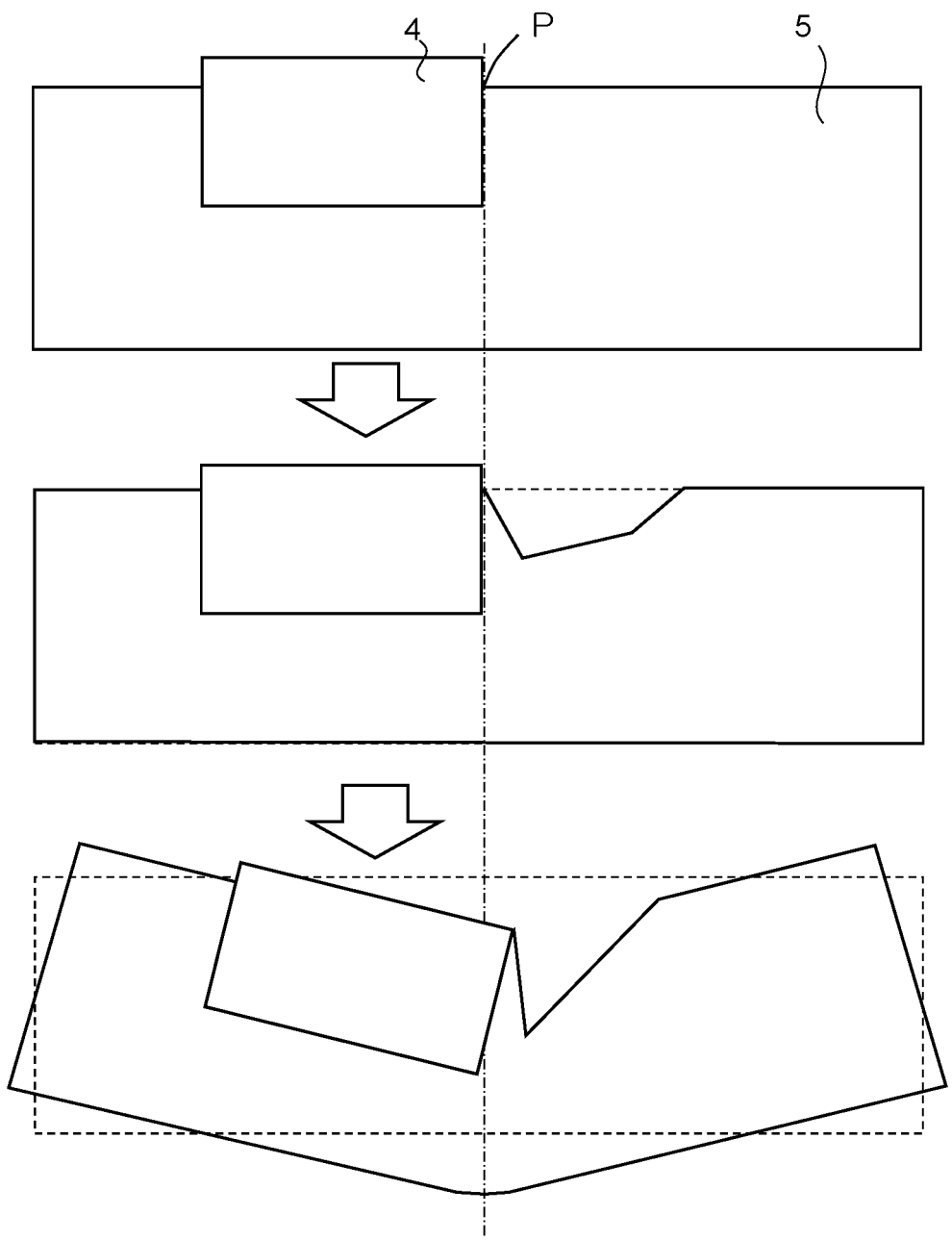
FIG. 3 illustrates a deformation behavior of a structural member with a uniform strength distribution.
Figure 4:
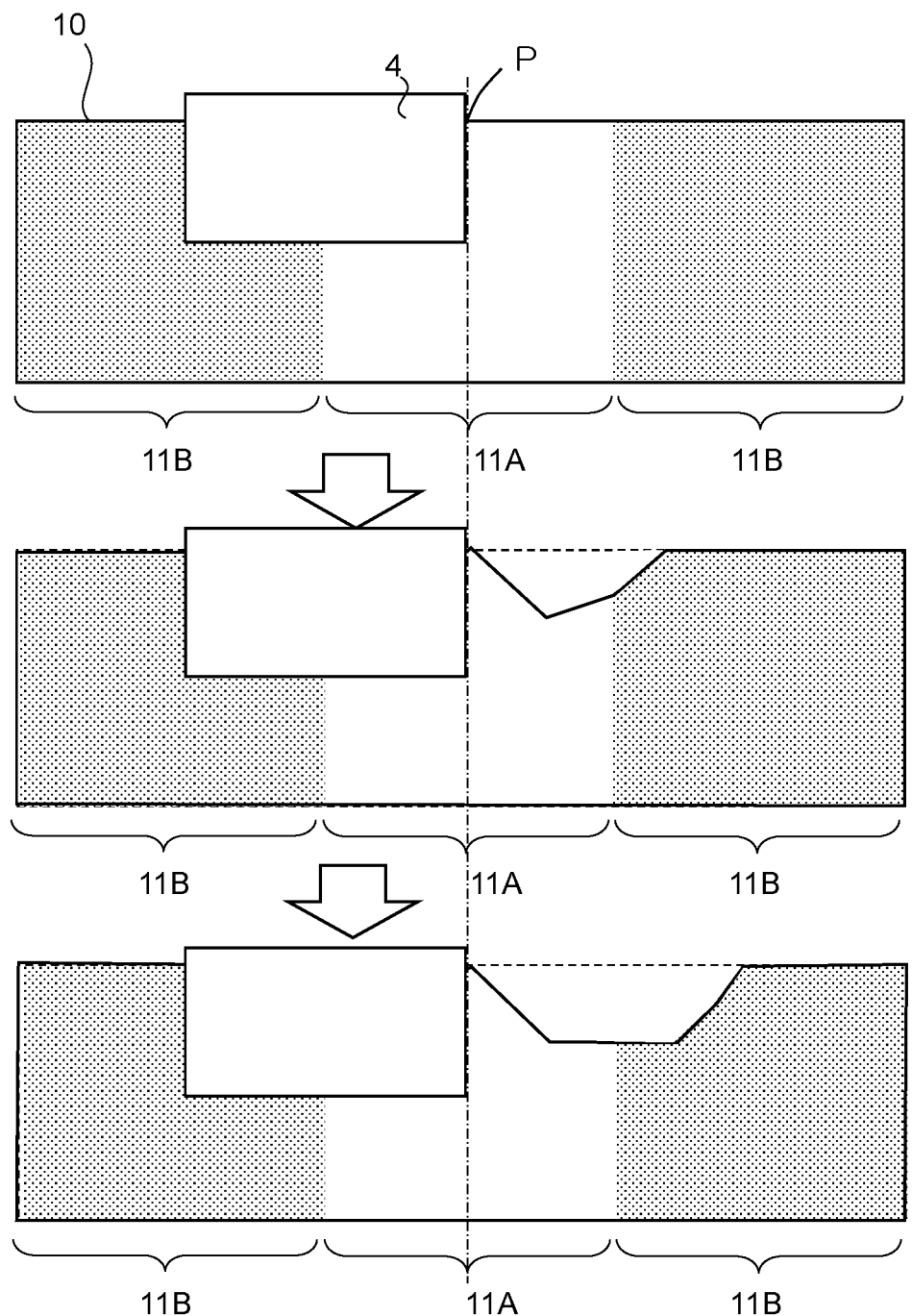
FIG. 4 illustrates a deformation behavior of a structural member with low-strength portions sandwiching a high-strength portion.

FIGS. 3 and 4 each illustrate a deformation behavior found when an impacter is caused to hit a structural member including a CCSS and an reinforcing member in a direction perpendicular to the longitudinal direction of the structural member. The CCSS of the structural member 5 shown in FIG. 3 is composed of a hat member and closing plate with a uniform strength distribution. The CCSS of the structural member 10 shown in FIG. 4 is composed of a hat member and closing plate with low-strength portions 11B and 12B as shown in FIGS. 2A to 2C. FIGS. 3 and 4 show a deformation behavior of a side of the structural member as viewed in the direction perpendicular to the direction of an impact of the impacter and to the longitudinal direction of the CCSS.

As shown in FIG. 3, in the structural member 5 having a hat member with a uniform strength distribution, impact-derived deformation of portions of the side walls and top-plate portion near an end of the reinforcing member 4 which provides a bending-deformation initiation point P progresses to form a wedge shape as seen in side view. As a result, the structural member 5 is sharply bent so as to protrude sharply in the direction of bending (i.e. direction of the impact). In some cases, the structural member 5 may develop a crack.

As shown in FIG. 4, in the structural member 10 having low-strength portions 11B (represented as dotted areas in FIG. 4) on both sides of the high-strength portion 11A, deformation progressing inwardly from the bending-deformation initiation point P on the high-strength portion 11A, once it reaches the boundary between the high-strength portion 11A and a low-strength portion 11B, tends to progress in the lateral direction (i.e. longitudinal direction of the structural member 10), which exhibits a relatively low strength. Thus, deformation expands in the longitudinal direction such that the extent of deformation in the bending direction (i.e. direction of the impact) is small.

The deformation behaviors shown in FIGS. 3 and 4 are not limited to situations where an impacter hits a structural member. For example, similar deformation behaviors can be found when a structural member experiences bending deformation as a result of an axial force compressing the member in the longitudinal direction, or when an impacter is pressed against the structural member to statically apply a force in a direction perpendicular to the longitudinal direction to cause bending deformation, as in a three-point bending test. Further, deformation behaviors similar to those in FIGS. 3 and 4 can be found when an impacter hits the top-plate portion of the structural member or an impacter hits the closing plate.

For example, the structural member 10 may be used while two positions thereon separated in the longitudinal direction are supported. In such implementations, the structural member 10 has two portions to be connected to another member, which will be referred to as connections. That is, the structural member 10 is supported by another member at these connections. The connections may be referred to as support portions. Connections are provided on at least one of the side walls 11 and 12, top-plate portion 13 and closing plate 2.

The structural member 10 is fixed to another member at the connections. The connections of the structural member 10 are joined to another member by fastening members or by welding, for example. Three or more connections may be provided.

Two connections may be positioned to be separate from each other by 6H or more as measured in the longitudinal direction of the structural member 10. That is, the distance between the two connections, KY, may be not smaller than 6 times the height H of the side walls 11 and 12 (KY≥6H). Thus, the inventors found that the extent of deformation of the structural member caused by an impact on a longitudinally middle portion may be large if the distance KY between the two connections as measured in the longitudinal direction is not smaller than about 6 times the dimension of the structural member as measured in the direction of an impact (i.e. the height H of the side walls 11 in the implementation of FIG. 2A).

To address this problem, the high-strength portions 11A and 12A and low-strength portions 11B and 12B are provided between the two connections. Further, the reinforcing member is positioned to overlap the high-strength portions 11A and 12A as determined along the longitudinal direction. This construction may further reduce the extent of protrusion resulting from deformation of the structural member 10 found when an impact is applied to a structural-member portion between the two connections.

When the structural member 10 is used as a structural member for a vehicle, for example, the structural member 10 is attached to the vehicle while supported at at least two connections separated in the longitudinal direction of the CCSS. At this time, the structural member 10 is attached to the vehicle such that the top-plate portion 13 is located outward with respect to the vehicle and the closing plate 2 is located inward with respect to the vehicle. Alternatively, the structural member 10 is attached to the vehicle such that the closing plate is located outward with respect to the vehicle and the top-plate portion 13 is located inward with respect to the vehicle. In either case, the structural member 4 is positioned on a top-plate portion 13 or closing plate 2 that is located outward with respect to the vehicle. This reduces the extent of protrusion of the structural member 10 into the inside of the vehicle found when the member receives an impact from outside the vehicle and is bent sharply.

Regardless of whether there are connections, in the structural member 10 shown in FIGS. 2A to 2C, the dimension LB of the low-strength portions 11B and 12B as measured in the direction of extension of the first ridges 123 is preferably not smaller than (3/5)H (LB≥(3/5)H). This further increases the reduction in deformation upon an impact. It is desirable that the dimension LB of the low-strength portions 11B and 12B be not larger than 2H to ensure strength for the structural member 10. It is more desirable that the dimension LB of the low-strength portions 11B be not larger than H.

Further, regardless of whether there are connections, the high-strength portions 11A and 12A and the reinforcing member 4 are preferably positioned in the middle of the CCSS as determined along the longitudinal direction. That is, it is desirable that at least part of each of the high-strength portions 11A and 12A and at least part of the reinforcing member 4 be positioned in the middle of the CCSS as determined along the longitudinal direction. The middle of the CCSS as determined along the longitudinal direction is one example of a portion of the structural member 10 that can easily be bent sharply. Alternatively, if the structural member 10 is to be joined to another member at two connections, as discussed above, it is desirable that the high-strength portions 11A and 12A be positioned in the middle between the two connections. That is, it is desirable that at least part of each of the high-strength portions 11A and 12A be positioned in the middle between the two connections. This will effectively prevent sharp bending deformation of a portion of the structural member 10 that has largest moments due to an impact and thus can easily be bent sharply (i.e. middle portion of the member or middle portion between the connections), regardless of whether connections are provided.

The distance LaB between each end 4a of the reinforcing member 4, on one hand, and the boundary between the high-strength portion 11A and the associated low-strength portion 11B, on the other, and the height H of the side walls 11 are not limited to above-discussed relationships, i.e. ones that exactly satisfy ((1/3)H≤LaB≤(3/2)H), and more preferably (1/3)H≤LaB≤H). Cases with errors that allow one to deem the values to satisfy the above-discussed relationships are also contemplated. The length LY of the structural member 10 relative to the height H of the side walls is not limited to implementations that exactly satisfy the above-discussed relationship (6H≤LY), either. A structural member with a size about 6 times the height H of the side walls is deemed to be a structural member having the above-discussed relationship (6H≤LY). For example, instead of being perpendicular to the longitudinal direction of the CCSS, the boundary between a low-strength portion and the high-strength portion may meander. In such implementations, the boundary between a low-strength portion and the high-strength portion is deemed to be located in an imaginary plane perpendicular to the longitudinal direction that passes through the middle between the position on the meandering boundary that is furthest into the low-strength portion and the position that is furthest into the high-strength portion.

Figure 5A:
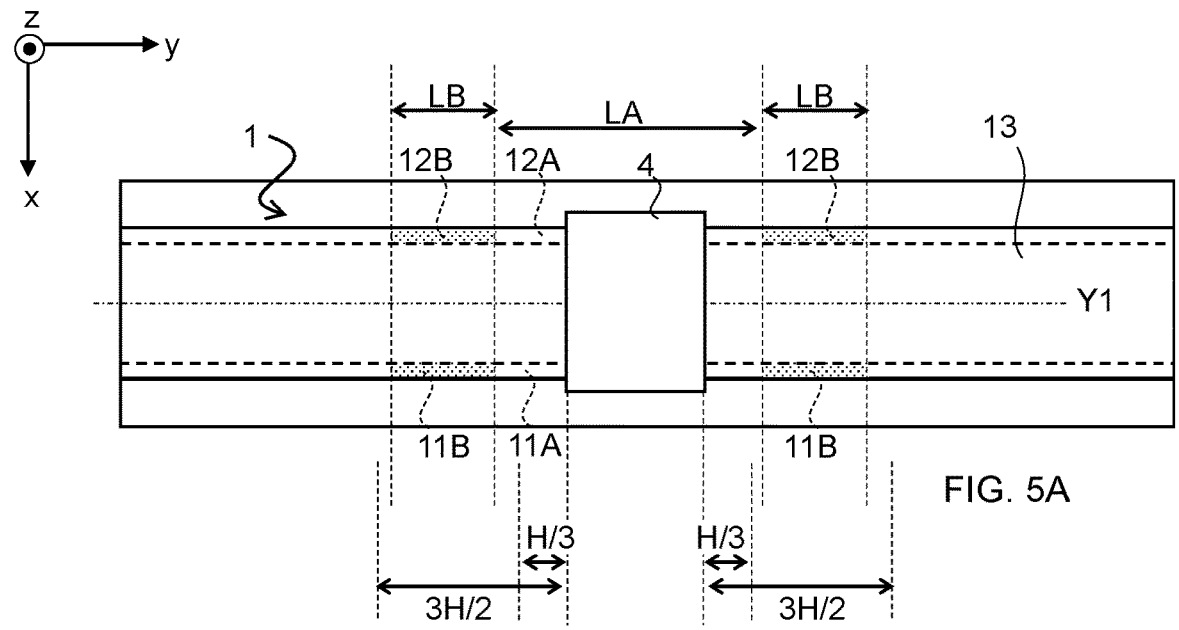
FIG. 5A is a top view of the structural member of FIG. 2A as viewed in the z-direction.

FIG. 5A is a top view of the structural member 10 of FIG. 2A as seen from above (i.e. looking at the top-plate portion 13 in the z-direction). In FIG. 5A, the portions of the side walls 11 and 12 that would be visible if one could see through the top-plate portion 13 are represented by broken lines. In the implementation shown in FIG. 5A, the high-strength portions 11A and 12A, facing each other, and the present of low-strength portions 11B and 12B, facing each other, of the two side walls 11 and 12 are positioned to completely overlap as viewed in the direction in which the two side walls 11 and 12, facing each other, are arranged (i.e. in the x-direction). That is, the entire high-strength portion 11A of the one side wall 11 and the entire high-strength portion 12A of the other side wall 12 overlap as viewed in the direction in which these portions are arranged. The entire low-strength portions 11B of the one side wall 11 and the entire high-strength portions 12B of the other side wall overlap as viewed in the direction in which these portions are arranged. This prevents the structural member 10 from twisting and being bent sharply upon an impact. In the implementation shown in FIG. 5A, the direction in which the two side walls 11 and 12 are arranged is perpendicular to the longitudinal direction of the CCSS (i.e. to the central axis Y1).

In FIG. 5A, the strength distribution in the one side wall 11 is a mirror image of the strength distribution in the other side wall 12. That is, the high-strength portions 11A and 12A and low-strength portions 11B and 12B of the pair of side walls 11 and 12 are positioned to be symmetric with respect to the central imaginary plane Y1 between the side walls 11 and 12. This will further reduce the possibility of one of the side walls 11 and 12 being crushed earlier than the other. The central imaginary plane Y1 between the side walls 11 and 12 is equivalent to the perpendicular bisector A of the top-plate portion 13 as seen in a cross section perpendicular to the longitudinal direction of the CCSS.

For example, in the implementation shown in FIGS. 2A to 2C and 5A, the pair of side walls 11 and 12 have the same height. The angle between the side wall 11 and top-plate portion 13 is equal to the angle between the side wall 12 and top-plate portion 13. Thus, as seen in a cross section perpendicular to the longitudinal direction of the tubular portion, the cross-sectional shape of the structural member 10 is symmetrical with respect to the perpendicular bisector A of the top-plate portion 13. Further, the strength distribution in the structural member 10 as seen in the same cross section is symmetrical with respect to the perpendicular bisector A. This will reduce a stress imbalance upon an impact.

Figure 5B:
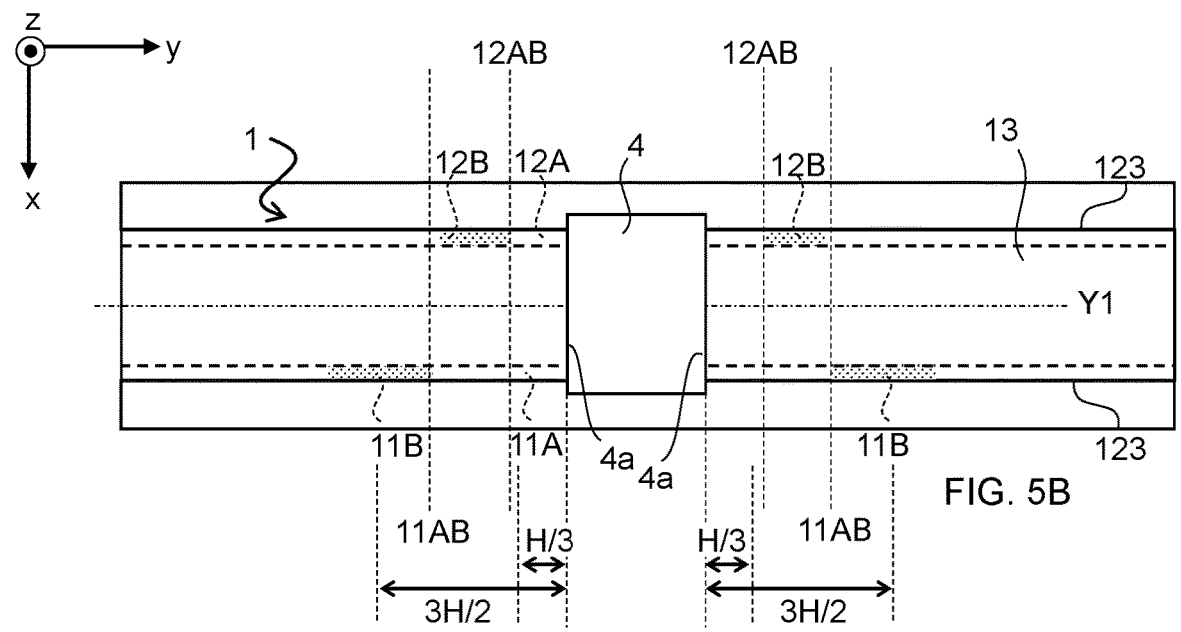
FIG. 5B shows a variation of the structural member of FIG. 2A with a different positioning of the high- and low-strength portions.

FIG. 5B shows a variation of the structural member 10 of FIG. 2A with a different positioning of the high-strength portions 11A and 12A and low-strength portions 11B and 12B. In the implementation shown in FIG. 5B, the two side walls 11 and 12 are constructed such that part of the high-strength portion 11A of the one side wall 11 overlaps the entire high-strength portion 12A of the other side wall 12 as viewed in the direction in which the side walls, facing each other, are arranged (i.e. in the x-direction). The low-strength portions 11B of the one side wall 11 and the low-strength portions 12B of the other side wall 12 are positioned not to overlap as viewed in the direction in which the side walls are arranged (i.e. in the x-direction). For each of the two side walls 11 and 12, the boundary 11AB or 12AB of the high-strength portion 11A or 12A and a low-strength portion 11B or 12B is positioned distant from the associated one of the two ends of the reinforcing member 4 by a distance ranging from the positions (1/3)H to (3/2)H away from the reinforcing member 4 as determined along the direction of extension of the first ridges 123. Alternatively, at least part of a low-strength portion 11B of the one side wall 11 may overlap the associated low-strength portion 12B of the other side wall 12 as viewed in the direction in which the side walls are arranged.

In the implementation shown in FIG. 5B, the length of each low-strength portion 11B of the one side wall 11 as measured in the direction of extension of the first ridges 123 is different from the length of each low-strength portion 12B of the other side wall 12 as measured in the direction of extension of the first ridges 123. In other implementations, the length of each low-strength portion 11B of the one side wall 11 may be equal to the length of each low-strength portion 12B of the other side wall 12 as measured in the direction of extension of the first ridges 123.

Figure 6A:
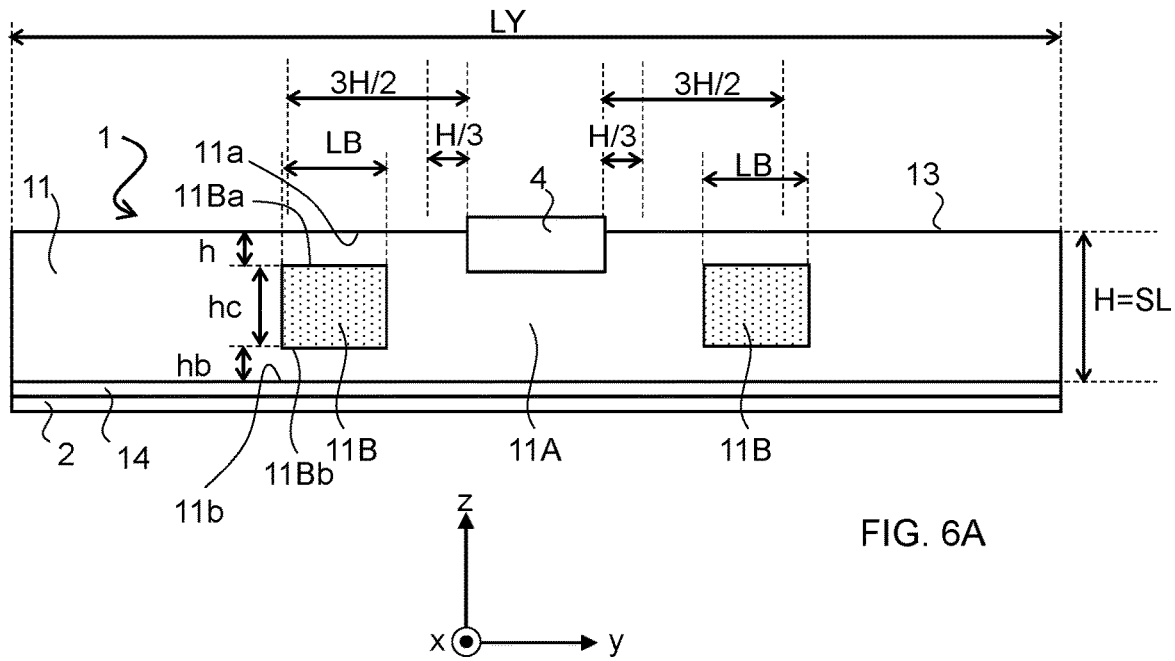
FIG. 6A shows a variation of the structural member of FIG. 2A with a different positioning of the low-strength portions.

FIG. 6A shows a variation of the structural member 10 of FIG. 2A with a different positioning of the low-strength portions 11B and 12B. In the implementation shown in FIG. 6A, each low-strength portion 11B extends part of the height of the side wall 11 (in the z-direction). That is, each low-strength portion 11B extends part of that portion of the side wall 11 which extends from the wall edge adjacent to the top-plate portion 13 to the wall edge adjacent to the flange 14. As determined along the height direction of the side wall 11, the low-strength portion 11B extends from a position the distance h away from the first end 11a of the side wall 11 (i.e. top-plate portion 13) to a position the distance hb away from the second end 11b (i.e. flange 14). That is, the end of the low-strength portion 11B that is located closer to the first wall end 11a, denoted by 11Ba (or "one-end end"), is at a position the distance h away from the first wall end 11a, and the end of the low-strength portion 11B that is located closer to the second wall end 11b, denoted by 11Bb (or "other-end end"), is at a position the distance hb away from the second wall end 11b. The low-strength portion 11B is not in contact with the first end 11a (i.e. top-plate portion 13) nor the second end 11b (i.e. flange 14). Although not shown, the low-strength portions 12B of the side wall 12 that face the low-strength portions 11B extend part of the height of the side wall 12. That is, each of the side walls 11 and 12 is permitted to include a low-strength portion 11B or 12B that extends part of its height. The variation shown in FIG. 6A will also reduce the extent of protrusion due to deformation of the structural member 10 upon an impact.

In such implementations, to reduce the extent of deformation, it is desirable that the distance h between the first end 11a of the side wall 11 and the end 11Ba of the low-strength portion 11B closer to the first wall end 11a as measured in the height direction of the side wall 11 be not larger than ¼ of the distance SL between the first end 11a and second end 11b of the side wall 11 (SL=H in the implementation of FIG. 6A) (h≤SL/4). That is, it is desirable that the end 11Ba of the low-strength portion 11B closer to the first wall end 11a be located between the first wall end 11a and a position (1/4)SL distant from the first wall end as measured in the height direction of the wall. To reduce the extent of deformation, it is more desirable that the distance h be not larger than (1/5)SL (h≤SL/5). The yield strength of the wall portion between the one end 11Ba of the low-strength portion 11B closer to the first wall end 11a and the first wall end 11a is not lower than 500 MPa and higher than that of the low-strength portion 11B. For example, the yield strength of the portion of the side wall 11 between the first wall end 11a and the end 11Ba of the low-strength portion 11B may be equal to the yield strength of the high-strength portion 11A or 12A.

To reduce the extent of deformation, it is desirable that the distance hb between the second end 11b of the side wall 11 or 12 and the low-strength portion 11B or 12B as measured in the height direction of the side walls 11 and 12 be not larger than (4/5)SL (hb≤4SL/5). To further reduce the extent of deformation, it is desirable that the distance hb be not larger than (1/2)SL (hb≤SL/2).

Regardless of what values h and hb take on, it is essential that the dimension hc of each low-strength portion 11B or 12B as measured in the height direction of the side walls 11 and 12 (i.e. in the z-direction) be not smaller than (1/5)SL ((hc≥SL/5) to reduce the extent of deformation. To further reduce the extent of deformation, it is desirable that the dimension hc be not smaller than (1/4)SL (SL/4≤hc).

Figure 6B:
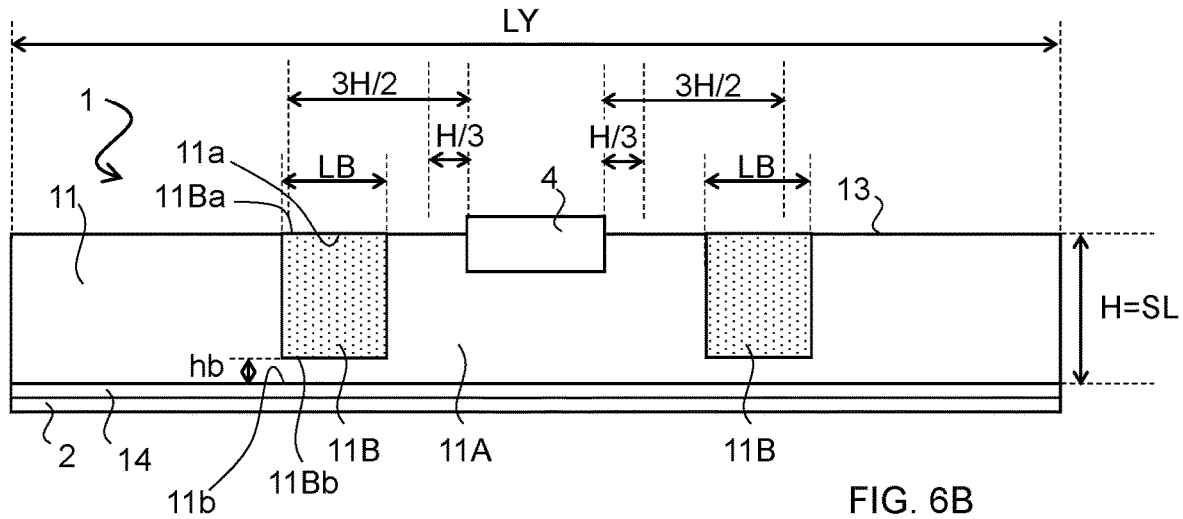
FIG. 6B shows a variation of the structural member of FIG. 2A with a different positioning of the low-strength portions.

FIG. 6B shows a variation of the above-discussed implementation of FIG. 6A where h=0. In the implementation shown in FIG. 6B, the first end 11a of the side wall 11 forms the end 11Ba of the low-strength portion 11B closer to the first wall end 11a.

Figure 6C:
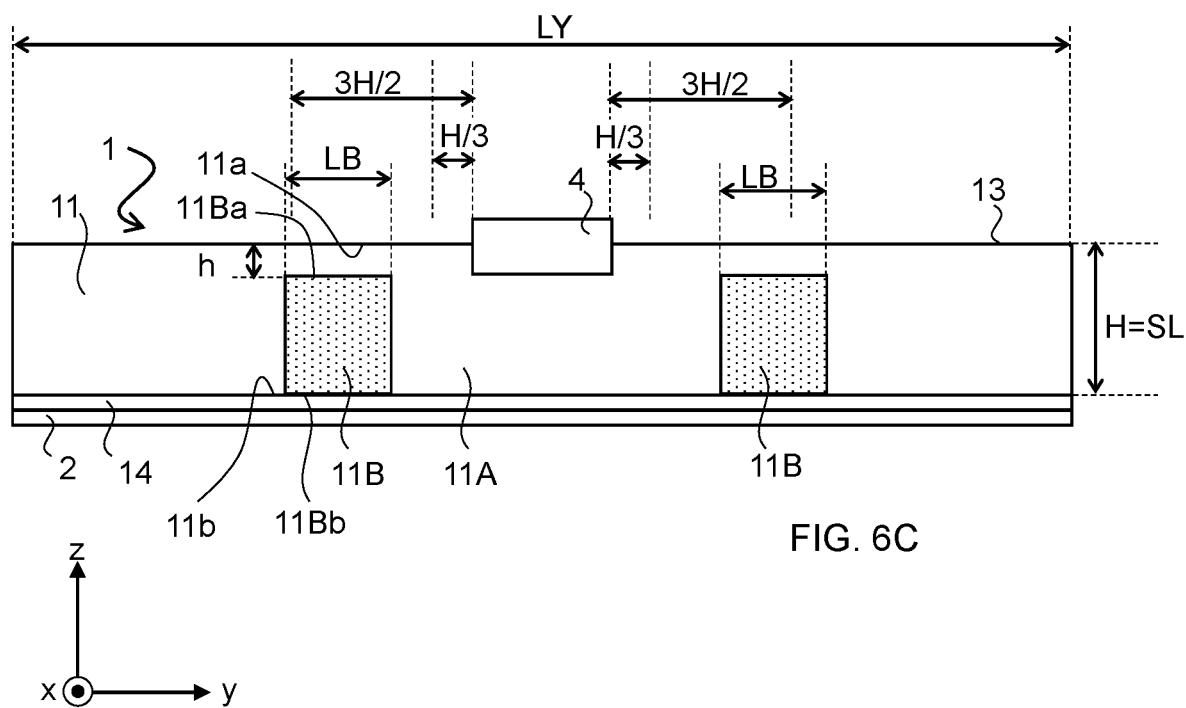
FIG. 6C shows a variation of the structural member of FIG. 2A with a different positioning of the low-strength portions.

FIG. 6C shows a variation of the above-discussed implementation of FIG. 6A where hb=0. In the implementation shown in FIG. 6C, the second end 11b of the side wall 11 forms the end 11Bb of the low-strength portion 11B closer to the second wall end 11b.

As illustrated in FIGS. 6A to 6C, a low-strength portion is provided in such a way that the end of the low-strength portion closer to the one wall portion is located between the first wall end, out of the ends of the side wall as determined along the height direction, and a position (1/4)SL away from the first wall end. That is, a low-strength portion extends at least part of that portion of the side wall which extends from a position on the side wall (1/4)SL distant from the first side-wall end to the first side-wall end. This will reduce the extent of deformation of the structural member 10 caused by an impact applied to a member portion adjacent to the first side-wall end. Further, a low-strength portion is permitted to be provided such that the end of the low-strength portion closer to the second wall end, out of the ends of the side wall as determined along the height direction, is located between the second wall end and a position (4/5)SL away from the second wall end. Still, to reduce the extent of deformation, it is necessary that the dimension of the low-strength portion as measured in the height direction of the side wall be not smaller than 1/5SL.

In the implementations shown in FIGS. 6A to 6C, the distances h, hb and hc are determined assuming that that one of the ends of a side wall 11 or 12 which is in contact with the top-plate portion 13 is "the first end" and that end which is in contact with the flange 14 is "the second end". In such implementations, setting the distances h, hb and hc to the above-listed values will reduce the extent of deformation of the structural member 10 found when an impact is applied to the top-plate portion 13. That is, the structural members 1 shown in FIGS. 6A to 6C are suitably used as regular-hat members with its top-plate portion serving as the impact-receiving surface. Alternatively, the distances h, hb and hc may be set assuming that that one of the ends of a side wall 11 or 12 as determined along the height direction which is in contact with the flange 14 is "the first end" and that end which is in contact with the top-plate portion 13 is "the second end". In such implementations, the distances h, hb and hc may be set to values analogous to those of the above-discussed implementations. This will further reduce the extent of deformation of the structural member 10 found when an impact is applied to the closing plate 2. In such implementations, the structural members 1 are suitably used as inverted-hat members with its closing plate serving as the impact-receiving surface.

Figure 7A:
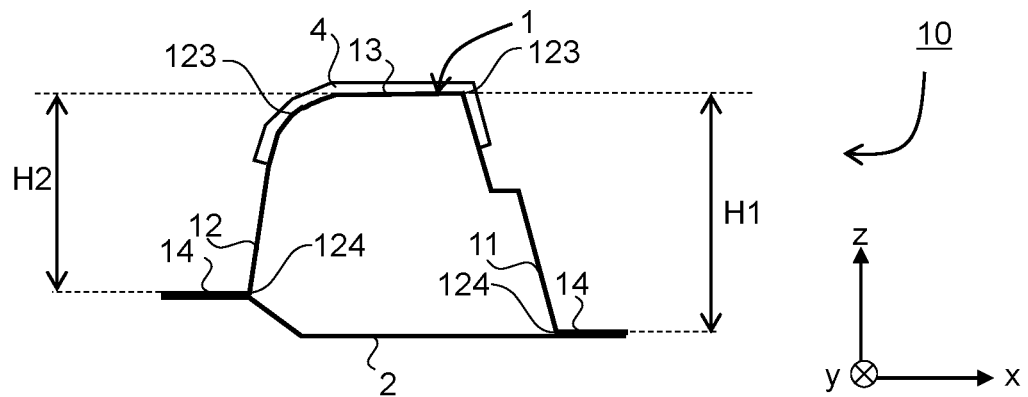
FIG. 7A is a cross-sectional view of a variation of the structural member with a different cross-sectional shape.

FIG. 7A is a cross-sectional view of a variation of any of the structural members 10 discussed above with a different cross-sectional shape. The structural member 10 of FIG. 7A includes a pair of side walls 11 and 12 with different shapes. The side walls 11 and 12 are different from each other in their angle relative to a flange 14 and the heights HR and HL. Thus, the positions of the flanges 14 as determined along the height direction are different from each other. Thus, if the structural member 10 has a cross section that is not symmetrical, the heights H1 and H2 of the side walls 11 and 12 are defined separately.

In the implementation shown in FIG. 7A, one side wall 11 includes a stepped portion. In implementations where the side wall 11 includes a stepped portion, the height H1 of the side wall 11 is defined as the distance between the first end of the side wall 11 in contact with the top-plate portion 13 and the second wall end in contact with the flange 14 as measured in the height direction. That is, the height H1 of the side wall 11 is defined as the distance between the lowermost point and the uppermost point on the side wall 11 as determined along the height direction. The same applies to implementations where the side wall 11 includes protrusions and recesses or holes. In such implementations, the height direction is defined as the direction perpendicular to the top-plate portion 13.

A round portion (or curved portion) is provided along the border portion between the other side wall 12 and the top-plate portion 13. That is, the portion of the side wall 12 connecting to its first end is shaped to be round and curved. Thus, the surface of the first ridge 123, which forms the border between the side wall 12 and top-plate portion 13 (i.e. shoulder) is curved. The height H2 of the side wall 12 is determined assuming that this round (or curved) portion is part of the side wall 12. That is, that end of the round (or curved) portion which is adjacent to the top-plate portion 13 is treated as the border of the round portion (or end of the round portion). The height H of the side wall is determined assuming that this border of the round portion is the first end of the side wall 11 as determined along the height direction.

Although not shown, a round (or curved) portion may be provided along the border portion between the side wall 12 and the associated flange 14. In such implementations, the surface of the second ridge 124 along the border between the side wall 12 and flange 14 is curved. The height H2 of the side wall 12 is determined assuming that the round (or curved) portion between the side wall 12 and flange 14 is part of the side wall 12. That is, that end of the round (or curved) portion which is adjacent to the flange 14 is treated as the border of the round portion (or end of the round portion). The height H of the side wall is determined assuming that this border of the round portion is the other end of the side wall 11 as determined along the height direction.

Although not shown, the surface of at least one of the top-plate portion 13, side walls 11 and 12, flanges 14 and closing plate 2 may be curved, rather than flat. That is, at least one of the top-plate portion 13, side walls 11 and 12, flanges 14 and closing plate 2 may be curved.

Figure 7B:
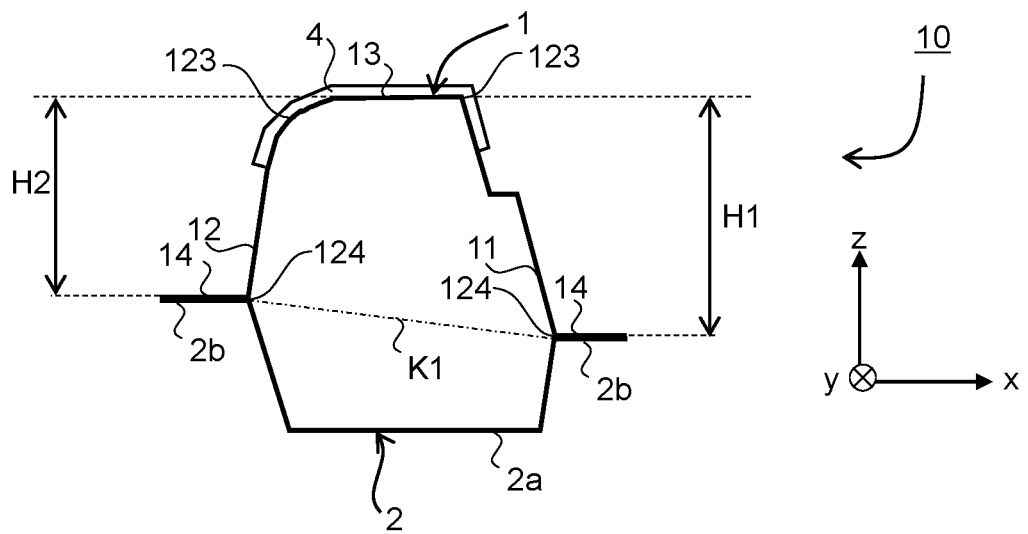
FIG. 7B is a cross-sectional view of another variation of the structural member with a different cross-sectional shape.

FIG. 7B is a cross-sectional view of a variation with a different closing plate 2. In the implementation shown in FIG. 7B, the closing plate 2 is shaped to protrude away from the hat member 1. Specifically, the closing plate 2 includes joints 2b to be joined to the flanges 14 of the hat member 1, and an intermediate portion 2a between the joints. The intermediate portion 2a is shaped to protrude away from the hat member 1. An imaginary line segment K1, connecting the joints 2b of the closing plate, is positioned between the top-plate portion 13 and closing plate 2. In this implementation, the closing plate 2 has a hat-shaped cross section. The outer surface of the intermediate portion 2a may be generally parallel to the outer surfaces of the joints 2b.

By shaping the closing plate 2 to protrude away from the hat member 1, the dimensions of the structural member 10 in the height direction may be adjusted. The heights of the side walls (H, H1 and H2), relative to which the low-strength portions and high-strength portions are positioned, do not vary depending on the dimensions of the closing plate 2 in the height direction. Alternatively, the hat member 1 and closing plate 2 may be constructed such that part of the imaginary line segment K1 is positioned between the top-plate portion 13 and closing plate 2.

Several features, such as unsymmetrical shapes and stepped portions of the hat member 1, rounded portions in edges of the side walls, and shapes of the closing plate 2, have been described with reference to FIGS. 7A and 7B. The embodiments of the present invention include implementations where all these several features are combined (i.e. implementations shown in FIGS. 7A or 7B), as well as structural members 10 that employ at least one of these several features.

Figure 8:
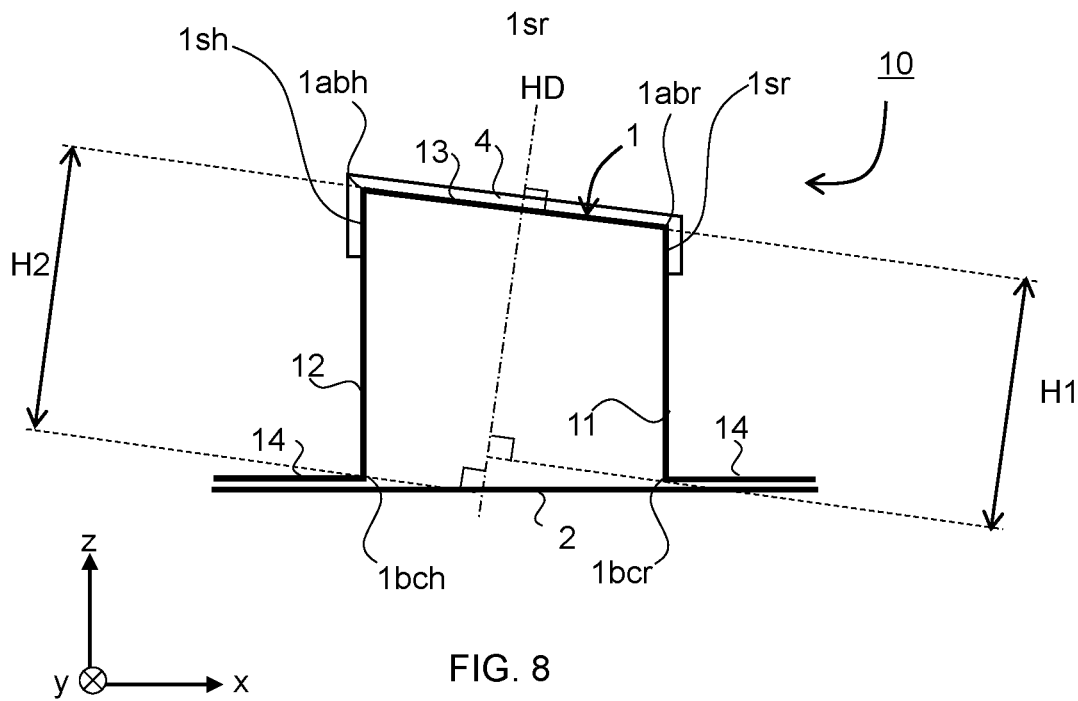
FIG. 8 illustrates the height direction of the side walls.

FIG. 8 illustrates the height direction of the side walls 11 and 12 in implementations where the top-plate portion 13 is inclined. FIG. 8 shows the height direction of the structural member 10 in implementations that assume that the top-plate portion 13 may receive an impact. In the structural member 10 shown in FIG. 8, the top-plate portion 13 of the hat member 1 is not parallel to the flanges 14. Further, the dimension of the one side wall 11 and the dimension of the other side wall 12, both measured in the z-direction, are different from each other. In implementations that assume that the top-plate portion 13 may receive an impact, the height direction of the side walls 11 and 12 is perpendicular to the top-plate portion 13. The heights H1 and H2 of the side walls 11 and 12 are measured in the height direction of the side walls 11 and 12. In implementations that assume that the closing plate 2 may receive an impact, the height direction of the side walls 11 and 12 are defined as the direction perpendicular to the closing plate.

Figure 9:
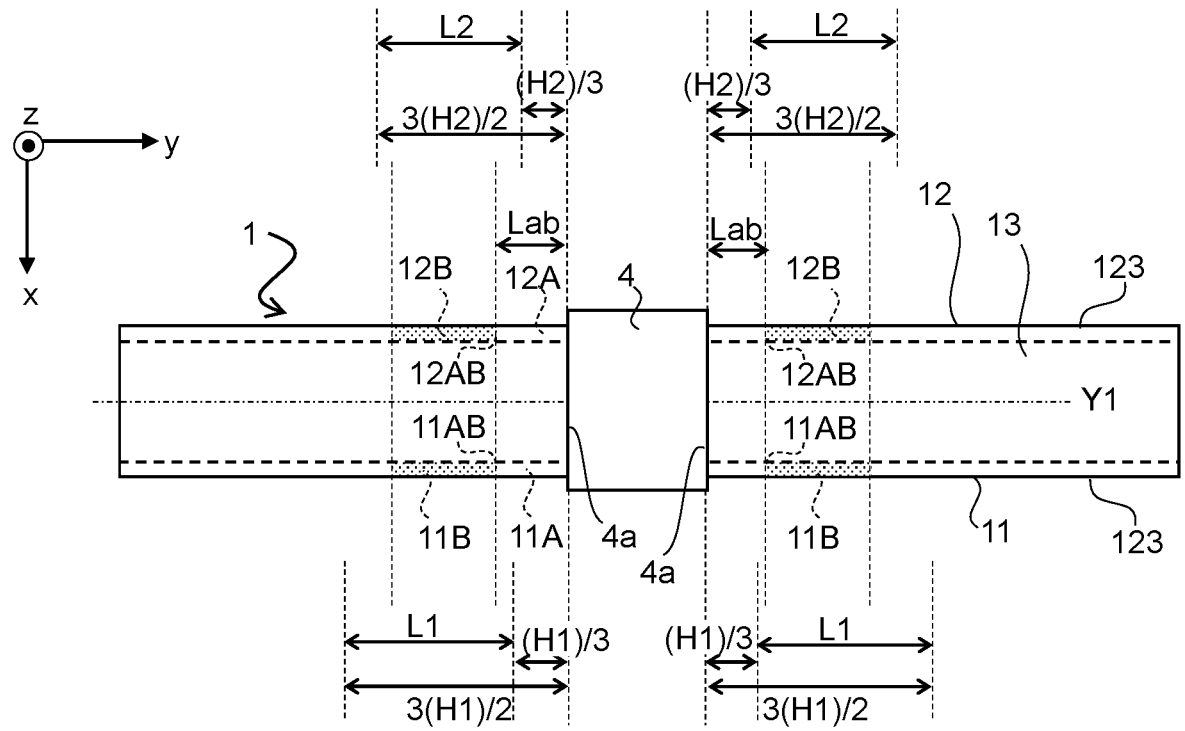
FIG. 9 illustrates a positioning of the high- and low-strength portions and the reinforcing member, where the two side walls have different heights.

FIG. 9 illustrates a positioning of the high-strength portions 11A and 12A and low-strength portions 11B and 12B and the reinforcing member 4 in an implementation where the two side walls 11 and 12 have different heights H1 and H2 (H1≠H2). FIG. 9 shows the structural member 10 having two side walls 11 and 12 with different heights H1 and H2 as viewed looking at the top-plate portion 13 (i.e. in the z-direction). In FIG. 9, the portions of the side walls 11 and 12 that would be visible if one could see through the top-plate portion 13 are represented by broken lines.

In the implementation shown in FIG. 9, both ends 4a of the reinforcing member 4 overlap the high-strength portions 11A and 12A of the side walls 11 and 12 as viewed in the direction of extension of the first ridges 123 (i.e. y-direction). The boundary 11AB or 12AB between the high-strength portion 11A or 12A and the associated low-strength portion 11B or 12B in the side walls 11 and 12 is, as determined away from the reinforcing member 4 in the direction of extension of the first ridges 123 (i.e. y-direction), positioned in the overlap between a region L1 extending from positions 1/3 to 3/2 of H1 distant from the associated one of the two ends 4a of the reinforcing member 4, on one hand, and a region L2 extending from positions 1/3 to 3/2 of H2 distant from the reinforcing member end, on the other. That is, the boundaries 11AB and 12Ab between the high-strength portions 11A and 12A and low-strength portions 11B and 12B in the side walls 11 and 12 are positioned in regions where the distance LaB from one of the two ends 4a of the reinforcing member 4 as measured in the direction of extension of the first ridges is $(1/3)H1 \leq LaB \leq (3/2)$ and $(1/3)H2 \leq LaB \leq (3/2)H2$.

In the implementation shown in FIG. 9, as determined away from the reinforcing member 4 in the direction of extension of the first ridges 123 (i.e. y-direction), each of the low-strength portions 11B and 12B in the two side walls 11 and 12 is positioned in the overlap between the region L1 extending from positions 1/3 to 3/2 of H1 distant from one of the two ends 4a of the reinforcing member 4, on one hand, and the region L2 extending from positions 1/3 to 3/2 of H2, on the other, as determined along the direction away from the reinforcing member 4. That is, that end of each of the low-strength portions 11B and 12B which is located more distant from the reinforcing member 4 as determined along the direction of extension of the first ridges 123 is in the regions L1 and L2. Alternatively, some portions of the low-strength portions 11B and 12B may be outside the regions L1 and L2.

Figure 10A:
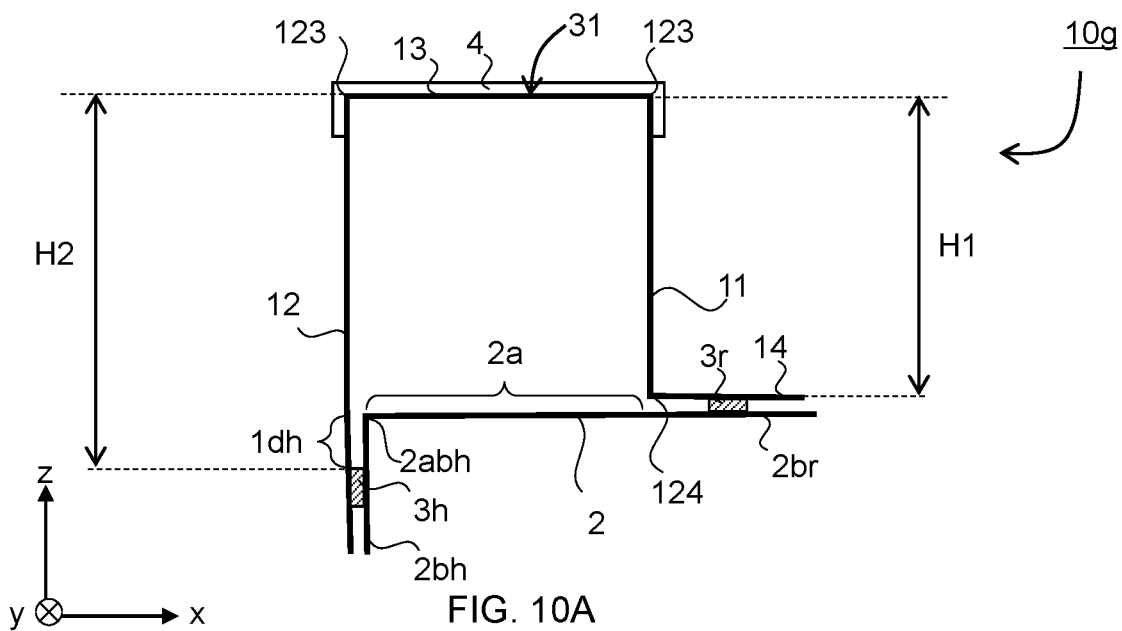
FIG. 10A is a cross-sectional view of a variation of the structural member.
Figure 10B:
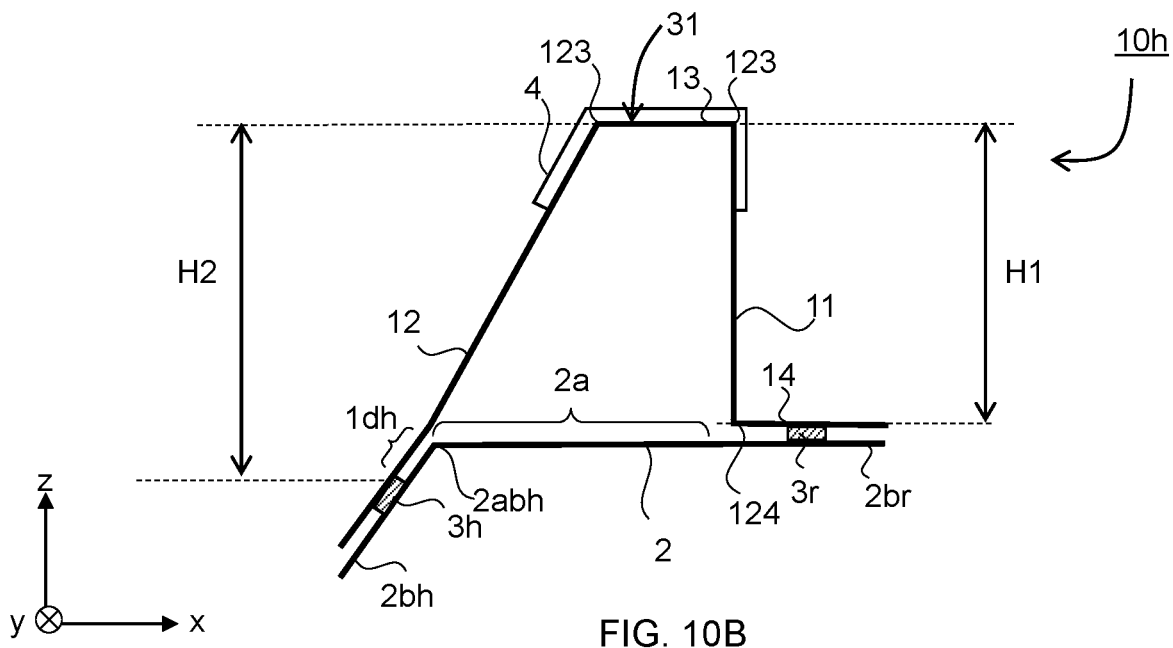
FIG. 10B is a cross-sectional view of another variation of the structural member.
Figure 10C:
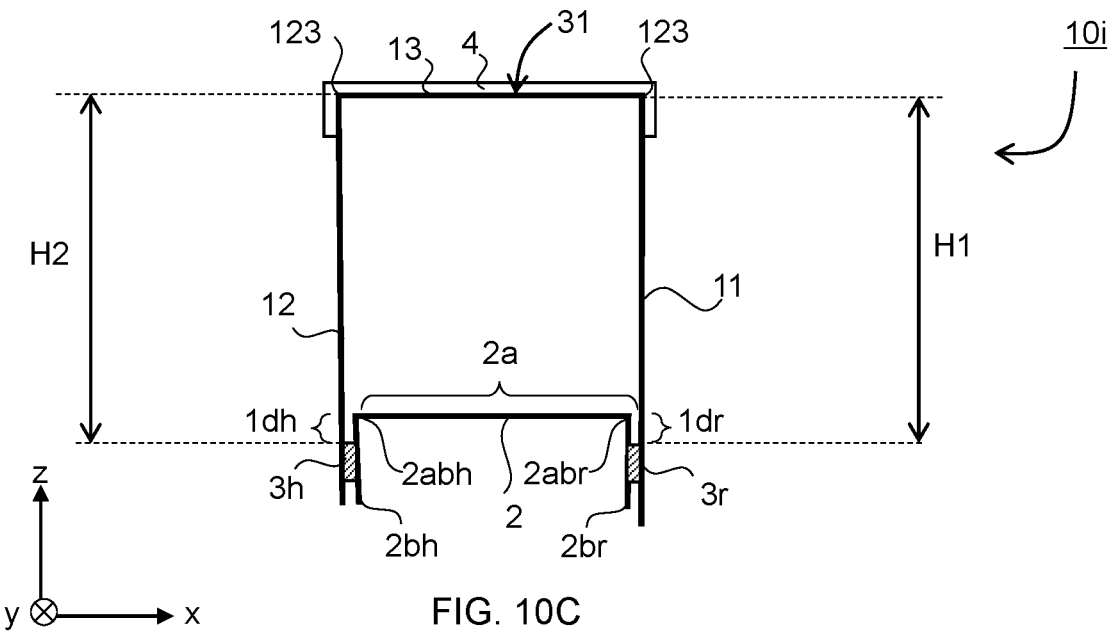
FIG. 10C is a cross-sectional view of yet another variation of the structural member.
Figure 10D:
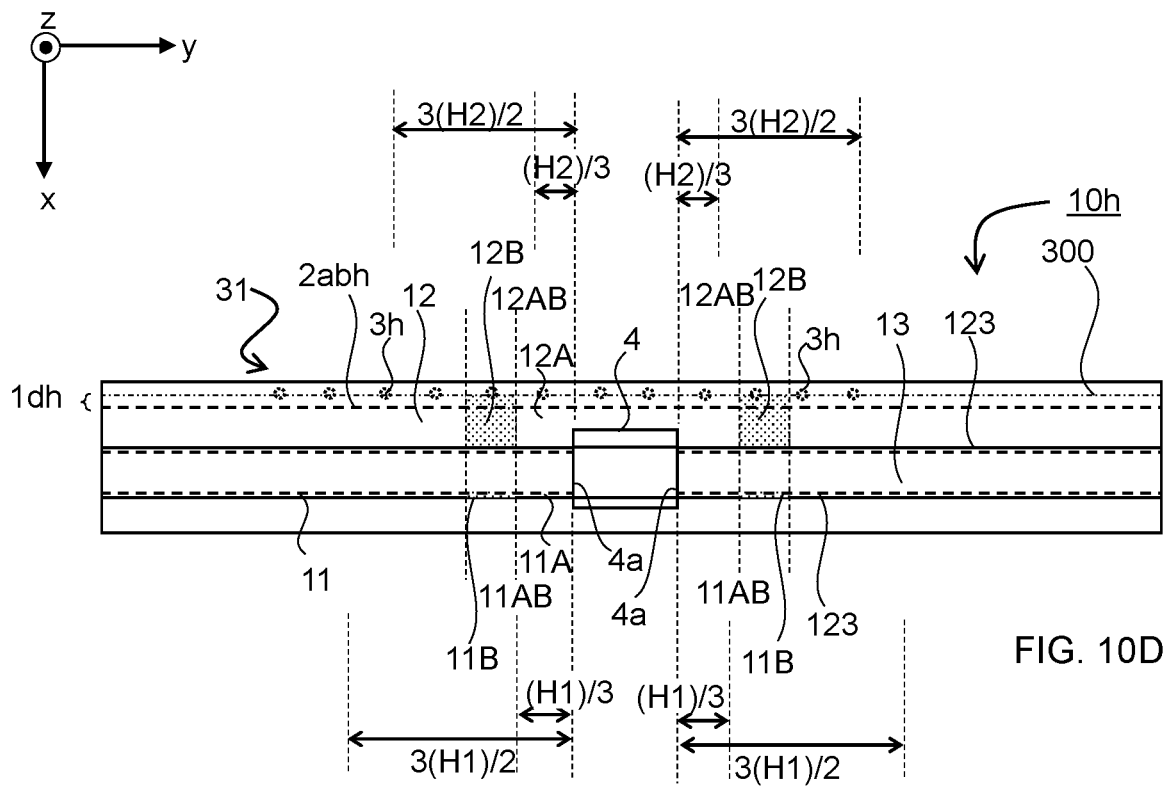
FIG. 10D is a top view of the structural member of FIG. 10B as viewed in the z-direction.

FIGS. 10A to 10C are cross-sectional views of variations of the structural member of the present embodiments. FIGS. 10A to 10C each show a cross-sectional shape of the structural member perpendicular to the longitudinal direction of the structural member (i.e. y-direction). The implementations shown in FIGS. 10A and 10B are examples of Arrangement 4 described above. The implementation shown in FIG. 10C is an example of Arrangement 3 described above. FIG. 10D is a top view of the structural member of FIG. 10B as viewed in the z-direction.

The variations shown in FIGS. 10A to 10C use grooved members without flanges or grooved members including one flange, rather than a hat member including two flanges. The structural members 10 shown in FIGS. 2A to 2C are constructed such that the first and second ridges 123 and 124 on both sides of the side walls 11 contribute to the deformation resistance against a load in a direction perpendicular to the top-plate portion 13 (bend rigidity). On the other hand, the variations shown in FIGS. 10A to 10C are constructed such that, in at least in one of the two side walls, the first ridge and joint on both ends of the side wall contribute to the bend rigidity.

Each of the structural members 10g, 10h and 10i shown in FIGS. 10A to 10C includes a grooved member 31 shaped to be grooved, a closing plate 2 joined to the grooved member 31, and an reinforcing member 4. The grooved member 31 shown in each of FIGS. 10A to 10C includes a top-plate portion 13, two side walls 11 and 12 extending from the two ends of the top-plate portion 13, and two joints 3r and 3h joining the grooved member 31 and closing plate 2. The two side walls 11 and 12 face each other. The two joints 3r and 3h are formed by areas where portions of the grooved member 31 overlap the closing plate 2. The joints 3r and 3h may be welds produced by spot welding or laser welding, for example. If sub-joints that are not continuous (i.e. discontinuous) are provided along the longitudinal direction of the grooved member 31 (i.e. direction of extension of the first ridges 12), a joint is deemed to be located to connect the sub-joints that are not continuous. That is, a joint is deemed to be located on a line connecting a plurality of discontinuous sub-joints. The portions of the structural member located between a joint and a first ridge constitute a side wall. First ridges 123 are located between the top-plate portion 13 and the two side walls 11 and 12. For example, in the implementation shown in FIG. 10D, a plurality of sub-joints 3h are arranged in the y-direction (i.e. direction of extension of the first ridges 123). An imaginary line 300 extending in the y-direction (i.e. direction of extension of the first ridges 123) and connecting the sub-joints forms a joint line.

The reinforcing member 4 is adjacent to at least part of the top-plate portion 13. In the implementations shown in FIGS. 10A to 10C, the reinforcing member 4 is located outside a CCSS composed of a grooved member 31 and a closing plate 2. The reinforcing member 4 may be located inside a CCSS. Further, the reinforcing member 4 may be or may not be in contact with part of the top-plate portion 13.

In each of the grooved members 31 shown in FIGS. 10A and 10B, the two side walls 11 and 12 include a first side wall 11 and a second side wall 12. The first side wall 11 has the first end adjacent to the top-plate portion 13 and the second end opposite thereto that is bent. A flange 14 extends from this bend of the second end of the first side wall 11. The flange 14 overlaps the closing plate 2. The flange 14 has a contact surface that is in contact with the closing plate 2. The flange 14 and closing plate 2 are joined to each other at a joint 3r.

The first side wall 11 is located between one of the two first ridges 123 and the flange 14. The second ridge 124 is located between the flange 14 and the first side wall 11. The second ridge 124 is an edge of the flange 14. The second ridge 14 extends in the same direction as the first ridges 123, i.e. the longitudinal direction of the grooved member 31 (i.e. y-direction).

The height H1 of the first side wall 11 is the height of the first side wall 11 as measured in the direction perpendicular to the top-plate portion 13, i.e. the distance between the first and second ridges 123 and 124 as measured in the direction perpendicular to the top-plate portion 13.

The second side wall 12 is located between the other one of the two first ridges 123 and the joint 3h. The second side wall 12 is not bent. A portion of the second side wall 12 adjacent to the joint 3h overlaps the closing plate 2. A portion of the second side wall 12 adjacent to the joint 3h has a contact surface 1dh that is in contact with the closing plate 2. The second side wall 12 extends in the same direction as the contact surface 1dh.

The height H2 of the second side wall 12 is the distance between the first ridge 123 and the joint 3h as measured in the direction perpendicular to the top-plate portion 13.

In the grooved member 31 shown in FIG. 10C, the two side walls 11 and 12 are located between the two associated first ridges 123 and the two associated joints 3r and 3h. The height H1 of one of the two side walls, 11, is the distance between the first ridge 123 and joint 3r as measured in the direction perpendicular to the top-plate portion 13. The height H2 of the other one of the two side walls, 12, is the distance between the first ridge 123 and joint 3h as measured in the direction perpendicular to the top-plate portion 13.

In each of the grooved members 31 shown in FIGS. 10A to 10C, each of the first and second side walls 11 and 22 includes a high-strength portion 11A and a low-strength portion 11B arranged in the direction of extension of the first ridges 123. In the extending direction of the first ridges 123, an reinforcing member 4 is positioned to overlap the high-strength portion 11A (see, as an example, FIG. 10D). In the extending direction of the first ridges 123, both ends 4a of the reinforcing member 4 overlap the high-strength portion 11A of the first side wall 11 and the high-strength portion 12A of the second side wall 12. Adjacent to one of the two ends 4a of the reinforcing member, the boundary between the high-strength portion 11A and low-strength portion 11B, 11AB, is positioned in the overlap between the region starting at a position 1/3, and ending at a position 3/2, of the height H1 of the first side wall 11 distant from that reinforcing member end as determined along the direction of extension of the first ridges 123, on one hand, and the region starting at a position 1/3, and ending at a position 3/2, of the height H2 of the second side wall 11 distant from that one of the two ends 4a of the reinforcing member 4 as determined along the direction of extension of the first ridges 123. The yield strength of the high-strength portions 11A and 12A is not lower than 500 MPa. The yield strength of the low-strength portions 11B and 12B is in the range of 60 to 85% of the high-strength portions 11A and 12A. The high- and low-strength portions in the grooved member 31 may have a construction similar to that of the high- and low-strength portions of the structural member shown in any one of FIGS. 2, 5, 6, and 9.

In the implementation shown in FIG. 10A, the first and second side walls 11 and 12 are parallel to each other. On the other hand, in the implementation shown in FIG. 10B, the first and second side walls 11 and 12 are not parallel to each other. In the implementation shown in FIG. 10B, the first and second side walls 11 and 12 extend such that their distance increases as they go away from the top-plate portion 13. In this implementation, the first side wall 11 extends in the direction perpendicular to the top-plate portion 13. The second side wall 12 extends in a direction with an angle relative to an axis perpendicular to the top-plate portion 13. The flange 14 extends outward from the other end of the first side wall 11 adjacent to the closing plate 2. Structural members having the cross sections shown in FIGS. 10A to 10C may be used as a structural member for a vehicle, such as an A-pillar, for example.

In each of the implementations shown in FIGS. 10A and 10B, the closing plate 2 has a bend that is bent away from its plane. The direction in which the ridge 2abh formed along the bend of the closing plate 2 extends (i.e. y-direction) is the same in which the borderline between the contact surface 1dh of the side wall 12 that is in contact with the closing plate 2 and the surface that is not in contact with the closing plate 2 extends. The direction in which the ridge 2abh formed along the bend of the closing plate 2 extends may be the same in which the first ridges 123 extend.

In the implementation shown in FIG. 10C, none of the two side walls 11 and 12 is bent. That is, the contact surface 1dr of the side wall 11 that is in contact with the closing plate 2 extends in the same direction as the side wall 11. The contact surface 1dh of the side wall 12 that is in contact with the closing plate 2 extends in the same direction as the side wall 12.

The closing plate 2 includes two contact portions 2br and 2bh overlapping and in contact with the grooved member 31, and an intermediate portion 2a between the two contact portions 2br and 2bh. The plate portions between the intermediate portion 2a and the two contact portions 2br and 2bh are bent. The direction in which the ridges 2abr and 2abh formed between the intermediate portion 2a and the two contact portions 2br and 2bh extend is the same direction in which the borderlines between the contact surfaces 1dr and 1dh of the side walls 11 and 12 that are in contact with the closing plate 2 and the surfaces of the side walls 11 and 12 that are not in contact with the closing plate 2 extend.

The structural members 10g, 10h and 10i shown in FIGS. 10A to 10C also provide the same effects as the structural member 10 shown in FIGS. 2A to 2C. The joints 3r and 3h are not limited to welds. For example, the joints may be fasteners such as screws, adhesives or brazes. Further, in the implementations discussed above, the heights H1 and H2 of the side walls 11 and 12 are measured in the direction perpendicular to the top-plate portion 13. This will further reduce deformation of the structural member upon reception of an impact against the top-plate portion 13. As is the case with the structural member 10 shown in FIGS. 2A to 2C, the structural members l0g and 10h shown in FIGS. 10A and 10B are not limited to a particular strength of, or a particular strength distribution in, the flange 14. Further, in each of the structural members 10g, 10h and 10i shown in FIGS. 10A to 10C, the portions of the grooved member 31 closer to their ends than the joint 3h are not limited to a particular strength or strength distribution. These portions correspond to the flange 14; as such, the strength of, and strength distribution in, these portions do not significantly affect the performance of the structural members 10g, 10h and 10i.

In each of the implementations shown in FIGS. 2A to 2C, the structural member 10 extends straight in the longitudinal direction. Alternatively, the structural member 10 may be curved. For example, the structural member 10 may be curved so as to protrude from the top-plate portion 13 or closing plate 2. That is, the structural member 10 may be curved such that the outer surface of the top-plate portion 13 or the outer surface of the closing plate 2 protrudes. A structural member curved to protrude from the top-plate portion may be suitably used as a regular-hat member. A structural member curved to protrude from the closing plate may be suitably used as an inverted-hat member.

Figure 11A:
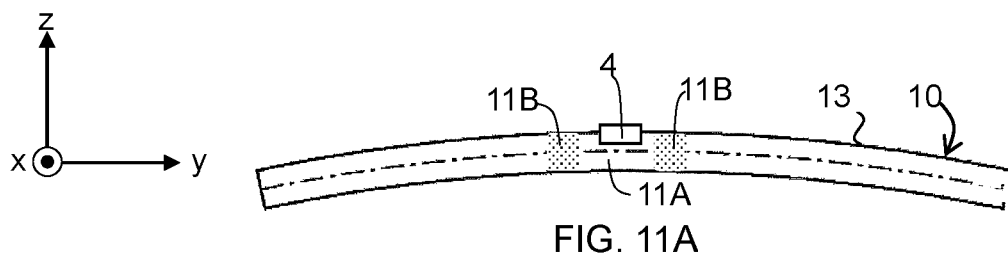
FIG. 11A is a side view of an example structural member that is curved.
Figure 11B:
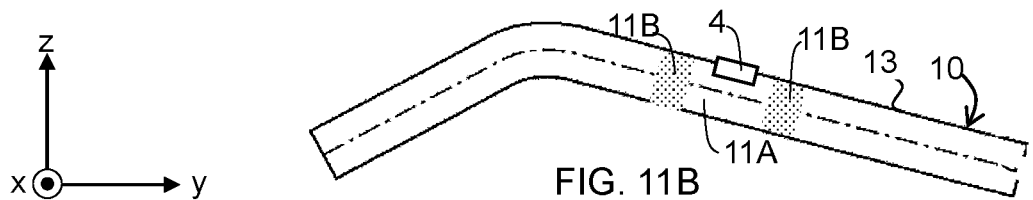
FIG. 11B is a side view of an example structural member that is curved.
Figure 11C:
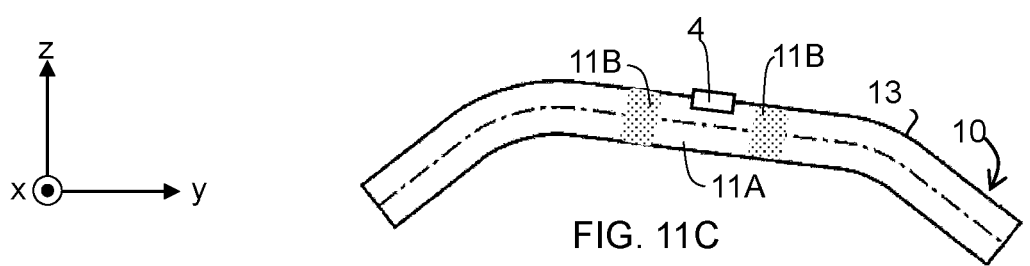
FIG. 11C is a side view of an example structural member that is curved.
Figure 11D:
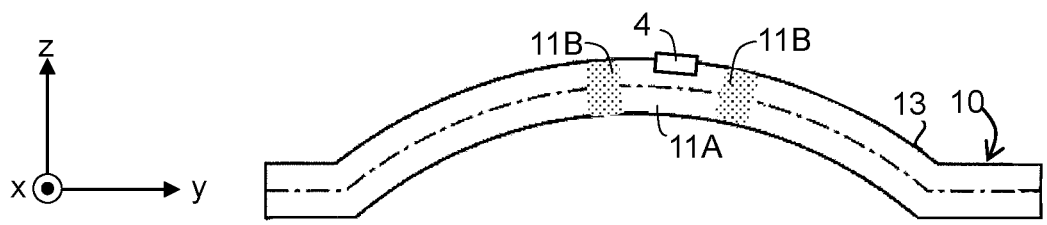
FIG. 11D is a side view of an example structural member that is curved.

FIGS. 11A to 11D are side views of example implementations of the structural member 10 that are curved along the longitudinal direction. In the implementations shown in FIGS. 11A to 11D, the structural member 10 is curved to protrude from the top-plate portion 13. In FIG. 11A, the structural member 10 is curved with a constant curvature along the entire length. In 11B and 11C, the curvature varies depending on the position as determined along the longitudinal direction of the CCSS of the structural member 10 (i.e. direction of extension of the first ridges). In FIG. 11D, a longitudinal section of the structural member 10 is curved. In each of the implementations shown in FIGS. 11A and 11D, the structural member 10 is curved so as to be left-right symmetrical as viewed in a direction perpendicular to the side walls 11 and 12 (i.e. x-direction). In each of FIGS. 11B, 11C and 11D, the structural member 10 includes a portion that is curved (i.e. curved portion) and a portion extending along a straight line (i.e. straight portion). In the implementation shown in FIG. 11C, curved portions are positioned on both ends of the straight portion as determined along the longitudinal direction. That is, a straight portion is positioned between the curved portions. In the implementation shown in FIG. 11D, straight portions are positioned on both ends of the curved portion as determined along the longitudinal direction.

Curving the structural member 10 in this manner improves the impact resistance to an impact in the direction opposite to the direction of protrusion of the curve. For example, a structural member including a curved structural member 10 with its both ends supported has a high impact resistance to an impact in the direction opposite to the direction of protrusion of the curve. In view of this, when the structural member 10 is used in an automobile, the structural member 10 is positioned such that the protrusion is in the outward direction with respect to the vehicle body.

In the implementations shown in FIGS. 11A and 11D, a pair of low-strength portions 11B and a high-strength portion 11A located therebetween in each side wall 11 are located in the curved portion of the structural member 10. In the implementations shown in FIGS. 11B and 11C, a pair of low-strength portions 11B and a high-strength portion 11A located therebetween in each wall 11 are located in the straight portion of the structural member 10. When the low-strength portions 11B and high-strength portion 11A are located in the straight portion, it is desirable that the high-strength portion 11A be located in the middle of the straight portion. Thus, the high-strength portion 11A is located in a portion where a high moment is caused by a received impact, thereby providing high impact resistance.

Figure 12A:
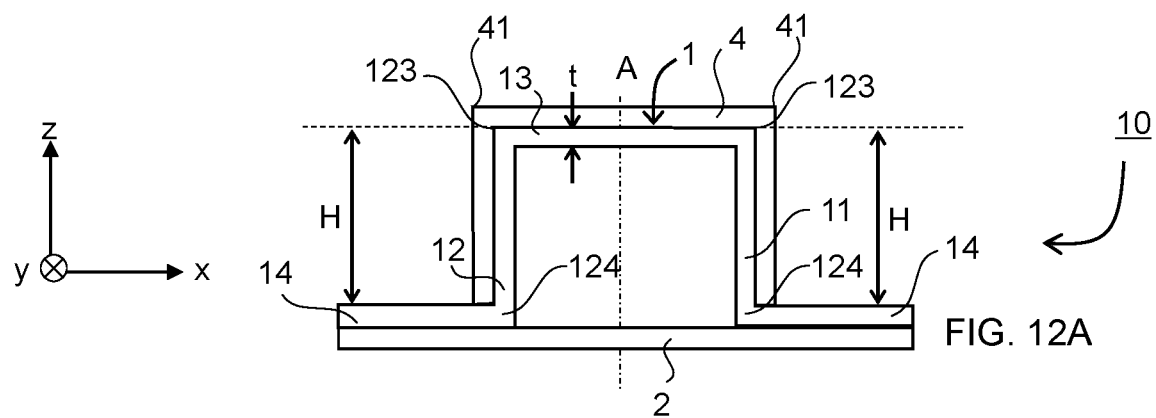
FIG. 12A shows a variation of the structural member with a different positioning of the reinforcing member.
Figure 12B:
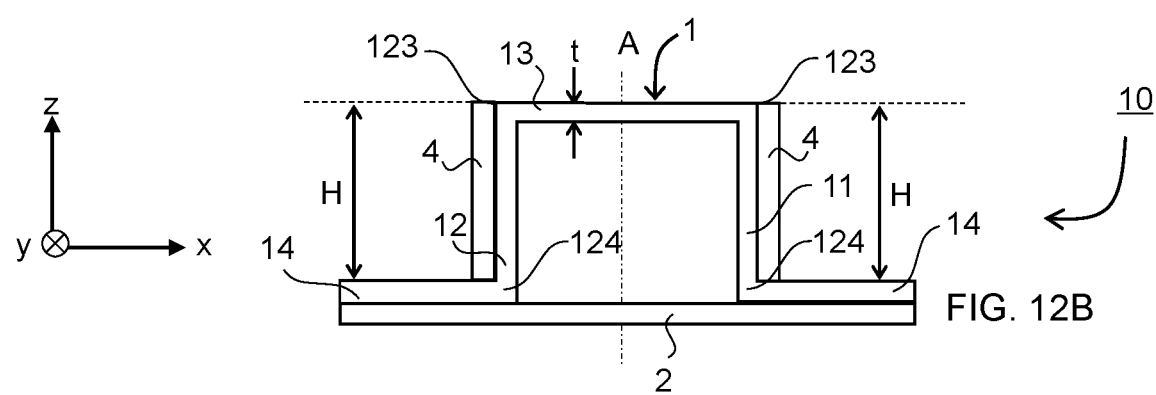
FIG. 12B shows a variation of the structural member with a different positioning of the reinforcing member.

The positioning of the reinforcing member on the structural member is not limited to the above-discussed examples. FIGS. 12A to 12D show variations of the reinforcing member 4 with different positionings. In the implementations shown in FIGS. 2, 5, 6 and 9, the reinforcing member 4 is positioned in contact with a portion of the range starting at the one of the ends of a side wall 11, 12 as determined along the height direction (i.e. first ridge 123) and ending at the other end (i.e. second ridge 124). Alternatively, in the implementation shown in FIG. 12A, the reinforcing member 4 is positioned in contact with the entire range starting at the one of the ends of a side wall 11, 12 as determined along the height direction (i.e. first ridge 123) and ending at the other end (i.e. second ridge 124). Alternatively, as shown in FIG. 12B, for example, the reinforcing member 4 may be positioned in contact with the side walls 11 and 12 and not in contact with the top-plate portion 13. The structural member shown in FIG. 12A may be suitably used as a regular-hat member or an inverted-hat member. The structural member shown in FIG. 12B may be suitably used as an inverted-hat member. Alternatively, starting from the implementations of FIGS. 12A and 12B, the reinforcing member 4 may be positioned in contact with the flanges 14, too. That is, the reinforcing member 4 may be in contact with both the side walls 11 and 12 and the flanges 14.

Figure 12C:
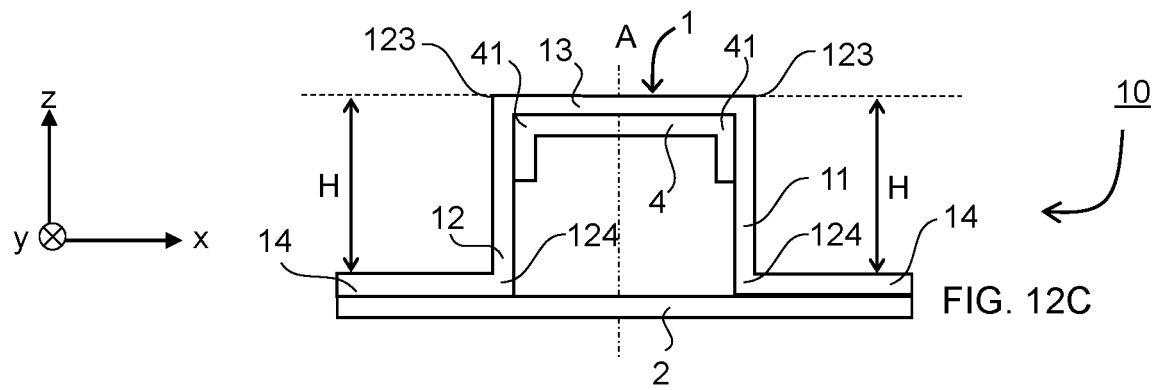
FIG. 12C shows a variation of the structural member with a different positioning of the reinforcing member.

In the structural member shown in each of FIGS. 2, 5, 6 and 9, the reinforcing member 4 is positioned in contact with the outer surface of the CCSS. Alternatively, for example, as shown in FIG. 12C, the reinforcing member 4 may be positioned in contact with the inner surface of the CCSS. In the implementation shown in FIG. 12C, the structural member 4 is positioned in contact with the inner surface portion of the CCSS that is associated with the top-plate portion 13 and the inner surface portions of the CCSS that are associated with the side walls 11 and 12. In such implementations, the reinforcing member 4 is formed from a plate bent along two lines extending in the same direction as the first ridges 123. The bent portions of the reinforcing member 4 represent ridges 41. That is, the reinforcing member 4 includes two ridges 41. The two ridges of the reinforcing member 4 may be or may not be in contact with the two first ridges 123 of the hat member 1.

Figure 12D:
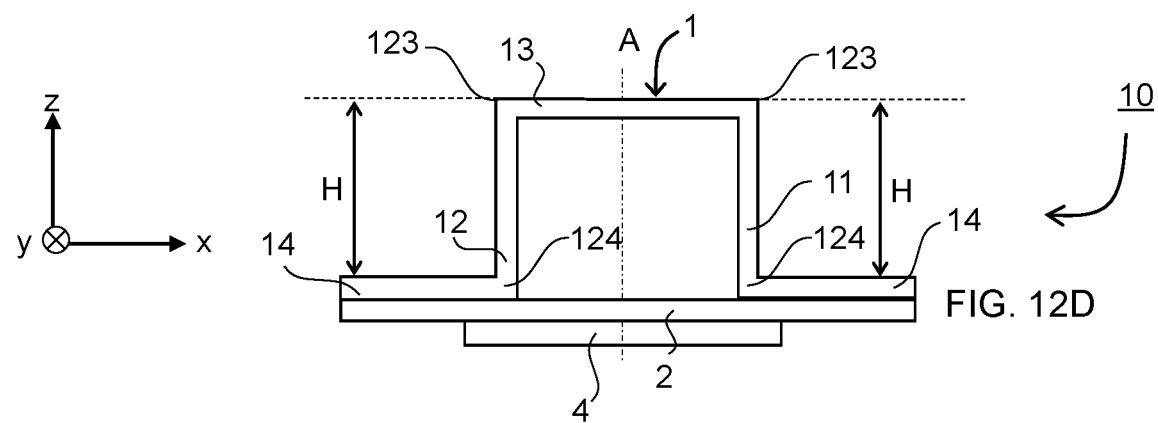
FIG. 12D shows a variation of the structural member with a different positioning of the reinforcing member.

For example, as shown in FIG. 12D, the reinforcing member 4 may be positioned on the closing plate 2. In such implementations, the reinforcing member 4 contributes to the improvement of the rigidity of the structural member 10 against an impact on the closing plate 2.

Figure 12E:
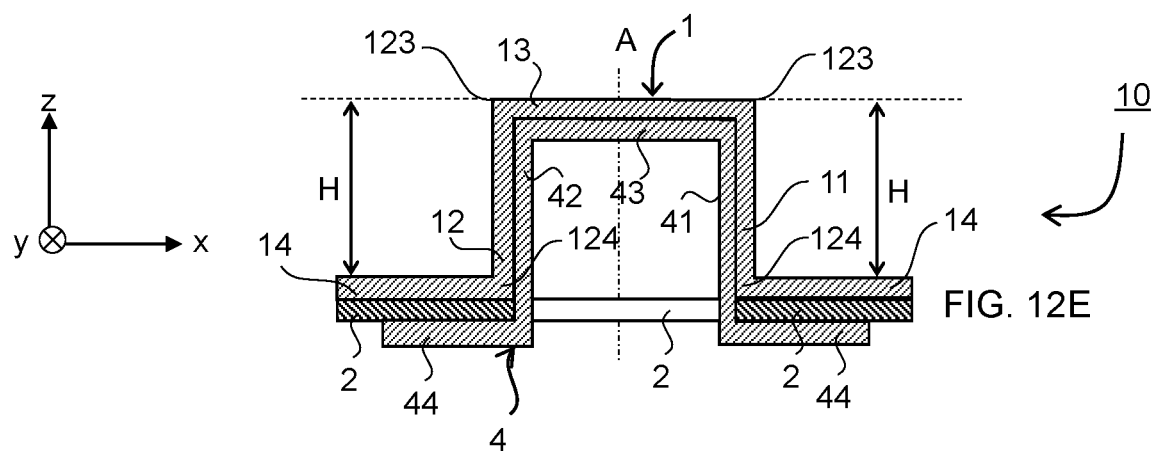
FIG. 12E shows a variation of the structural member with a different positioning of the reinforcing member.

Alternatively, FIG. 12E shows an implementation where the reinforcing member 4 is positioned in contact with both the closing plate 2 and the inner surface of the CCSS. FIG. 12E shows a cross section of the structural member 10 perpendicular to the y-direction. In the implementation shown in FIG. 12E, the closing plate 2 has a through-hole. The reinforcing member 4 is inserted through the through-hole in the closing plate 2. The reinforcing member 4 is positioned in contact with the closing plate 2 and the top-plate portion 13 and side walls 11 and 12 of the hat member 1. In this implementation, the reinforcing member 4 has a hat-shaped cross section. The reinforcing member 4 includes a top-plate portion 43, two side walls 41 and 42, and two flanges 44. The two side walls 41 and 42 extend from both ends of the top-plate portion 43. The two flanges 44 extend away from each other from those ends of the two side walls 41 and 42 which are opposite to the ends adjacent to the top-plate portion 43. The top-plate portion 43 of the reinforcing member 4 is in contact with the top-plate portion 13 of the hat member 1. The side walls 41 and 42 of the reinforcing member is in contact with the side walls 11 and 12 of the hat member. The flanges 44 of the reinforcing member 4 are in contact with the closing plate 2. In the implementation shown in FIG. 12E, the reinforcing member 4 contributes to the improvement of the rigidity of the structural member 10 against both an impact on the top-plate portion 13 and an impact on the closing plate 2.

Figure 12F:
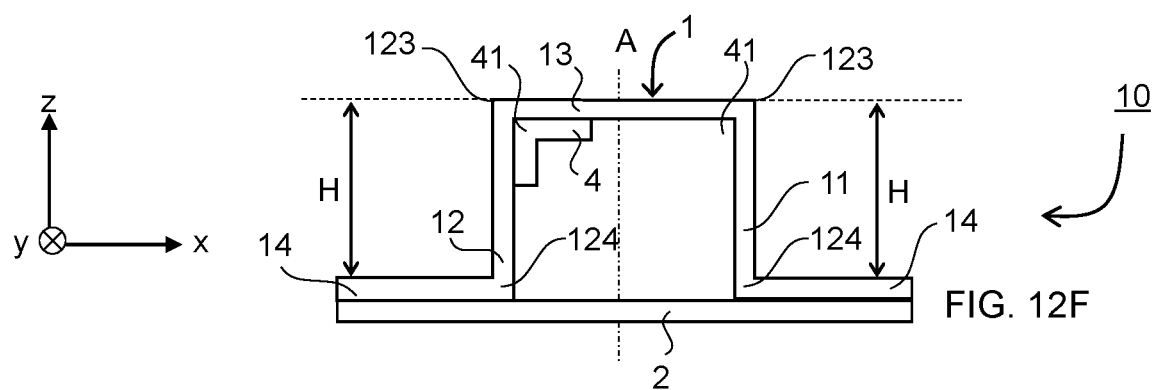
FIG. 12F shows a variation of the structural member with a different positioning of the reinforcing member.

FIG. 12F shows an implementation where the reinforcing member 4 is provided on that end of the top-plate portion 13 which extends along one of the two first ridges 123. Specifically, as viewed in the longitudinal direction of the CCSS (i.e. y-direction), the reinforcing member 4 is fixed to the CCSS where the reinforcing member is in contact with a portion of the top-plate portion 13 that is closer to one of the two first ridges 123 than the middle of the top-plate portion. The reinforcing member 4 extends from the end of the top-plate portion 13 adjacent to the first ridge 123 over one side wall 12. Thus, positioning the reinforcing member 4 in contact with a portion of the top-plate portion 13 closer to one of the two first ridges 123 than the middle of the top-plate portion will improve the rigidity of the structural member against an impact on the top-plate portion.

Figure 12G:
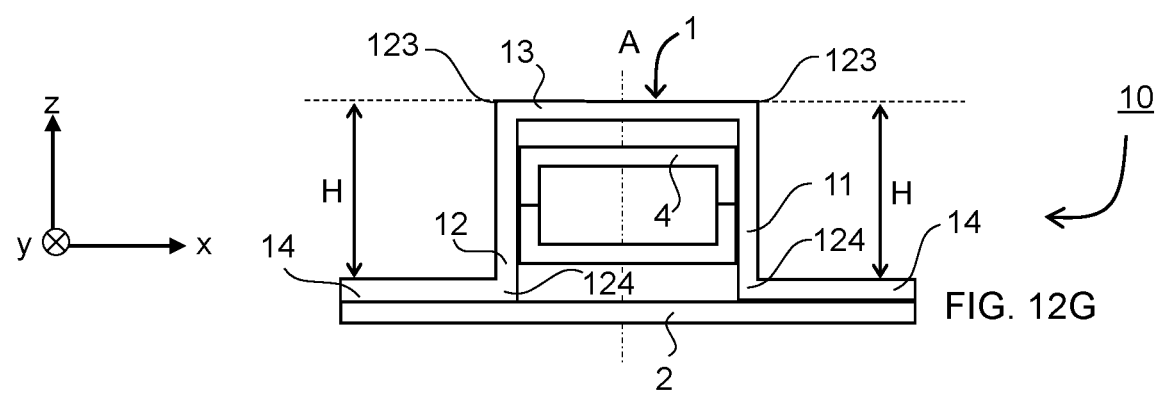
FIG. 12G shows a variation of the structural member with a different positioning of the reinforcing member.

FIG. 12G shows an implementation where a tubular reinforcing member 4 is positioned inside a CCSS. The tubular reinforcing member 4 is fixed to the side walls 11 and 12 where the reinforcing member is in contact with the inner surfaces of the two side walls 11 and 12. The axial direction of the tubular reinforcing member 4 (i.e. longitudinal direction) is the same as the longitudinal direction of the CCSS. In the implementation shown in FIG. 12G, the tubular reinforcing member 4 is neither in contact with the top-plate portion 13 nor closing plate 2. In another variation, a tubular reinforcing member 4 may be in contact with both the top-plate portion 13 and closing plate 2.

FIG. 12H shows an implementation where a plate-shaped reinforcing member 4 is positioned inside the CCSS. Both ends of the plate-shaped reinforcing member 4 is fixed to the side walls 11 and 12, being in contact with the inner surfaces of the two side walls 11 and 12. The plate-shaped reinforcing member 4 is neither in contact with the top-plate portion 13 nor closing plate 2. The distance between the plate-shaped reinforcing member 4 and closing plate 2, SA, is not larger than a distance KA. The distance KA is defined as the height of the curved (round) portion along the border between a side wall 11 or 12 and a flange 14, as measured in the direction perpendicular to the closing plate 2. In other words, with a curved (round) portion being along the border between a side wall 11 or 12 and a flange 14, the distance KA is defined as the distance between that border (or end) of the round portion which is adjacent to the side wall 11 or 12, Rd1, on one hand, and the inner surface of the closing plate 2, on the other.

The curved portions along the borders between the side walls 11 and 12 and flanges 14 can easily be crushed by a load in the direction perpendicular to the closing plate 2, while the portions of the side walls 11 and 12 other than the curved portions have high yield strength. For example, if an arrangement without an reinforcing member 4 receives an impact on the closing plate 2, the curved portions tend to be crushed such that the portions of the side walls 11 and 12 which are located between the borders of the round portions and the first ridges 123 must resist the impact. If the distance SA between the reinforcing member 4 and closing plate 2 is not larger than the distance KA, i.e. height of the curved portions as shown in FIG. 12H, this will reduce deformation of the curved portions upon reception of an impact. This will improve the rigidity of the structural member against an impact on the closing plate 2.

FIG. 12I shows an implementation where reinforcing members 4, located outside the CCSS, are in contact with both the flanges 14 and side walls 11 and 12. The reinforcing members 4 are fixed to both the flanges 14 and side walls 11 and 12. Each reinforcing member 4 extends from the associated flange 14 to a position on the associated side wall 11 or 12 that is the distance KA or more away from the closing plate 2. That is, the reinforcing members 4 are in contact with, and fixed to, the flanges 14 and the portions of the side walls 11 and 12 up to positions KA or more distant from the closing plate 2. The distance KA is defined as the height of the curved (or round) portion along the border between a side wall 11 or 12 and a flange 14, as measured in the direction perpendicular to the closing plate 2. The distance KB between that end of an reinforcing member 4 located closest to the associated first ridge 123, on one hand, and the closing plate 2, on the other, is larger than the distance KA (KB>KA). Thus, providing reinforcing members 4 in contact with the flanges 14 and side walls 11 and 12 will prevent the curved (round) portions between the side walls 11 and 12 and flanges 14 from deforming due to an impact on the closing plate 2. This will improve the rigidity of the structural member against an impact on the closing plate 2.

Figure 12J:
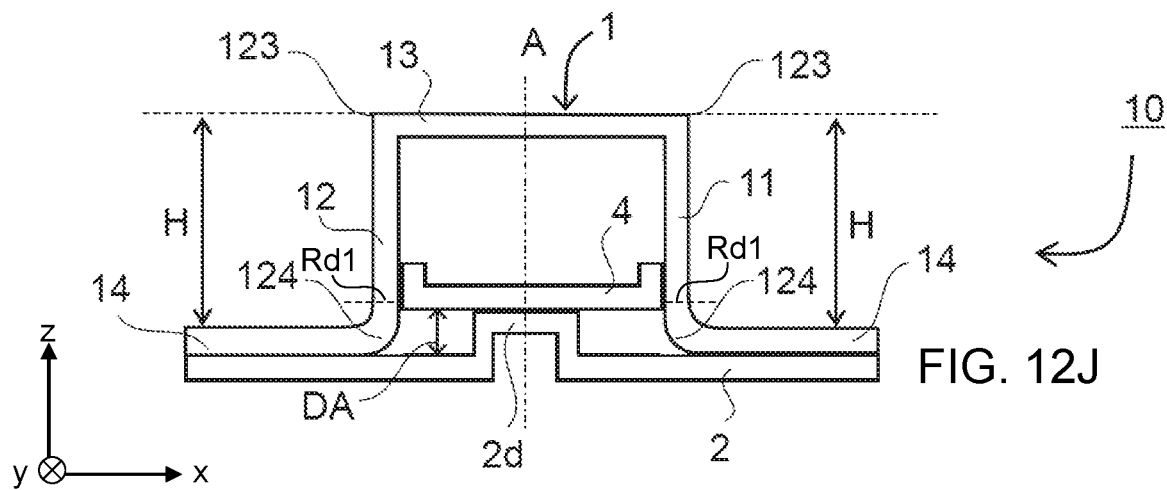
FIG. 12J shows a variation of the structural member with a different positioning of the reinforcing member.

FIG. 12J shows an implementation where the closing plate 2 has a recessed portion 2d that is located between its contacts with the two flanges 14 and is recessed inwardly with respect to the CCSS. The reinforcing member 4, located inside the CCSS, is positioned to be in contact with the recessed portion 2d. Both ends of the reinforcing member 4 are fixed to the two side walls 11 and 12, being in contact with the two side walls 11 and 12. The reinforcing member 4 shown in FIG. 12J is shaped as a plate. Alternatively, the reinforcing member 4 may be tubular in shape. The depth of the recessed portion 2d as measured in the direction perpendicular to the closing plate 2 (i.e. z-direction), DA, is not larger than ⅖ or 40% of the distance between the first ridge 123 and second ridge 124 of a side wall 11 or 12.

Alternatively, the reinforcing member 4 may not be in contact with the recessed portion 2d. In such implementations, the distance between the reinforcing member 4 and recessed portion 2d as measured in the direction perpendicular to the closing plate 2 is not larger than the distance KA. The distance KA is defined as the height of the curved portion along the border between a side wall 11 or 12 and a flange 14 as measured in the direction perpendicular to the closing plate 2. The height of the curved portion is the distance between the closing plate 2 and that end of the round portion which is adjacent to the side wall 11 or 12, Rd1. As the distance between the reinforcing member 4 and recessed portion 2*d* is not larger than the distance KA, the curved portion along the border between a flange 14 and a side wall 11 or 12 will be prevented from deforming upon an impact. Providing an reinforcing member 4 inside the CCSS so as to be adjacent to the recessed portion of the closing plate 2 in this manner will improve the rigidity of the structural member against an impact on the closing plate 2.

Figure 12K:
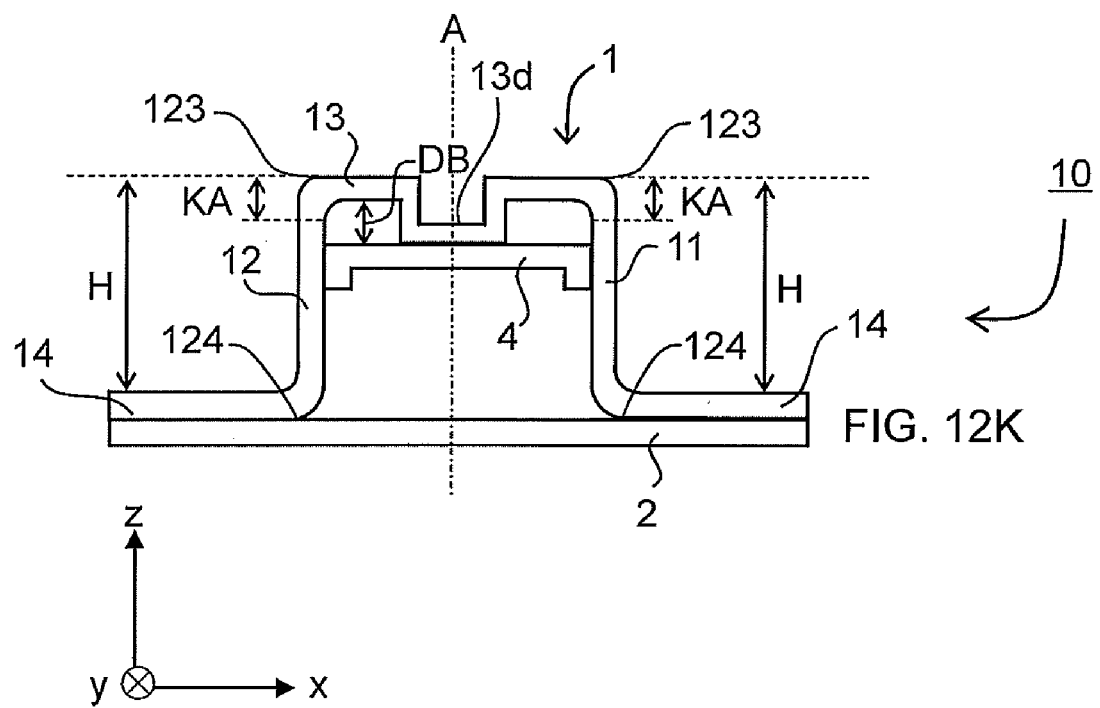
FIG. 12K shows a variation of the structural member with a different positioning of the reinforcing member.

FIG. 12K shows an implementation where the top-plate portion 13 has a recessed portion 13*d* recessed inwardly with respect to the CCSS. The reinforcing member 4, located inside the CCSS, is positioned in contact with the recessed portion 13*d*. Both ends of the reinforcing member 4 are fixed to the two side walls 11 and 12, being in contact with the two side walls 11 and 12. The reinforcing member 4 shown in FIG. 12K is shaped as a plate. Alternatively, the reinforcing member 4 may be tubular in shape. Both ends of the reinforcing member 4 are fixed to the two side walls 11 and 12, being in contact with the two side walls 11 and 12. The depth of the recessed portion 13*d* as measured in the direction perpendicular to the top-plate portion 13 (i.e. z-direction), DB, is not larger than ⅖ or 40% of the distance between the first ridge 123 and second ridge 124 of the side wall 11 or 12.

Alternatively, the reinforcing member 4 may not be in contact with the recessed portion 13*d*. In such implementations, the distance between the reinforcing member 4 and recessed portion 13*d* as measured in the direction perpendicular to the top-plate portion 13 is not larger than the distance KA. The distance KA is defined as the height of the curved portion along the border between a side wall 11 or 12 and the top-plate portion 13 as measured in the direction perpendicular to the top-plate portion 13. The curved portions along the borders between the side walls 11 and 12 and top-plate portion 13 can easily be crushed by a load in the direction perpendicular to the top-plate portion 13, and the portions of the side walls 11 and 12 other than the curved portions have high yield strength. For example, if an arrangement without an reinforcing member 4 receives an impact on the top-plate portion 13, the curved portions tend to be crushed such that the portions of the side walls 11 and 12 which are located between the borders of the round portions and the second ridges 124 must resist the impact. If, starting from the arrangement shown in FIG. 12K, the distance between the reinforcing member 4 and the recessed portion 13*d* of the top-plate portion 13 is not larger than the distance KA, i.e. height of the curved portions, this will reduce deformation of the curved portions upon reception of an impact. Providing an reinforcing member 4 inside the CCSS so as to be adjacent to the recessed portion of the top-plate portion 13 in this manner will improve the rigidity of the structural member against an impact on the top-plate portion 13.

[Applications in Vehicles]

As discussed above, if the structural member 10 is to be used as a structural member for a vehicle, the structural member 10 may be attached to the vehicle where the member is supported thereon at two connections that are separated in the longitudinal direction of the tubular portion. The structural member 10 may be used, for example, as a structural member for a vehicle body, bumper or vehicle door. As such, a vehicle body, bumper or vehicle door including the structural member 10 are encompassed by the embodiments of the present invention.

A side wall 11 of a structural member 10 supported at two connections has two low-strength portions 11B separated in the longitudinal direction and a high-strength portion 11A located therebetween, all positioned between the two connections. The other side wall 12, facing the side wall 11, has a high-strength portion 12A and low-strength portions 12B positioned in an analogous manner. Thus, portions of the structural member 10 where a moment upon an impact can be large are less likely to be sharply bent. This will provide a structural member with high impact resistance.

Especially central portions of the member tend to experience large moments upon an impact. In view of this, it is desirable that each of the high-strength portions 11A and 12A be positioned at a position equally distant from the two connections (i.e. in the middle between the two connections). Further, it is desirable to support both ends of a structural member 10 having high-strength portions 11A and 12A located in the middle of the tubular portion as determined along the longitudinal direction. Implementations where both member ends are supported include not only implementations where both ends of the structural member 10 are supported, but also implementations where portions of the structural member 10 near its both ends are supported.

If a structural member 10 is mounted on a vehicle, the structural member 10 is often positioned such that the longitudinal profile of the tubular portion of the structural member 10 extends along the outer shape of the vehicle. That is, the structural member 10 is often mounted on the vehicle such that an impact derived from a crash of the vehicle is in a direction perpendicular to the longitudinal direction of the structural member 10. Further, the structural member 10 may be mounted on the vehicle such that the top-plate portion 13 is positioned outward with respect to the vehicle and the closing plate 2 is positioned inward with respect to the vehicle. In such implementations, the high-strength portion 11A is positioned in the middle between the connections of the structural member 10, and the low-strength portions 11B are positioned to sandwich it. As such, when the structural member 10 receives an impact from outside the vehicle, the structural member 10 protrudes inwardly of the vehicle to a smaller extent. Alternatively, the closing plate 2 may be positioned outward with respect to the vehicle. In such implementations, too, the high-strength portion 11A is positioned in the middle between the connections of the structural member 10, and the low-strength portions 11B are positioned to sandwich it. In implementations where the closing plate 2 is positioned outward with respect to the vehicle, too, when the structural member 10 receives an impact from outside the vehicle, the structural member 10 protrudes inwardly of the vehicle to a smaller extent.

The structural member 10 may be curved, as discussed above. In such implementations, the structural member 10 is mounted on the vehicle to protrude outwardly with respect to the vehicle. Thus, when the structural member 10 receives an impact from outside the vehicle, the member is less likely to be bent sharply.

The structural member 10 may serve as a structural member constituting part of a vehicle body, a bumper or a vehicle door. For example, the structural member 10 may be used in a member constituting part of the vehicle body, such as an A-pillar, a B-pillar, a side sill, a locker, a roof rail, a floor member, and a front side member. Alternatively, the structural member 10 may be used in a member to be mounted on the vehicle body, such as a door impact beam or a bumper reinforcement, to protect a device or a passenger inside the vehicle from impacts from outside.

Figure 13:
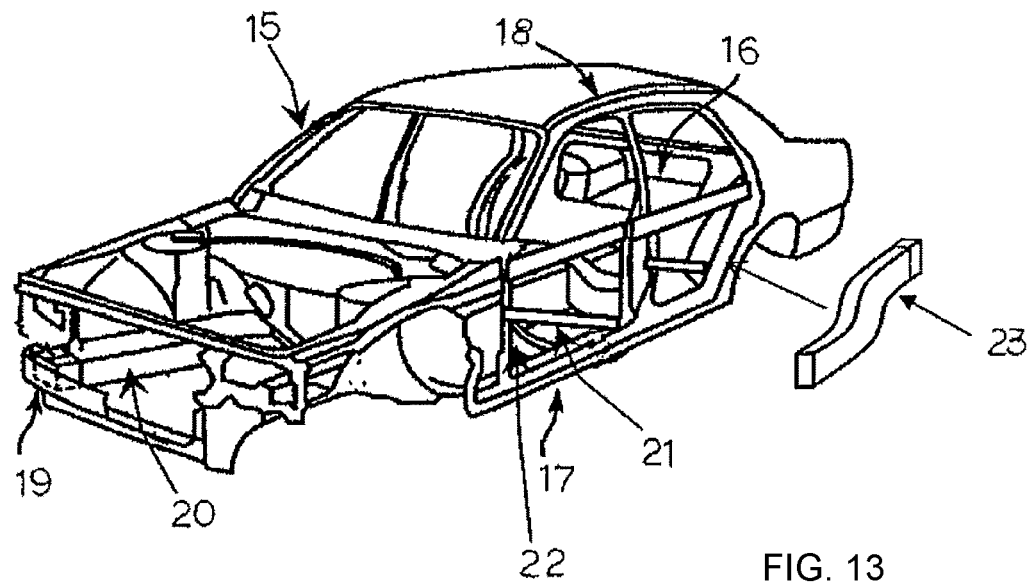
FIG. 13 shows an example structural member positioned in a vehicle.

FIG. 13 shows an exemplary structural member mounted on a vehicle that uses a monocoque structure. In the implementation shown in FIG. 13, an A-pillar 15, a B-pillar 16, a locker 17, a roof rail 18, a bumper reinforcement 19, a floor side member 20, a door impact beam 21, a floor member 22 and a rear side member 23 are used as vehicle structural members. At least one of these vehicle structural members may be constituted by the structural member 10 discussed above.

Figure 14:
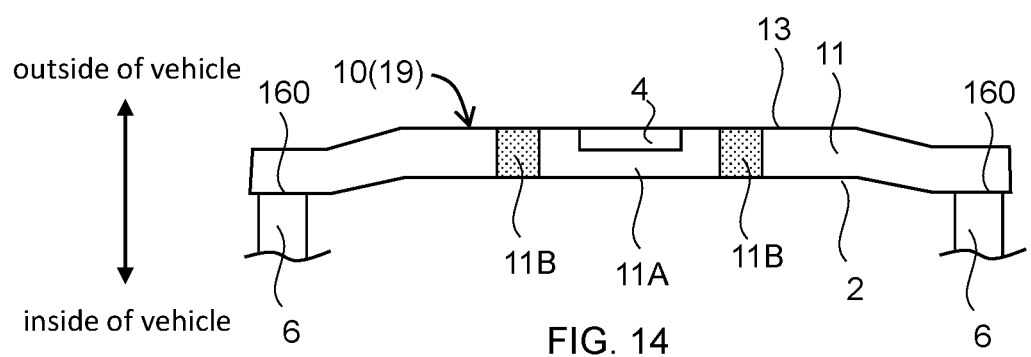
FIG. 14 shows an example construction of a bumper reinforcement.

FIG. 14 shows an exemplary construction of the structural member 10 used as a bumper reinforcement 19. The bumper reinforcement 19 shown in FIG. 14 is constituted by the above-described structural member 10. The side wall 11 of the structural member 10 has a high-strength portion 11A and low-strength portions 11B arranged in the longitudinal direction. If the structural member 10 is used as a bumper reinforcement 19, the structural member 10 is constructed such that its both ends are supported by the front side member 20. A crush box may be provided between the bumper reinforcement 19 and front side member 20. In such implementations, the structural member 10 is constructed such that its both ends are supported by the crush box.

That is, the CCSS of the structural member 10 is connected to another member, i.e. support member 6, at two connections 160 that are separated in the longitudinal direction. The support member 6 may be, for example, a front side member 20 or crush box. In the implementation shown in FIG. 14, the top-plate portion 13 is positioned outward with respect to the vehicle, and the closing plate 2 is positioned inward with respect to the vehicle. The reinforcing member 4 covers that area of the top-plate portion 13 which is positioned outward with respect to the vehicle, and covers portions of the side walls 11. In the implementation shown in FIG. 14, the moment of a load from an impact is largest when the impact is applied to the middle portion of the bumper reinforcement 19 as determined along the longitudinal direction. The high-strength portions 11A and 12A are positioned in the longitudinal middle of the bumper reinforcement 19, and the low-strength portions 11B and 12B are positioned to sandwich them. The reinforcing member 4 is positioned to overlap the high-strength portion 11A as determined along the longitudinal direction. This will reduce sharp-bending deformation due to an impact applied from outside the vehicle to the middle portion of the bumper reinforcement 19.

Figure 15:
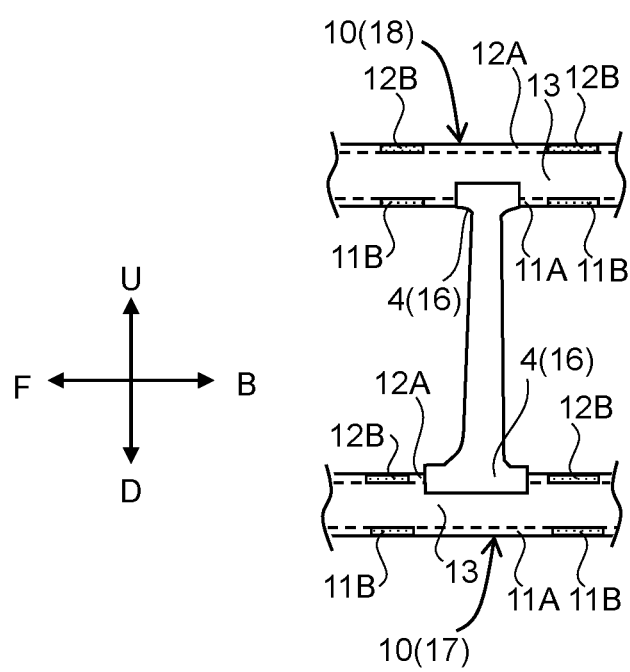
FIG. 15 shows an example arrangement of a locker, a B-pillar and a roof rail.

FIG. 15 shows an exemplary arrangement in which the structural member 10 construction is applied to the locker 17 and roof rail 18. In FIG. 15, the arrow F indicates the forward direction with respect to the vehicle. The arrow B indicates the rearward direction with respect to the vehicle. The arrow U indicates the upward direction with respect to the vehicle. The arrow D indicates the downward direction with respect to the vehicle. In the vehicle implementation shown in FIG. 15, the locker 17 and roof rail 18 are each constituted by a structural member 10 as discussed above. These structural members 10 are positioned in such a manner that their longitudinal direction is aligned with the front-rear direction of the vehicle. The top-plate portions 13 of these structural members 10 are positioned outward with respect to the vehicle. The closing plates 2 of these structural members 10 (not shown in FIG. 15) are positioned inward with respect to the vehicle.

For each of the locker 17 and roof rail 18, the side walls 11 of the structural member 10 have a high-strength portion 11A and low-strength portions 11B arranged in the longitudinal direction. One end of a B-pillar 16 is connected to the high-strength portion 11A of the locker 17. The other end of the B-pillar 16 is connected to the other end of the roof rail 18. That portion of the B-pillar 16 which is connected to the locker 17 provides the reinforcing member 4 of the structural member 10 constituting the locker 17. That portion of the B-pillar 16 which is connected to the roof rail 18 provides the reinforcing member 4 of the structural member 10 constituting the roof rail 18.

The B-pillar 16 is formed from a tubular member including a CCSS. The one end of the B-pillar 16 is connected to the top-plate portion 13 and side walls 12 of the structural member 10 constituting the locker 17. The other end of the B-pillar 16 is connected to the top-plate portion 13 and side walls 11 of the structural member 10 constituting the roof rail 18. The positioning of the top-plate portion 13 of the structural member 10 is not limited to the implementation shown in FIG. 15. For example, the top-plate portion 13 of the structural member 10 constituting the locker 17 may be positioned upward as determined along the top-bottom direction of the vehicle, while the closing plate 2 may be positioned downward as determined along the top-bottom direction of the vehicle. The top-plate portion 13 of the structural member 10 constituting the roof rail 18 may be positioned downward as determined along the top-bottom direction of the vehicle, while the closing plate 2 may be positioned upward as determined along the top-bottom direction of the vehicle.

The arrangement shown in FIG. 15 prevents sharp-bending deformation of the locker 17 and roof rail 18 upon an impact from outside the vehicle on their portions connected to the B-pillar.

The above-discussed effects are significant if the structural member 10 constituting a structural member of a vehicle is made of an ultrahigh strength steel with a tensile strength (i.e. tensile strength of the portions other than the low-strength portions 11B and 12B) not lower than 780 MPa (or a yield strength not lower than 400 MPa). The effects are still more significant if the portions of the structural member 10 other than the low-strength portions 11B and 12B have a strength represented by a tensile strength not lower than 980 MPa (or yield strength not lower than 500 MPa).

Vehicles in which the structural member 10 may be used are not limited to four-wheel vehicles like the automobile shown in FIG. 13. For example, the structural member 10 may be used as a structural member in a two-wheel vehicle. Further, the structural member 10 may be used not only in a vehicle using a monocoque structure, but also in a vehicle body using a frame structure. Further, applications of a structural member constituted by the structural member 10 are not limited to vehicles. For example, the structural member 10 may be used as a structural member of an impact-resistant container, a building, a ship, or an airplane.

Further, implementations where the structural member 10 is used are not limited to implementations where the two ends of the structural member 10 are connected to another member. Another member may be connected to any two positions on the CCSS of the structural member 10 that are separated from each other by 6H or more as measured in the longitudinal direction. That is, the positions of the two connections are not limited to the two ends, but may be any positions on the structural member 10.

[Manufacture Process]

The entire structural member 10 may be formed from one and the same material. The structural member 10 may be formed, for example, from a steel plate. The process for manufacturing the structural member 10 includes the steps of: fabricating a hat member 1 having low-strength portions 11B and 12B and high-strength portions 11A and 12A; fabricating a closing plate 2; joining the hat member 1 and closing plate 2; and joining an reinforcing member to a CCSS formed by the hat member 1 and closing plate 2. The CCSS and reinforcing member 4 may be joined by welding, for example. The step of fabricating the hat member 1 includes the sub-step of creating a difference in strength in the material to form low-strength portions. The manufacturing process may further include the step of causing the hat member 1 and closing plate 2 to curve. The hat member 1 and closing plate 2 are caused to curve by a bending method such as press bending, stretch bending, compression bending, roll bending, MOS bending or eccentric plug bending, for example.

The process for manufacturing the structural member 10 includes the step of forming low-strength portions in the material. The forming of the low-strength portions is not limited to a particular method; for example, a steel plate may be deformed by roll forming to have a hat-shaped cross section, and the material may be locally heated and quenched using a laser or by high-frequency heating, for example, to produce a hat member 1 including hardened regions. In such cases, the regions that have not been quenched constitute low-strength portions with relatively low strengths. Alternatively, the entire hat member 1 may be strengthened by thermal refining, and local annealing may then be performed to form low-strength portions.

Alternatively, the structural member 10 may be fabricated using hot pressing (hot stamping) techniques. During hot pressing, heating or cooling conditions may be varied locally within the one and the same material to form low-strength regions in the material. For example, a steel plate may be heated to a temperature that causes steel to form a single-phase austenitic region (i.e. Ac3 temperature) or higher, and quenched while being shaped using a mold. A difference in the cooling rate during this is created such that the rapidly cooled portions provide a generally hard martensitic microstructure and the slowly cooled portions provide a soft mixed-phase microstructure with ferrite and pearlite or a bainitic microstructure. Thus, the slowly cooled portions provide low-strength regions. Alternatively, the entire member may be subjected to hot pressing to provide a high-strength portion of a martensite microstructure, and local quenching may then be performed to form low-strength portions.

The method of manufacturing the structural member 10 is not limited to the above-discussed example. For example, tailored blank or other known methods may be used to form a structural member 10 with low-strength portions.

In the structural member 10 discussed above, the yield-strength distribution in the high-strength portion 11A and 12A may not be uniform. In a stationary range, the variation in yield strength is normally within ±10%. 90% of the maximum, Smax, of yield strength in the high-strength portion 11A and 12A defines the yield strength (or reference strength) of the high-strength portions 11A and 12A, SA (SA=0.9 Smax). The range of yield strengths higher than 0.85 SA and lower than 0.9 SA (i.e. 85% to 90% of SA) (transitional range) is deemed to be part of the high-strength portion 11A and 12A. Yield strength in the high-strength portion 11A and 12A is higher than 0.85 SA (i.e. 85% of SA). That is, the range of yield strengths higher than 0.85 SA represents the high-strength portion 11A or 12A.

Figure 16:
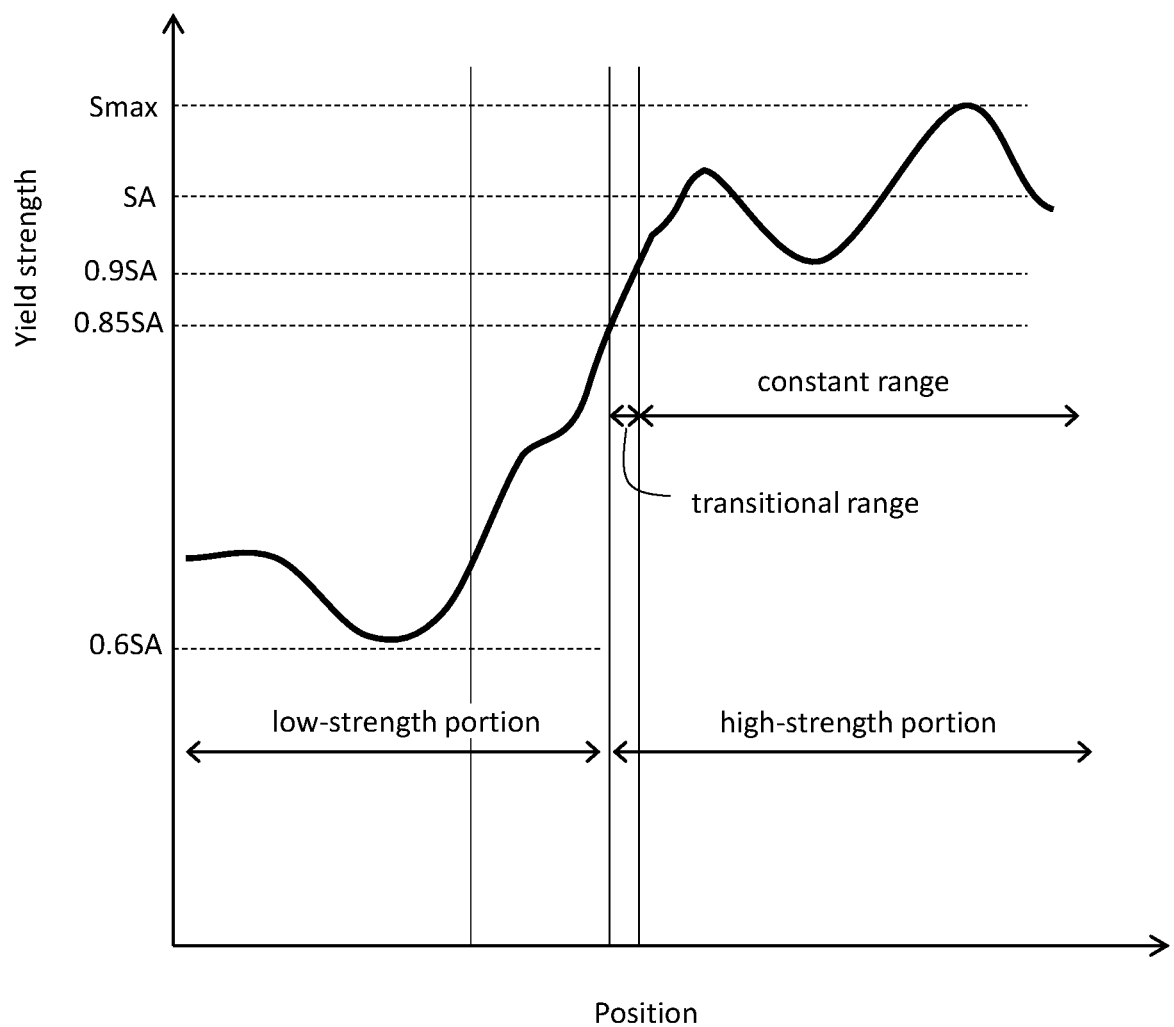
FIG. 16 shows an example yield-strength distribution in a portion of the structural member that includes the border between a low-strength portion and the high-strength portion.

FIG. 16 shows an example of the yield-strength distribution in a portion of the member including the boundary between a low-strength portion 11B or 12B and a high-strength portion 11A or 12A. In FIG. 16, the vertical axis represents yield strength, while the horizontal axis represents the position in the y-direction. In the example of FIG. 16, 90% of the maximum Smax of yield strength in the high-strength portion (0.9 Smax) defines the yield strength SA of the high-strength portion. In the high-strength portion, the range of yield strengths not lower than 0.9 SA is referred to as constant range. Further, the range of yield strengths higher than 0.85 SA and lower than 0.9 SA is the transitional range, which stretches between the low-strength portion and the constant range of the high-strength portion. The transitional range is deemed to be part of the high-strength portion; the position of the yield strength of 0.85 A represents the boundary between the low-strength portion and high-strength portion. That is, the range of yield strengths higher than 0.85 SA forms the high-strength portion, while the range of yield strengths not more higher than 0.85 SA forms the low-strength portion.

The yield strength of the low-strength portion is not lower than 0.6 SA and not higher than 0.85 SA (60 to 85% of SA). Even if the structural member 10 includes some portions surrounded by a low-strength portion and having a strength not higher than 0.6 SA, they are deemed to be part of the low-strength portion 11B or 12B if they are small enough that their influence on the deformation behavior of the structural member 10 is negligible.

EXAMPLES

Figure 17A:
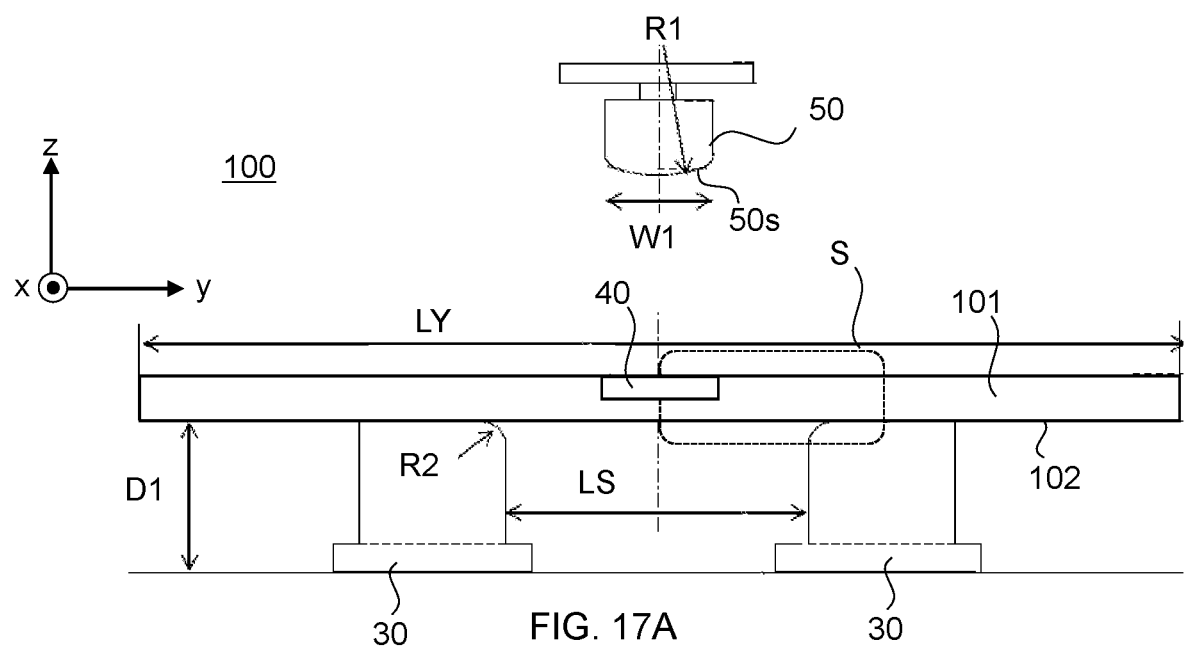
FIG. 17A shows the configuration of an analysis model for simulations.

For the present examples, simulated structural members each including a CCSS formed by a hat member and a closing plate with an reinforcing member provided thereon were created, and an impacter was caused to hit each of these structural members and their resulting deformation was analyzed. FIG. 17A shows a configuration of an analysis model in these simulations. In each of the present simulations, the structural member 100 was placed on two stands 30 so as to stretch over and between them and, with this condition kept, an impacter 50 was caused to hit the middle portion of the structural member 100 as determined along its longitudinal direction, and the resulting deformation behavior was analyzed.

Figure 17B:
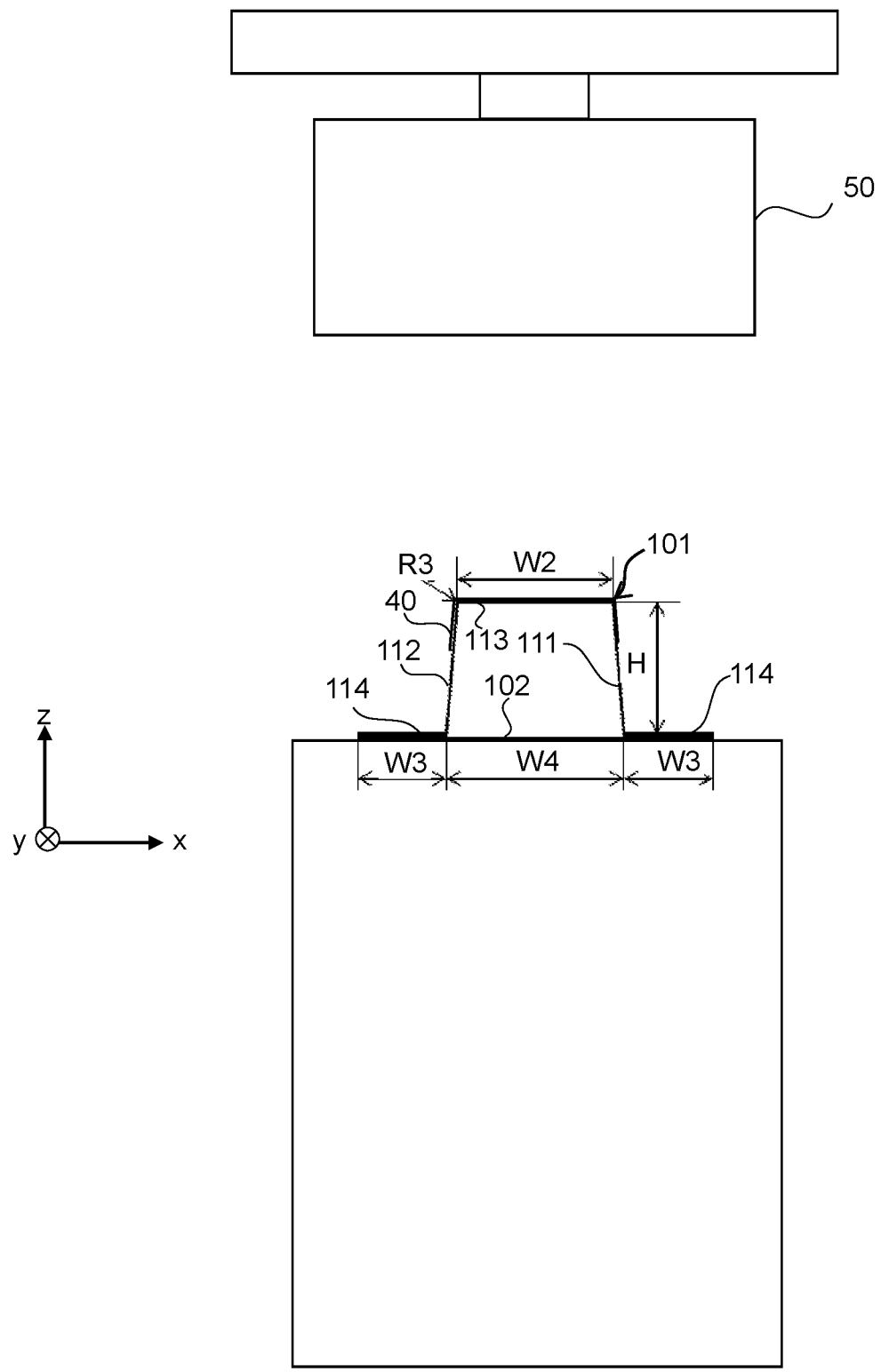
FIG. 17B shows the model of FIG. 17A as viewed in the y-direction.

FIG. 17B shows the structural member 100 of FIG. 17A as viewed in the y-direction. The structural member 100 includes a hat member 101 and a closing plate 102. The hat member 101 includes: a top-plate portion 113; a pair of side walls 111 and 112 extending from the two ends of the top-plate portion 113 and facing each other; and flanges 114 extending from those ends of the side walls 111 and 112 which are opposite to those adjacent to the top-plate portion 113, outwardly as determined along the direction in which these walls are arranged. The closing plate 102 is joined to the flange 114. An reinforcing member 40 is positioned in the middle of the hat member 101 as determined along the longitudinal direction (i.e. y-direction). The reinforcing member 40 covers portions of the top-plate portion 113 and side walls 111 and 112 of the hat member 101. With the model shown in FIGS. 17A and 17B, simulations where the impacter 50 was moved in the z-direction to hit the top-plate portion 113 and simulations where the impacter 50 was moved in the z-direction to hit the closing plate 102 were performed.

The mass of the impacter 50 was 350 kg; the width of the impacter 4 as measured in the y-direction, WI, was 160 mm; the radius of curvature of the impact surface 4s of the impacter 50, R1, was 150 mm; and the initial speed of the impacter 50 was 4 m/sec. The coefficient of friction was 0.1. The length of the tubular portion of the structural member 100 as measured in the longitudinal direction (i.e. y-direction), LY, was 1000 mm. The distance between the stands 30, LS, was 400 mm. The height of the stands 30, D1, was 145 mm. In a cross section of the structural member 100 (see FIG. 17B), the width of the top-plate portion 113, W2, was 50 mm, and the width of each flange 114, W3, was 40 mm. The distance between the two flanges 14, W4, was 65 mm. The height of each of the side walls 111 and 112, H, was 50 mm. The plate thickness of the hat member 101 and closing plate 102, t, was 1.4 mm; the size of the round portions between the top-plate portion 113 and side walls 111 and 112 (i.e. radius of curvature of the corners, or round-corner size) was 5 mm. The plate thickness of the reinforcing member 40 was 2.0 mm. The strength of the high-strength portions 10A was equivalent to YP 1200 MPa. The strength of the low-strength portions 10B was equivalent to YP 1000 MPa. The strength of the reinforcing member 40 was YP 1200 MPa.

Each of the pair of side walls 111 and 112 had a high-strength portion 10A and low-strength portions 10B positioned to sandwich the high-strength portion 10A such that these portions were arranged in the y-direction. The high-strength portion 10A was located in the middle of the structural member 10 as determined along the longitudinal direction. An reinforcing member 40 was positioned in the region associated with the high-strength portion 10A as determined along the y-direction. The impacter 4 was caused to hit the area of the top-plate portion 113 covered with the reinforcing member 40. The length LY of the structural member 100 as measured in the y-direction was 6 times or more the height H of the side walls 111 and 112 (LY≥6H).

Figure 17C:
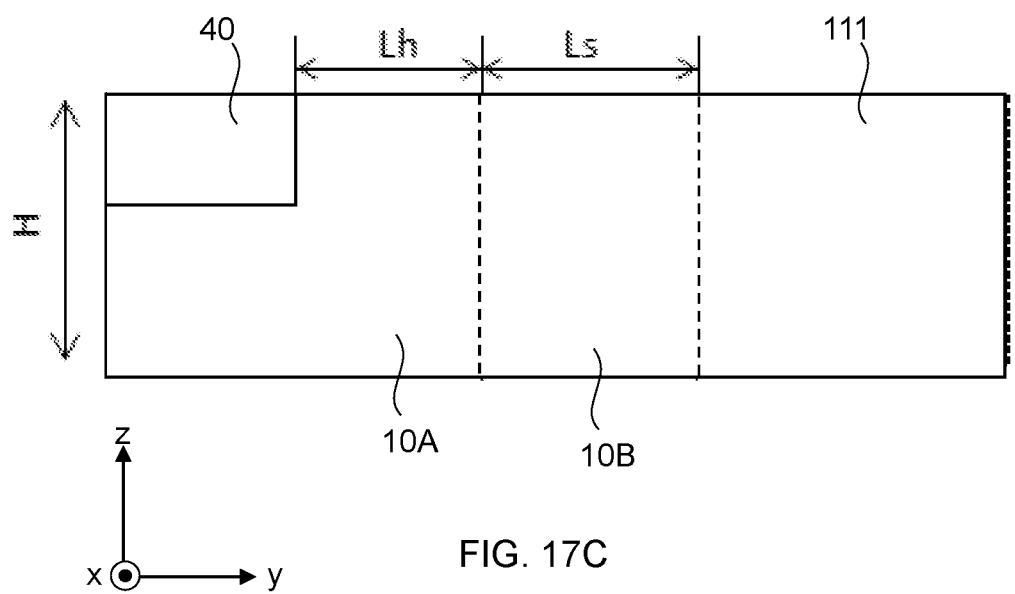
FIG. 17C is an enlarged view of the region S defined by the dotted line in FIG. 17A.

FIG. 17C is an enlarged view of the region S defined by dotted lines in FIG. 17A. The present analysis was conducted by simulating impacts with different distances Lh between an end of the reinforcing member 40 and the boundary between the high-strength portion 10A and the associated low-strength portion 10B as measured in the y-direction and with different dimensions Ls of each low-strength portion 10B as measured in the y-direction.

Figure 18:
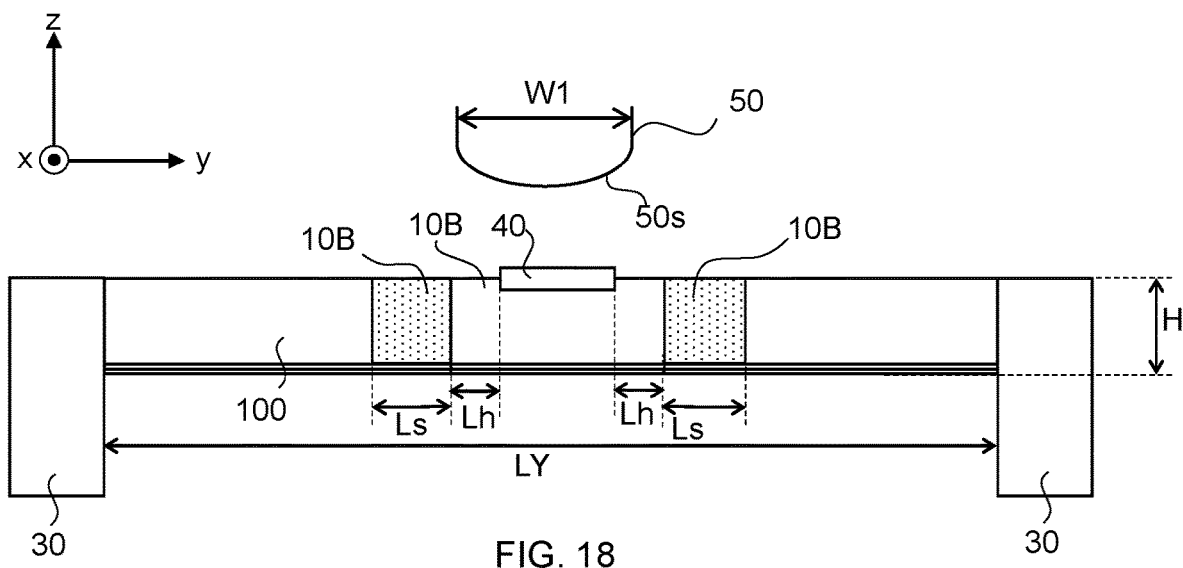
FIG. 18 shows the configuration of an analysis model for simulations.

FIG. 18 shows another analysis-model construction for simulations. In the example shown in FIG. 18, the two ends of the structural member 100 were joined to two stands 30. The results from the simulations with the analysis model shown in FIG. 18 were similar to the results from the simulations with the analysis model shown in FIG. 17A. Further, in addition to the simulations where the impacter 4 was caused to hit the top-plate portion 113, simulations were also conducted where the impacter 4 was caused to hit the closing plate 102.

Table 1, provided below, lists evaluations of deformation behavior obtained from the results of simulations where the ratio between the above-discussed strengths was 0.83 (the low-strength portions 10B having a yield strength of YP 1000 MPa and the other portions including the high-strength portions 10A having a yield strength of YP 1200 MPa) with different dimensions Ls and Lh. In the column for deformation behavior in Table 1, "excellent" means a very good behavior, "good" means a good one, and "poor" means a poor one. These deformation-behavior evaluations are based on the amount of intrusion of the impacter at the time at which sharp bending occurred. The amount of intrusion of the impacter is often referred to as impacter stroke or impacter displacement. Table 1 shows analysis results for situations where the impacter 4 was caused to hit the top-plate portion 113. Generally the same analysis results were obtained for situations where the impacter 4 was caused to hit the closing plate 102.

TABLE 1

| Case | Lh [mm] | Ls [mm] | Deformation behavior |
|------|---------|---------|---------------------|
| 1 | 0 | H | poor |
| 2 | H/5 | ↑ | poor |
| 3 | H/4 | ↑ | poor |
| 4 | H/3 | ↑ | excellent |
| 5 | H/2 | ↑ | excellent |
| 6 | H | ↑ | excellent |
| 7 | 3H/2 | ↑ | good |
| 8 | 2H | ↑ | poor |
| 9 | H | 2H/5 | poor |
| 10 | ↑ | 3H/5 | excellent |

Figure 19:
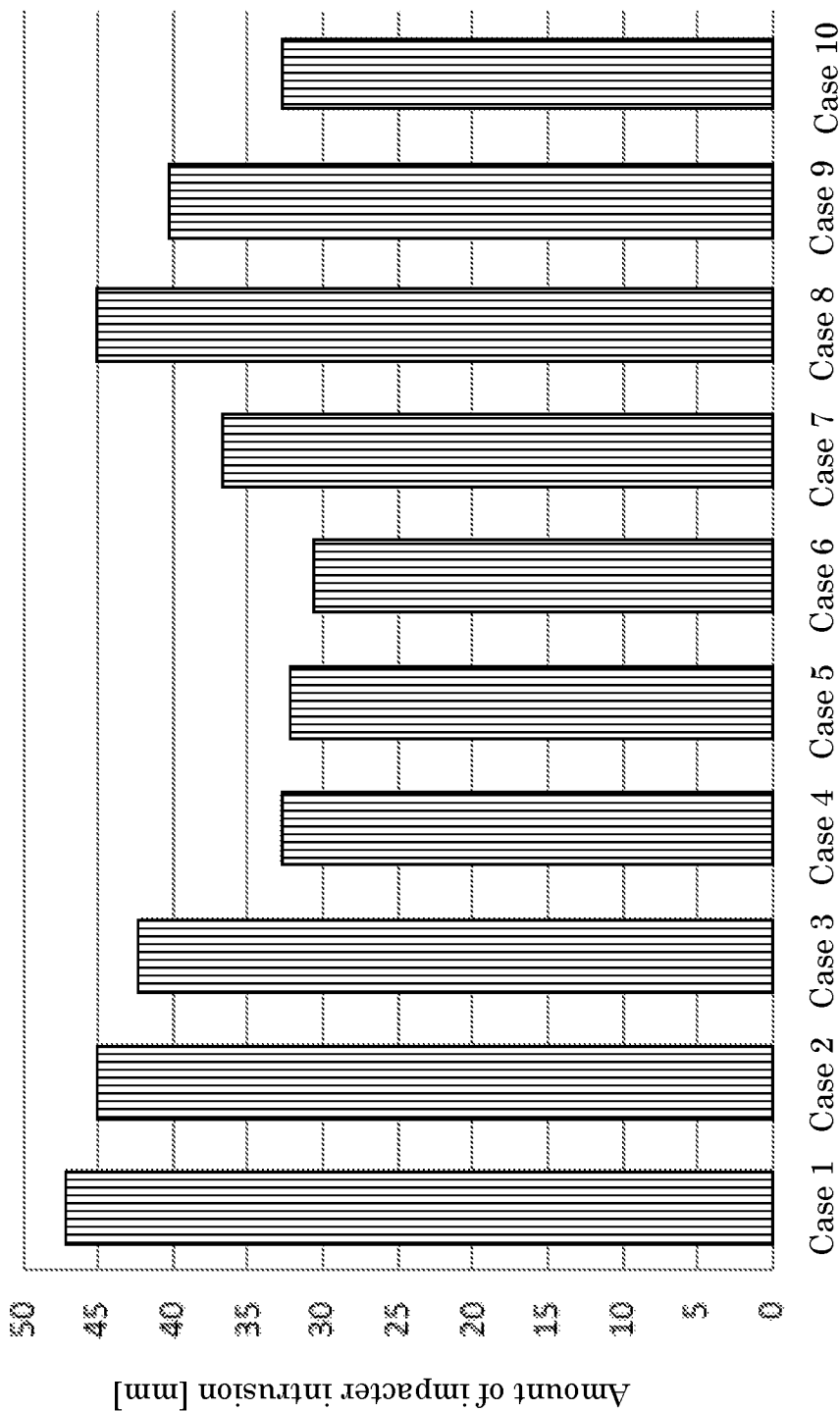
FIG. 19 shows the results of simulations of deformation of structural members.

FIG. 19 graphs simulated impacter strokes at the time of sharp bending for Cases 1 to 10 in Table 1. The dimensions Lh and Ls for Cases 1 to 10 in FIG. 19 are the same as the dimensions Lh and Ls for Cases 1 to 10 in Table 1.

The results in FIG. 19 show that the impacter strokes at the time of sharp bending for Cases 3 to 7 and 10 were smaller than those for Cases 1 to 3. This shows that sharp bending is less likely to occur for Cases 3 to 7 and 10 than for Cases 1 to 3. That is, sharp bending does not easily occur if H/3≤Lh≤3H/2. Sharp bending is still less likely to occur if H/3≤Lh≤H. Further, it was found that sharp bending does not easily occur if the dimension Ls of the low-strength portion 10B in the y-direction is equal to or larger than 3H/5.

Figure 20:
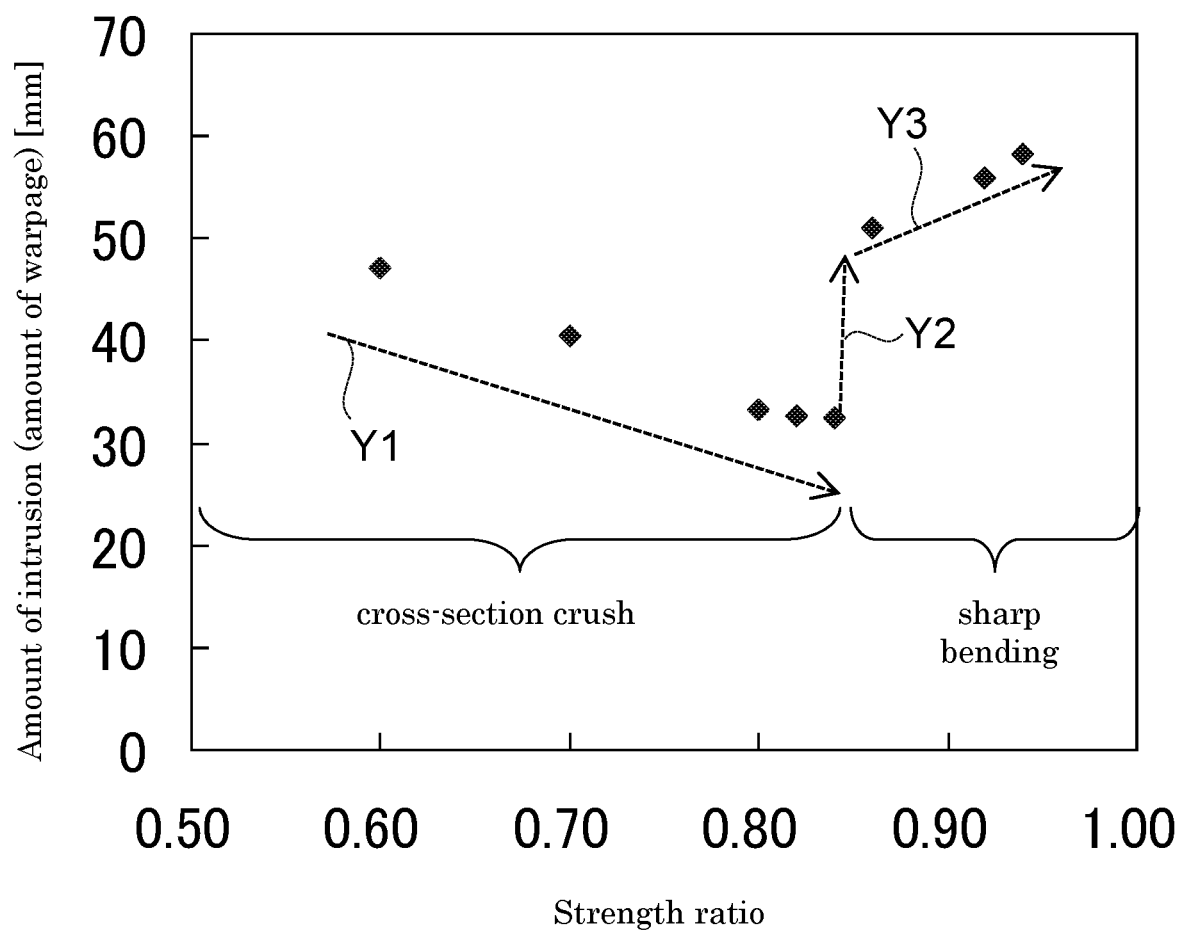
FIG. 20 graphs the amount of deformation caused by bending deformation when impact loads are received with different ratios between the strengths of the low- and high-strength portions.

Further impact simulations were performed with different strength ratios between the low-strength portions 10B and the other portions including the high-strength portions 10A. FIG. 20 graphs amounts of deformation due to bending deformation upon application of an impact load with different strength ratios between the low-strength portions 10B and the other portions including the high-strength portions 10A. In FIG. 20, the vertical axis represents the amount of intrusion (or amount of protrusion) in the structural member 10 as measured in the direction of impact (i.e. z-direction). The horizontal axis represents the ratio of the strength of the low-strength portions 10B to the strength of the high-strength portions 10A ("Strength ratio" means is the strength of the low-strength portions divided by the strength of the high-strength portions).

In the range of strength ratios of 0.60 to 0.85, the amount of intrusion decreased as the strength ratio increased (indicated by the arrow Y1). The deformation mode of the structural member 10 in this range was cross-section crush. In this range, if the strength of the low-strength portion 10B was low (i.e. a strength ratio of 0.60 or lower), the deformation was a cross-section crush, but the amount of intrusion was almost as large as those for strength ratios above 0.85. When the strength ratio was above 0.85, the amount of intrusion rapidly increased (indicated by the arrow Y2). When the strength ratio increased above 0.85, the amount of intrusion increased depending on the increase in strength ratio (indicated by the arrow Y3). This is presumably because the deformation mode changed from cross-section crush to sharp bending at the strength ratio of 0.85. Thus, if the strength of the low-strength portion 10B was too high (i.e. high strength ratios), the member deformed to be sharply bent, resulting in a large amount of intrusion. The results in FIG. 16 demonstrate that, to reduce the amount of intrusion accompanied by bending deformation due to an impact, the strength ratio is preferably 60 to 85%, and more preferably 70 to 85%.

Although some embodiments of the present invention have been described, these embodiments are mere examples for carrying out the present invention. Thus, the present invention is not limited to the above-illustrated embodiments, and the above-illustrated embodiments may be modified as appropriate to be carried out without departing from the spirit of the invention.

EXPLANATION OF CHARACTERS

1: structural member
2: closing plate
11, 12: side walls
13: top portion
14: flanges
11A, 12A: high-strength portions
11B, 12B: low-strength portions

The invention claimed is:

1. A structural member comprising:
a closed-cross-section structure including at least one closing plate and a hat member; and
a reinforcing member attached to the closed-cross-section structure,
wherein the hat member includes:
a top-plate portion;
two first ridges, each positioned on a respective one of both ends of the top-plate portion;
two flanges joined to the closing plate;
two second ridges, each positioned on an end of a respective one of the two flanges; and
two side walls, each located between a respective one of the first ridges and a respective one of the second ridges,
heights of the two side walls as measured in a direction perpendicular to the top-plate portion being denoted by H1 and H2,
each of the two side walls includes:
a high-strength portion having a yield strength not lower than 500 MPa; and
a low-strength portion adjacent to the high-strength portion in an extending direction of the first ridge,
the low-strength portion having a yield strength of 60 to 85% of the yield strength of the high-strength portion, and
the reinforcing member is adjacent to at least a part of the top-plate portion of the hat member, both ends of the reinforcing member as determined along the direction of extension of the first ridges overlap the high-strength portions of the side walls, and,
a boundary between the high-strength portion and the low-strength portion is from ⅓ of H1 to 3/2 of H1 and from 1/3 of H2 to 3/2 of H2 away from at least one of both ends of the reinforcing member in the extending direction of the first ridge.

2. A structural member comprising:
a closed-cross-section structure including at least one closing plate and a hat member; and
a reinforcing member attached to the closed-cross-section structure,
wherein the hat member includes:
a top-plate portion;
two first ridges, each positioned on a respective one of both ends of the top-plate portion;
two flanges joined to the closing plate;
two second ridges, each positioned on an end of a respective one of the two flanges; and
two side walls, each located between a respective one of the first ridges and a respective one of the second ridges,
heights of the two side walls as measured in a direction perpendicular to the closing plate being denoted by H1 and H2,
each of the two side walls includes:
a high-strength portion having a yield strength not lower than 500 MPa; and
a low-strength portion adjacent to the high-strength portion in an extending direction of the first ridge,
the low-strength portion having a yield strength of 60 to 85% of the yield strength of the high-strength portion, and
the reinforcing member is adjacent to at least a part of the closing plate or at least a part of the two side walls of the hat member,
both ends of the reinforcing member as determined along the direction of extension of the first ridges overlap the high-strength portions of the side walls, and,
a boundary between the high-strength portion and the low-strength portion is from ⅓ of H1 to 3/2 of H1 and from 1/3 of H2 to 3/2 of H2 away from at least one of both ends of the reinforcing member in the extending direction of the first ridge.

3. A structural member comprising:
a closed-cross-section structure including at least one closing plate and a grooved member; and
a reinforcing member attached to the closed-cross-section structure,
wherein the grooved member includes:
a top-plate portion;
two first ridges, each positioned on a respective one of both ends of the top-plate portion;
two joints joined to the closing plate; and
two side walls, each located between a respective one of the first ridges and a respective one of the joints,
heights of the two side walls as measured in a direction perpendicular to the top-plate portion being denoted by H1 and H2,
each of the two side walls includes:
a high-strength portion having a yield strength not lower than 500 MPa; and
a low-strength portion adjacent to the high-strength portion in an extending direction of the first ridge,
the low-strength portion having a yield strength of 60 to 85% of the yield strength of the high-strength portion, and
the reinforcing member is adjacent to at least a part of the top-plate portion of the hat member,
both ends of the reinforcing member as determined along the direction of extension of the first ridges overlap the high-strength portions of the side walls, and,
a boundary between the high-strength portion and the low-strength portion is from ⅓ of H1 to 3/2 of H1 and from 1/3 of H2 to 3/2 of H2 away from at least one of both ends of the reinforcing member in the extending direction of the first ridge.

4. A structural member comprising:
a closed-cross-section structure including at least one closing plate and a grooved member; and
a reinforcing member attached to the closed-cross-section structure,
wherein the grooved member includes:
a single top-plate portion;
two first ridges, each positioned on a respective one of both ends of the top-plate portion;
a flange joined to the closing plate;
a single second ridge on an end of the flange;

a first side wall located between one of the first ridges and the second ridge, a height of the first side wall as measured in a direction perpendicular to the top-plate portion being denoted by H1;

a joint joined to the closing plate; and a second side wall located between the other first ridge and the joint, a height of the second side wall as measured in the direction perpendicular to the top-plate portion being denoted by H2, each of the first side wall and the second side wall includes:

a high-strength portion having a yield strength not lower than 500 MPa; and a low-strength portion adjacent to the high-strength portion in an extending direction of the first ridge, the low-strength portion having a yield strength of 60 to 85% of the yield strength of the high-strength portion, the reinforcing member is adjacent to at least a part of the top-plate portion of the hat member, both ends of the reinforcing member as determined along the direction of extension of the first ridges overlap the high-strength portions of the first side wall and the second side wall, and, a boundary between the high-strength portion and the low-strength portion is from 1/3 of H1 to 3/2 of H1 and from 1/3 of H2 to 3/2 of H2 away from at least one of both ends of the reinforcing member in the extending direction of the first ridge.

5. The structural member according to claim 1, wherein a dimension of each of the low-strength portions as measured in the direction of extension of the first ridges is not smaller than 3/5 of H1 and not smaller than 3/5 of H2.

6. The structural member according to claim 1, wherein low-strength portions are located next to both ends of each of the high-strength portions in an extending direction of the first ridge.

7. The structural member according to claim 1, wherein the reinforcing member is located in a middle, as determined along the direction of extension of the first ridges, of the closed-cross-section structure.

8. The structural member according to claim 1, wherein, the side wall includes a first side-wall end and a second side-wall end, the first side-wall end is adjacent to the first ridge, the second side-wall end is opposite to the first ridge, a distance between an end of the low-strength portion on the first ridge side and the first ridge in a direction from the first side-wall end to the second side-wall end is smaller than 1/4 of a distance between the first side-wall end and the second side-wall end, a dimension of the low-strength portion in the direction from the first side-wall end to the second side-wall end is not smaller than 1/5 of the distance between the first side-wall end and the second side-wall end, a portion of the side wall between the end of the low-strength portion on the first ridge side and the first ridge has a yield strength not lower than 500 MPa and higher than a yield strength of the low-strength portion.

9. The structural member according to claim 2, wherein, the side wall includes a first side-wall end and a second side-wall end, the first side-wall end is opposite to the first ridge, the second side-wall end is adjacent to the first ridge, a distance between an end of the low-strength portion on the first ridge side and the first ridge in a direction from the first side-wall end to the second side-wall end is smaller than 1/4 of a distance between the first side-wall end and the second side-wall end, a dimension of the low-strength portion in the direction from the first side-wall end to the second side-wall end is not smaller than 1/5 of the distance between the first side-wall end and the second side-wall end, a portion of the side wall between the end of the low-strength portion on the first ridge side and the first ridge has a yield strength not lower than 500 MPa and higher than a yield strength of the low-strength portion.

10. The structural member according to claim 1, wherein the structural member is curved to protrude from the top-plate portion.

11. The structural member according to claim 2, wherein the structural member is curved to protrude from the closing plate.

12. The structural member according to claim 1, wherein, as seen in a cross section perpendicular to the direction of extension of the first ridges, at least a part of an imaginary line segment connecting joint portions between the closing plate and the hat member or the grooved member is located between the top-plate portion and the closing plate.

13. A vehicle-body structure including the structural member according to claim 1, wherein:

the reinforcing member is a center pillar; and the closed-cross-section structure is a locker or a roof rail.

14. A bumper reinforcement including the structural member of claim 1.

15. The structural member according to claim 2, wherein a dimension of each of the low-strength portions as measured in the direction of extension of the first ridges is not smaller than 3/5 of H1 and not smaller than 3/5 of H2.

16. The structural member according to claim 3, wherein a dimension of each of the low-strength portions as measured in the direction of extension of the first ridges is not smaller than 3/5 of H1 and not smaller than 3/5 of H2.

17. The structural member according to claim 4, wherein a dimension of each of the low-strength portions as measured in the direction of extension of the first ridges is not smaller than 3/5 of H1 and not smaller than 3/5 of H2.

18. The structural member according to claim 2, wherein low-strength portions are located next to both ends of each of the high-strength portions in an extending direction of the first ridge.

19. The structural member according to claim 3, wherein low-strength portions are located next to both ends of each of the high-strength portions in an extending direction of the first ridge.

20. The structural member according to claim 4, wherein low-strength portions are located next to both ends of each of the high-strength portions in an extending direction of the first ridge.

* * * * *